April 10, 1945.    P. SPURLINO ET AL    2,373,510
ACCOUNTING MACHINE
Filed Feb. 3, 1942    30 Sheets-Sheet 2
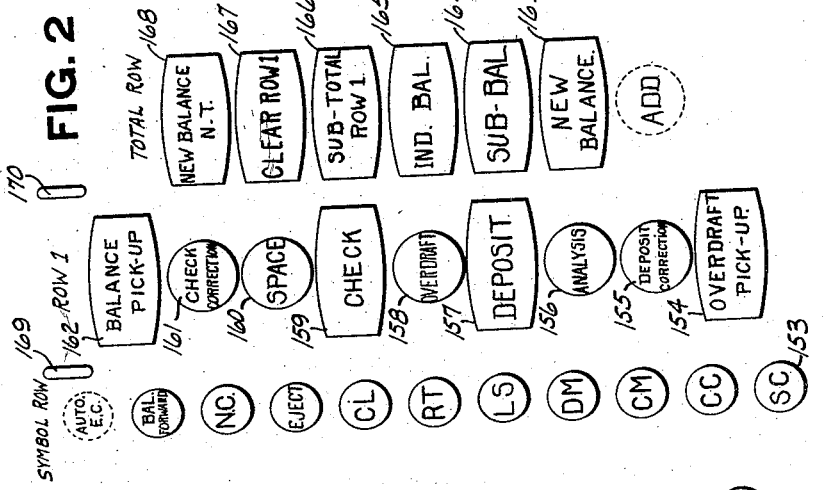
Pascal Spurlino
Everett H. Placke
Willis E. Eickman
and Arthur G. Kramer
Inventors
By Earl Benst
Their Attorney

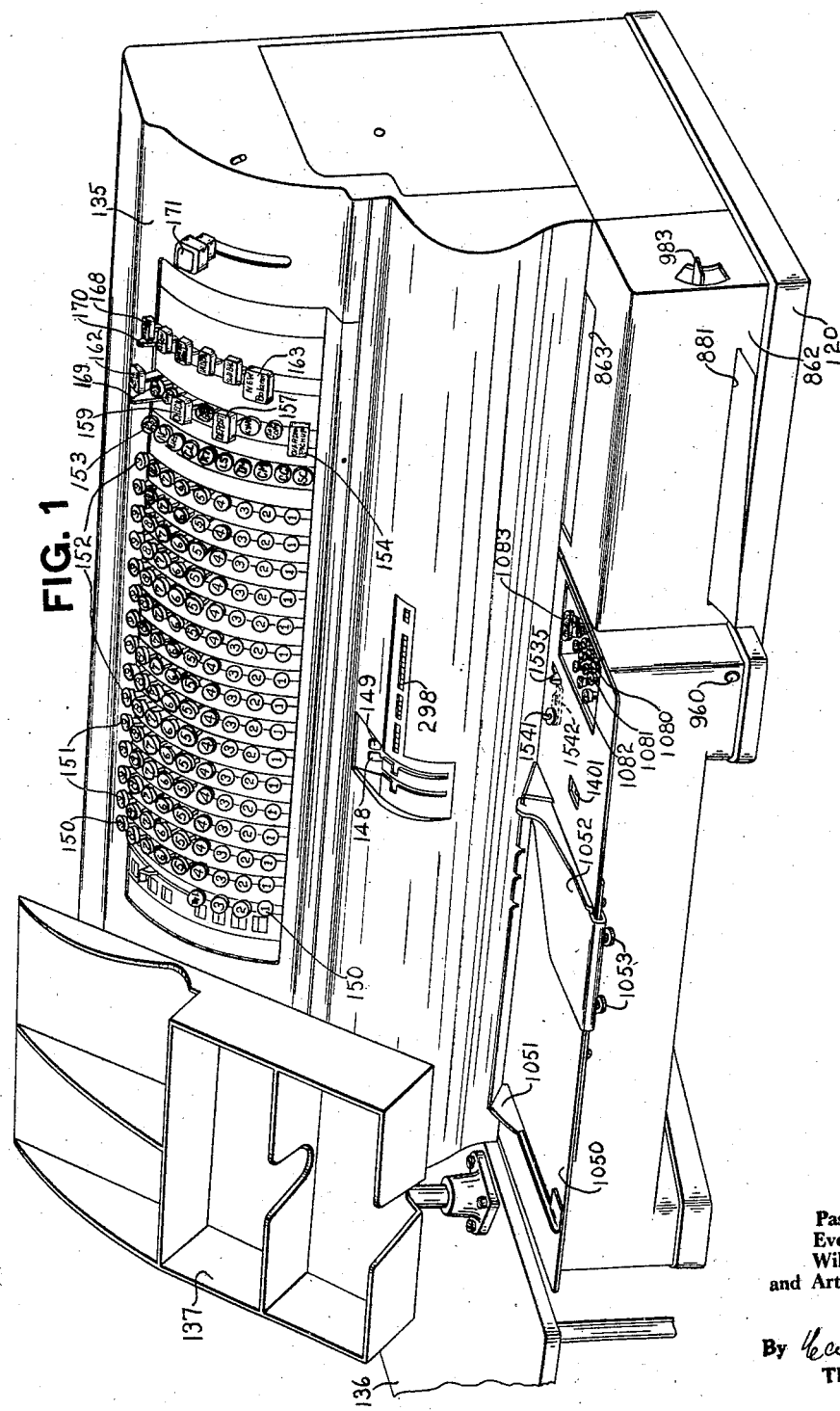

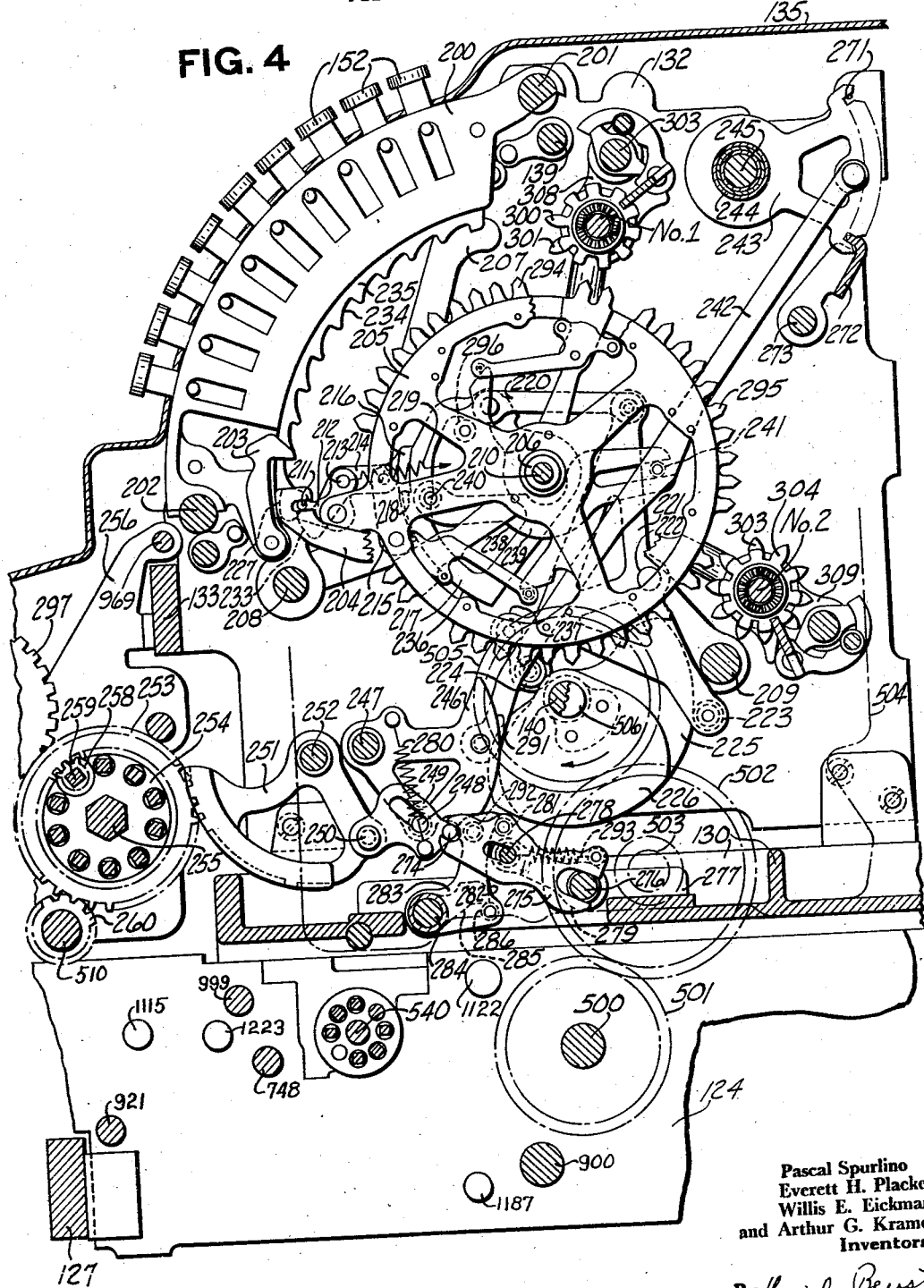

April 10, 1945.  P. SPURLINO ET AL  2,373,510
ACCOUNTING MACHINE
Filed Feb. 3, 1942  30 Sheets-Sheet 4
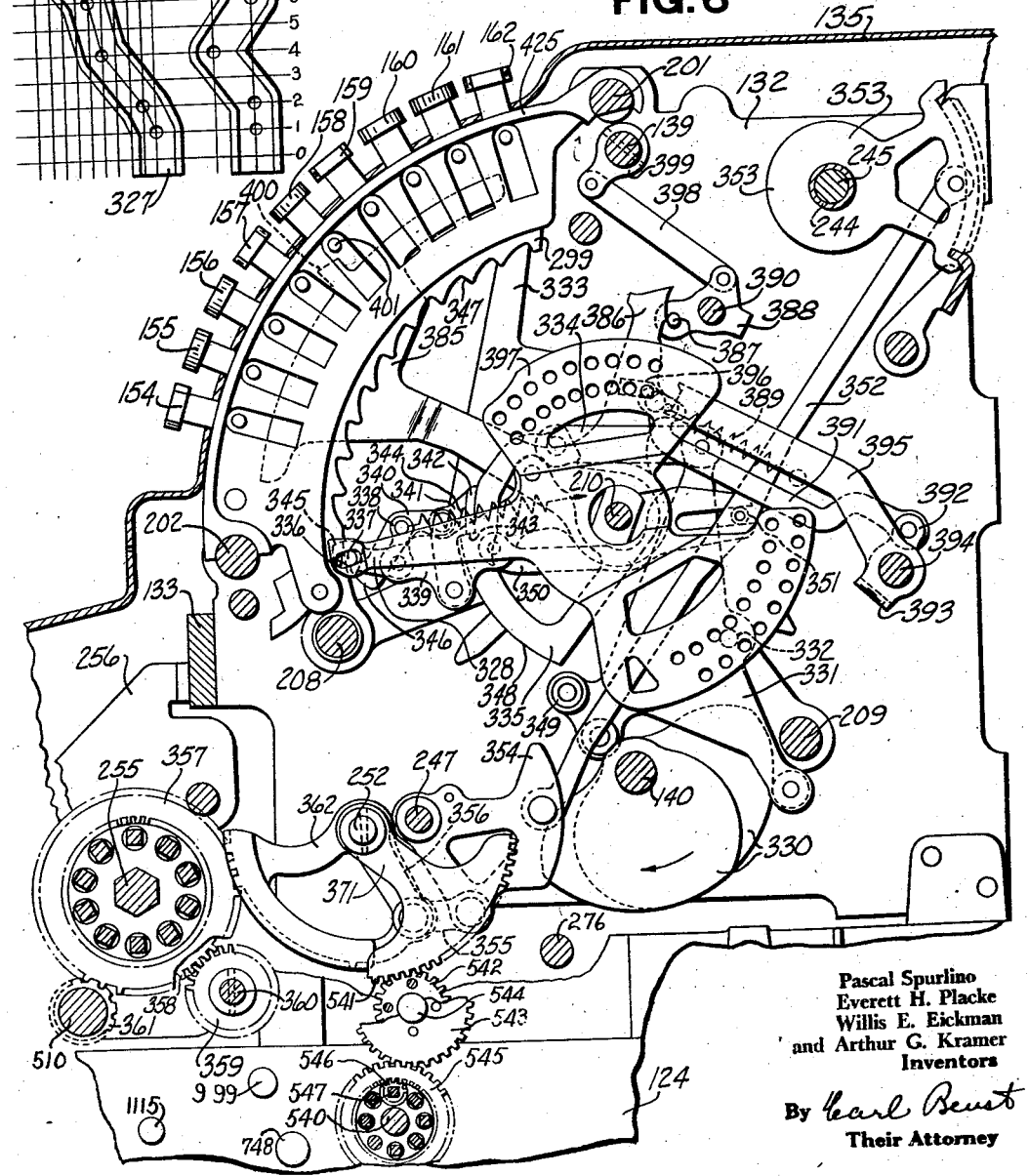
Pascal Spurlino
Everett H. Placke
Willis E. Eickman
and Arthur G. Kramer
Inventors
By Carl Beust
Their Attorney April 10, 1945.  P. SPURLINO ET AL  2,373,510
ACCOUNTING MACHINE
Filed Feb. 3, 1942  30 Sheets-Sheet 5

Pascal Spurlino
Everett H. Placke
Willis E. Eickman
and Arthur G. Kramer
Inventors By *Earl Benst*
Their Attorney

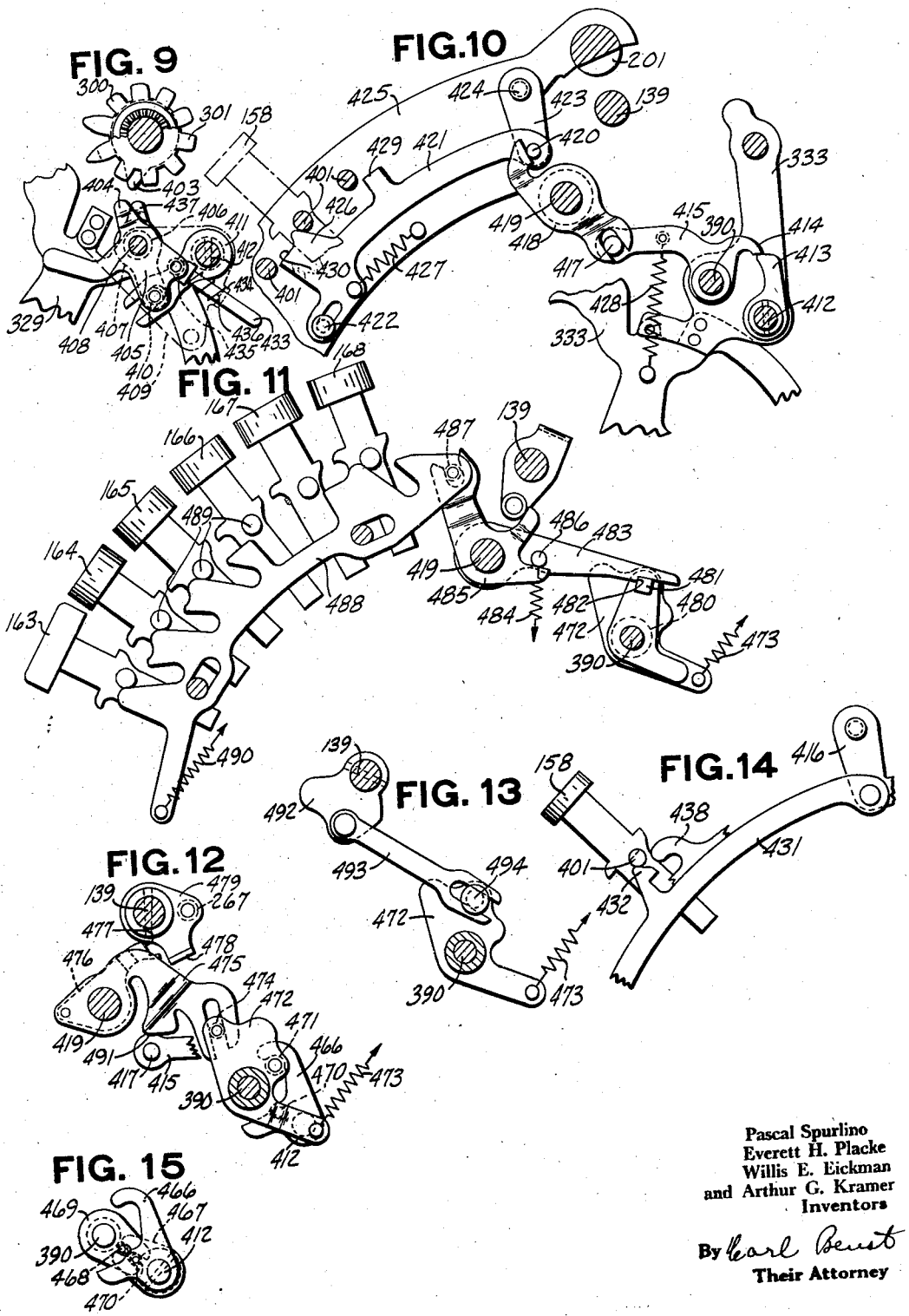

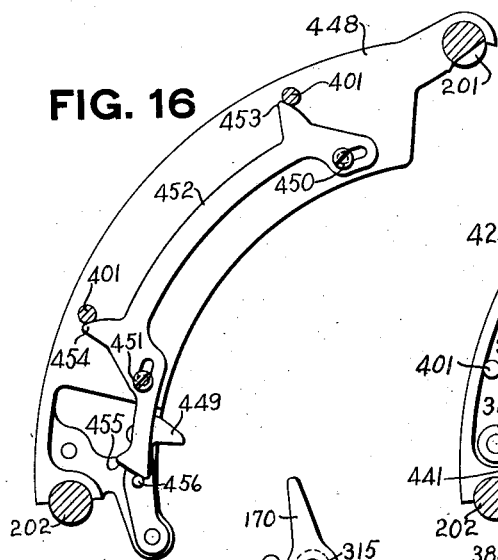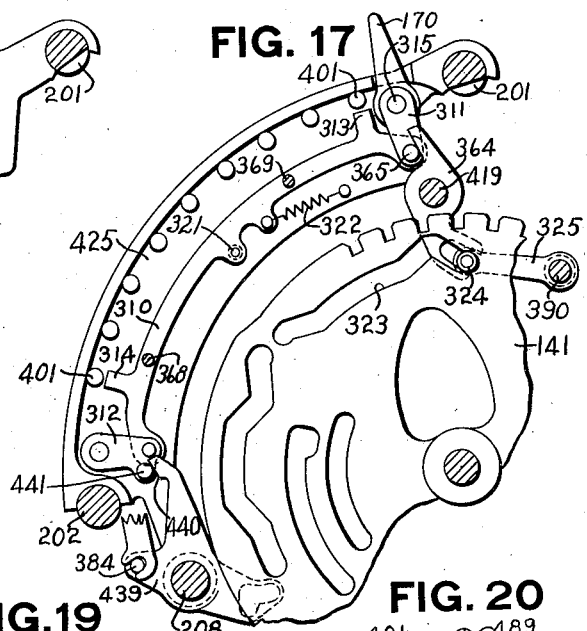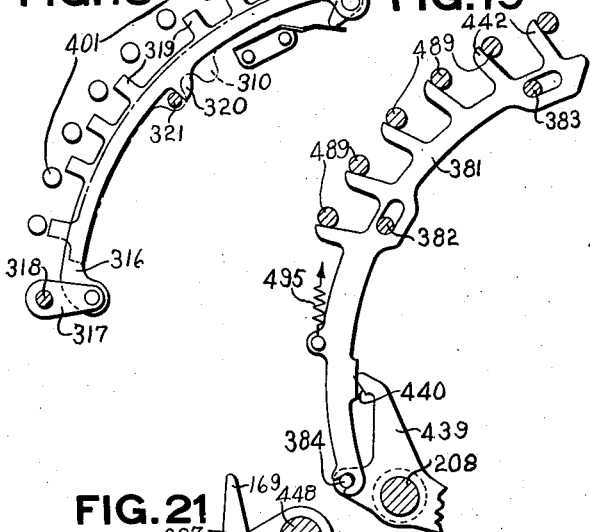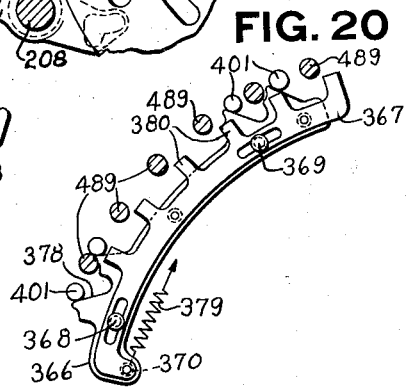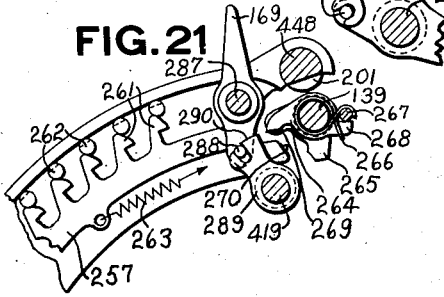
Pascal Spurlino
Everett H. Placke
Willis E. Eickman
and Arthur G. Kramer
Inventors
Their Attorney

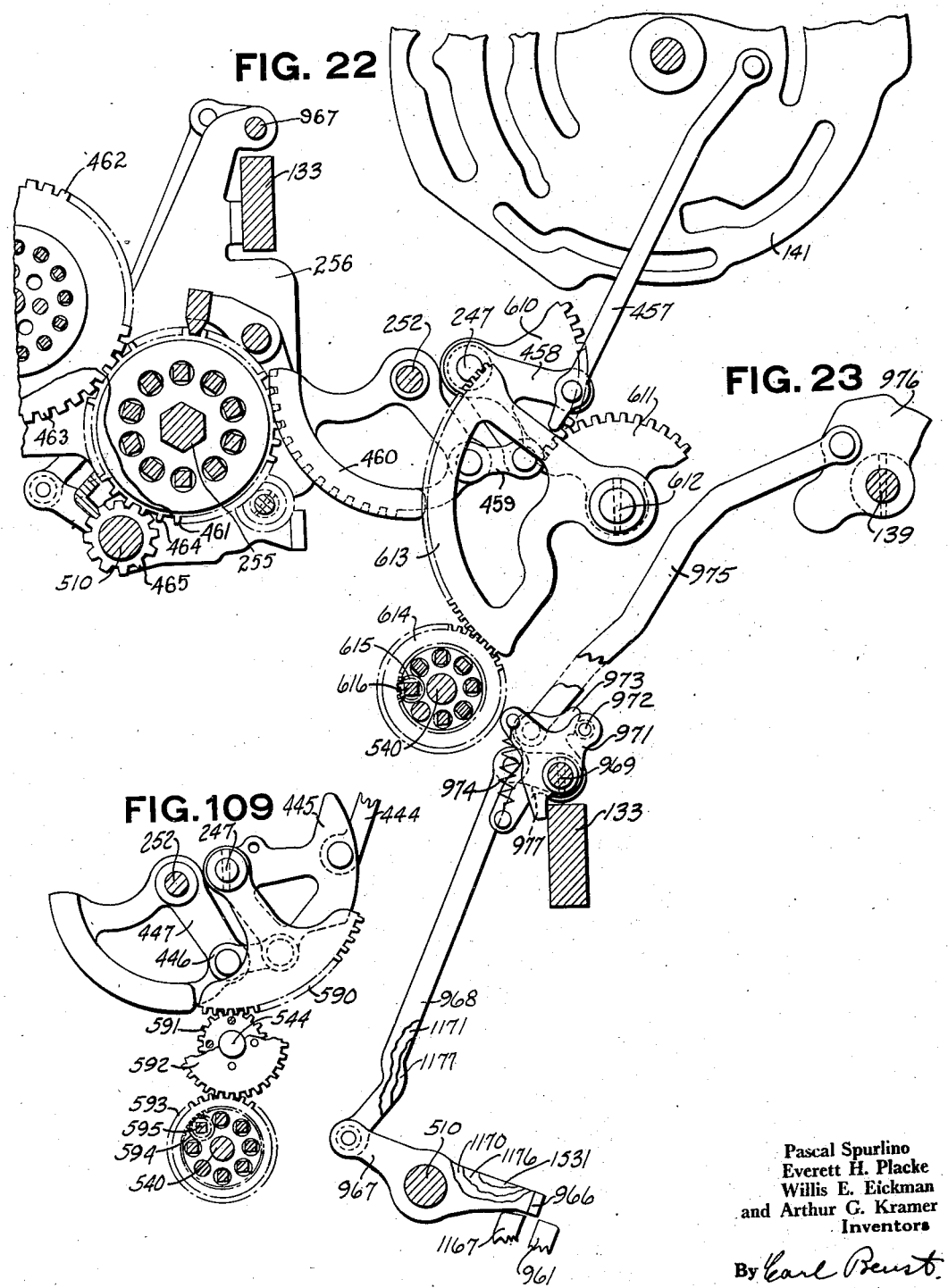

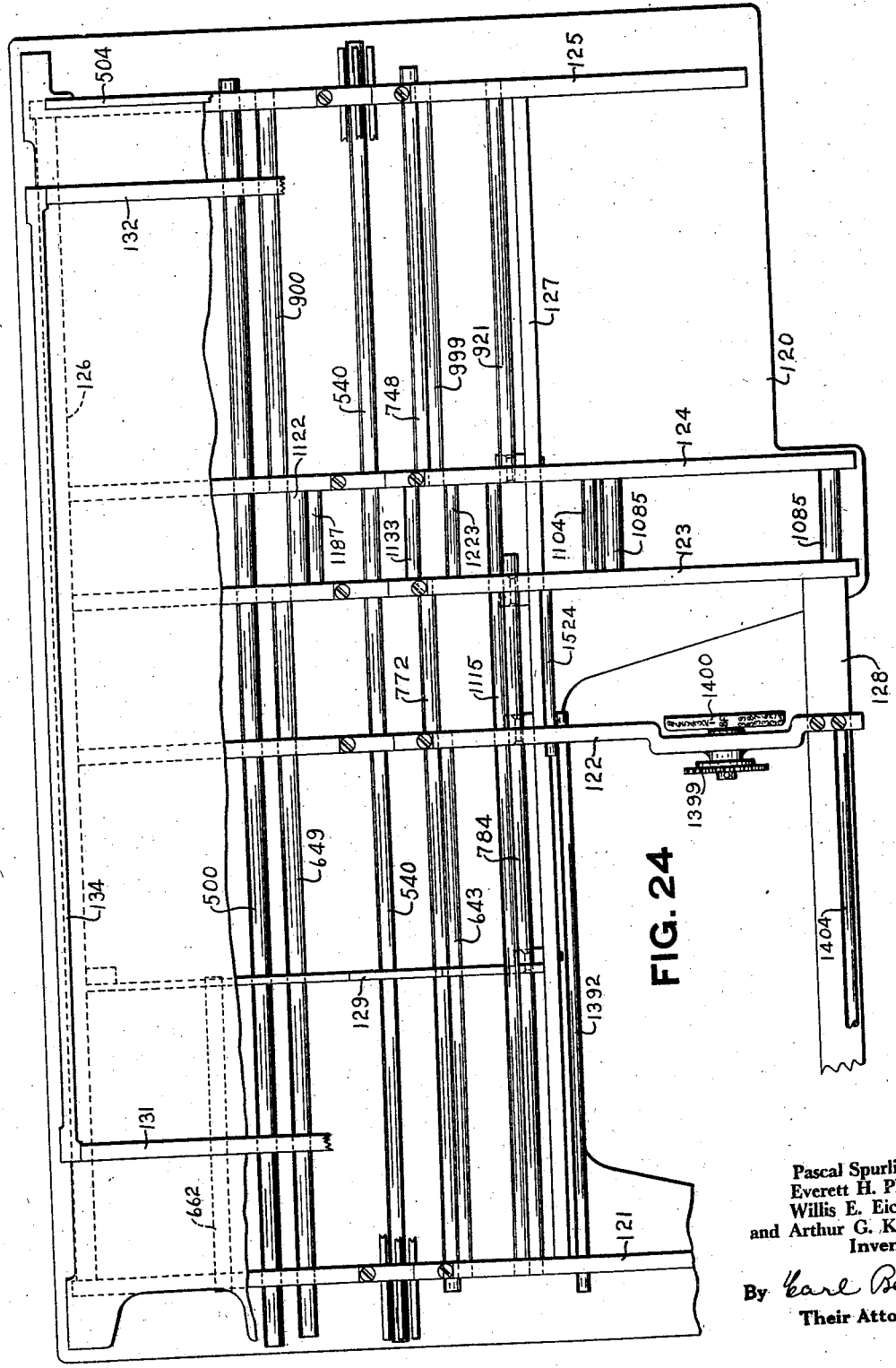

April 10, 1945.  P. SPURLINO ET AL  2,373,510
ACCOUNTING MACHINE
Filed Feb. 3, 1942  30 Sheets-Sheet 10
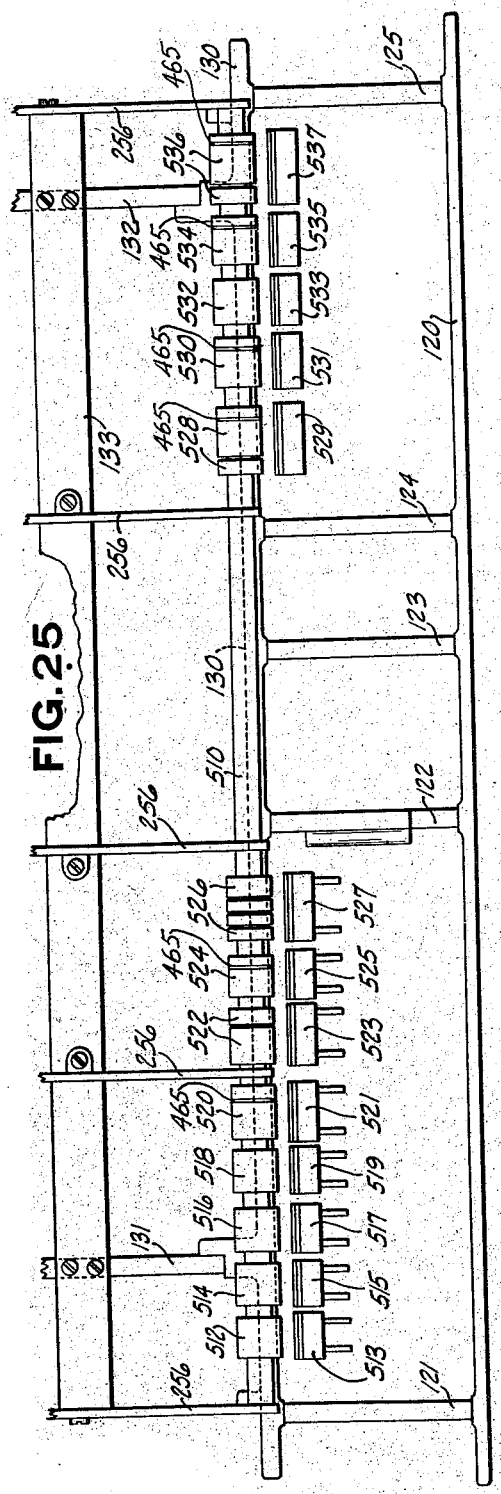
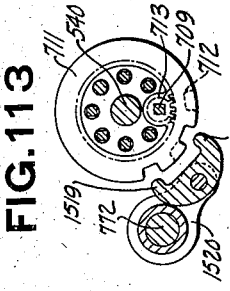
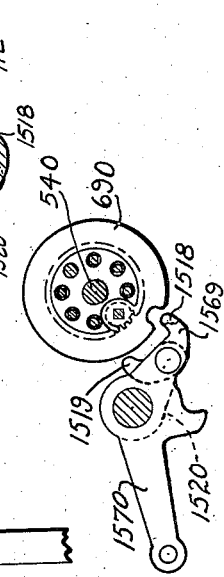
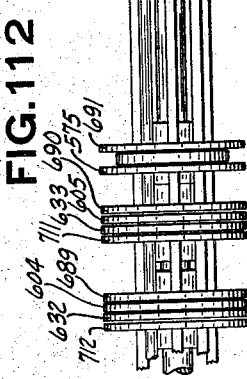
Pascal Spurlino
Everett H. Placke
Willis E. Eickman
and Arthur G. Kramer
Inventors
By Carl Beust
Their Attorney

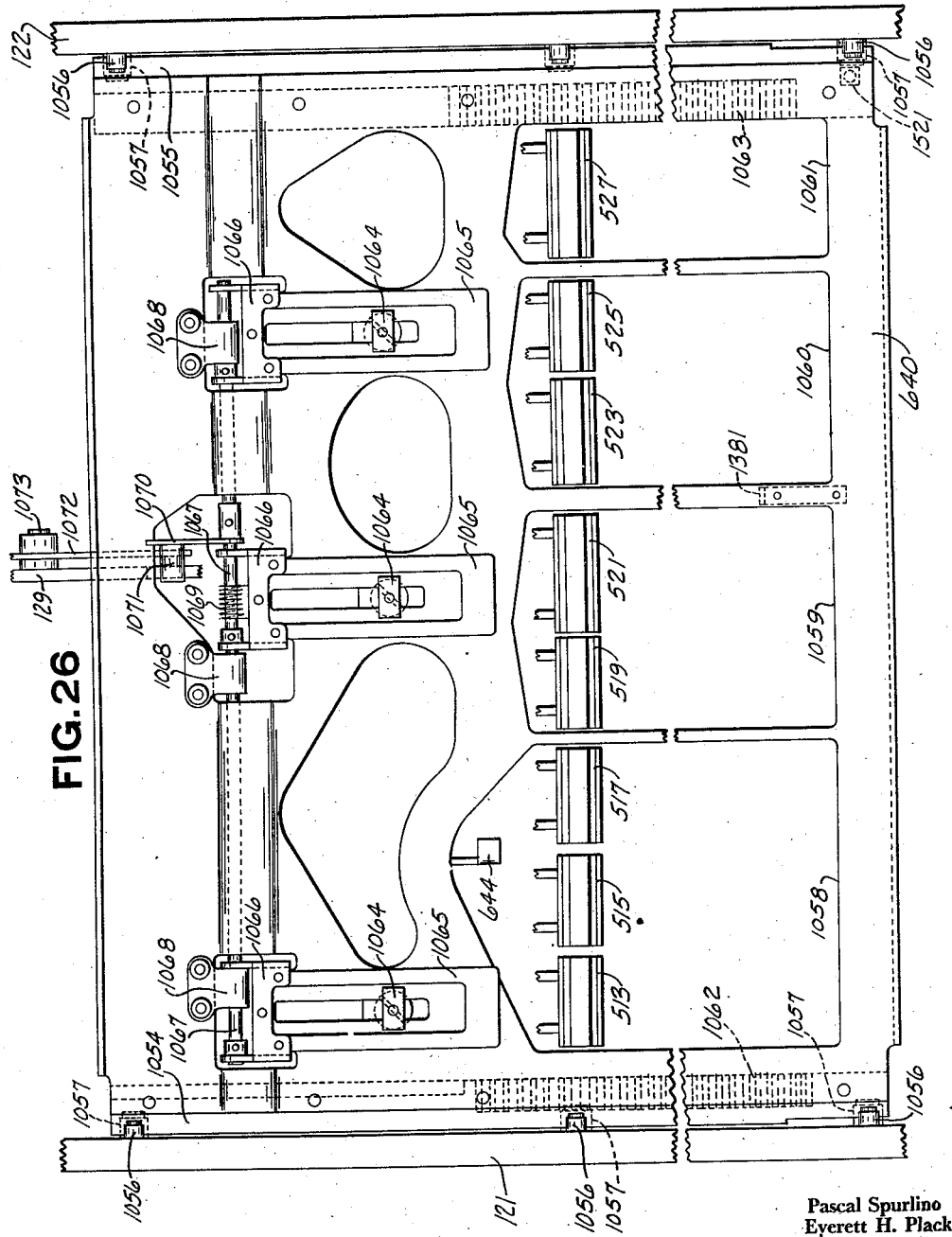

April 10, 1945.  P. SPURLINO ET AL  2,373,510
ACCOUNTING MACHINE
Filed Feb. 3, 1942   30 Sheets-Sheet 12
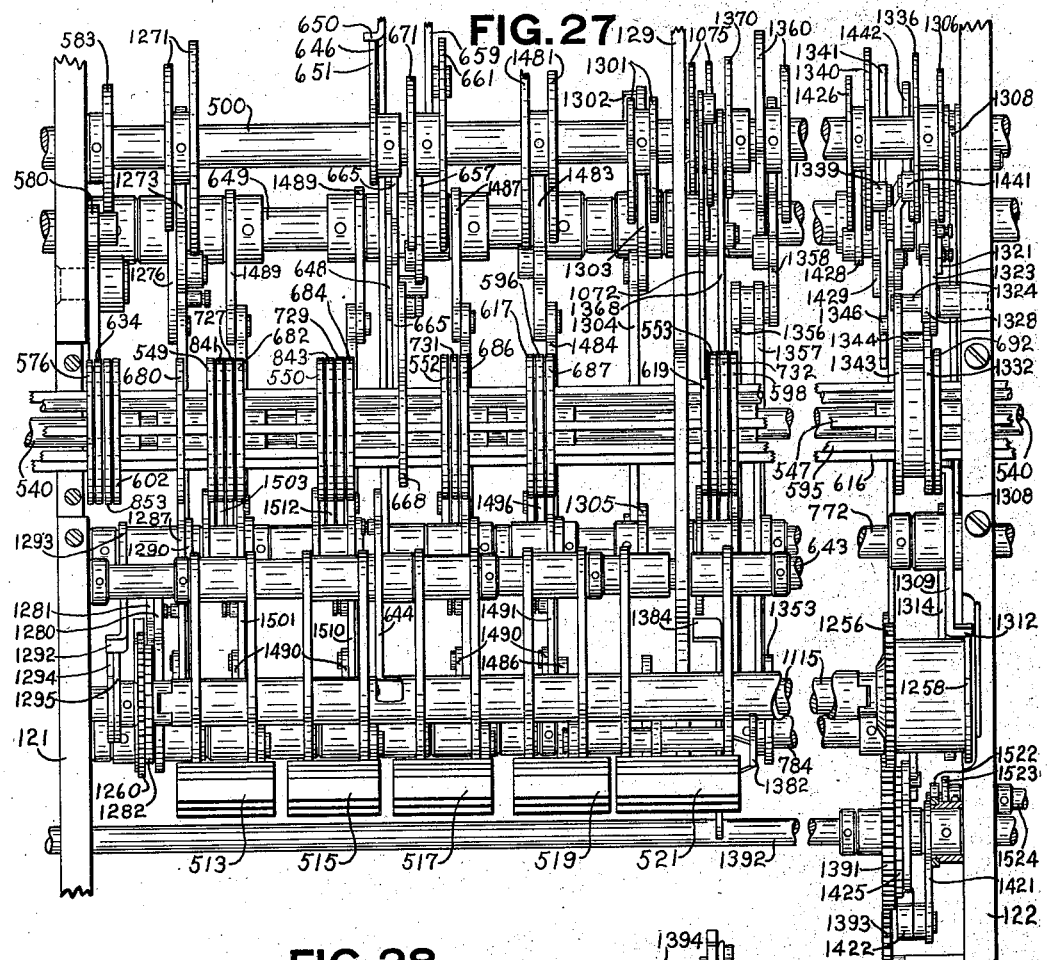
FIG. 27
FIG. 28
1 - First Transaction Bank
2 - Symbol Row
3 - Total Control Lever
4 - Slip Feeler
5 - Non Print Lever
6 - Audit Check Hammer #1
7 - Ejection Control Lever
8 - Audit Deposit Hammer
9 - Automatic
10 - Tie Rod
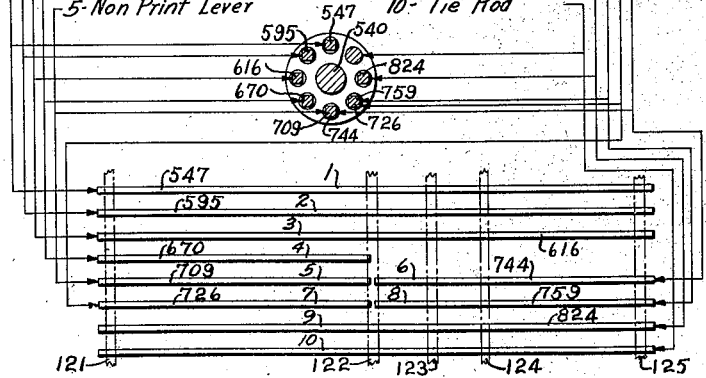
Pascal Spurlino
Everett H. Placke
Willis E. Eickman
and Arthur G. Kramer
Inventors
By Karl Beust
Their Attorney

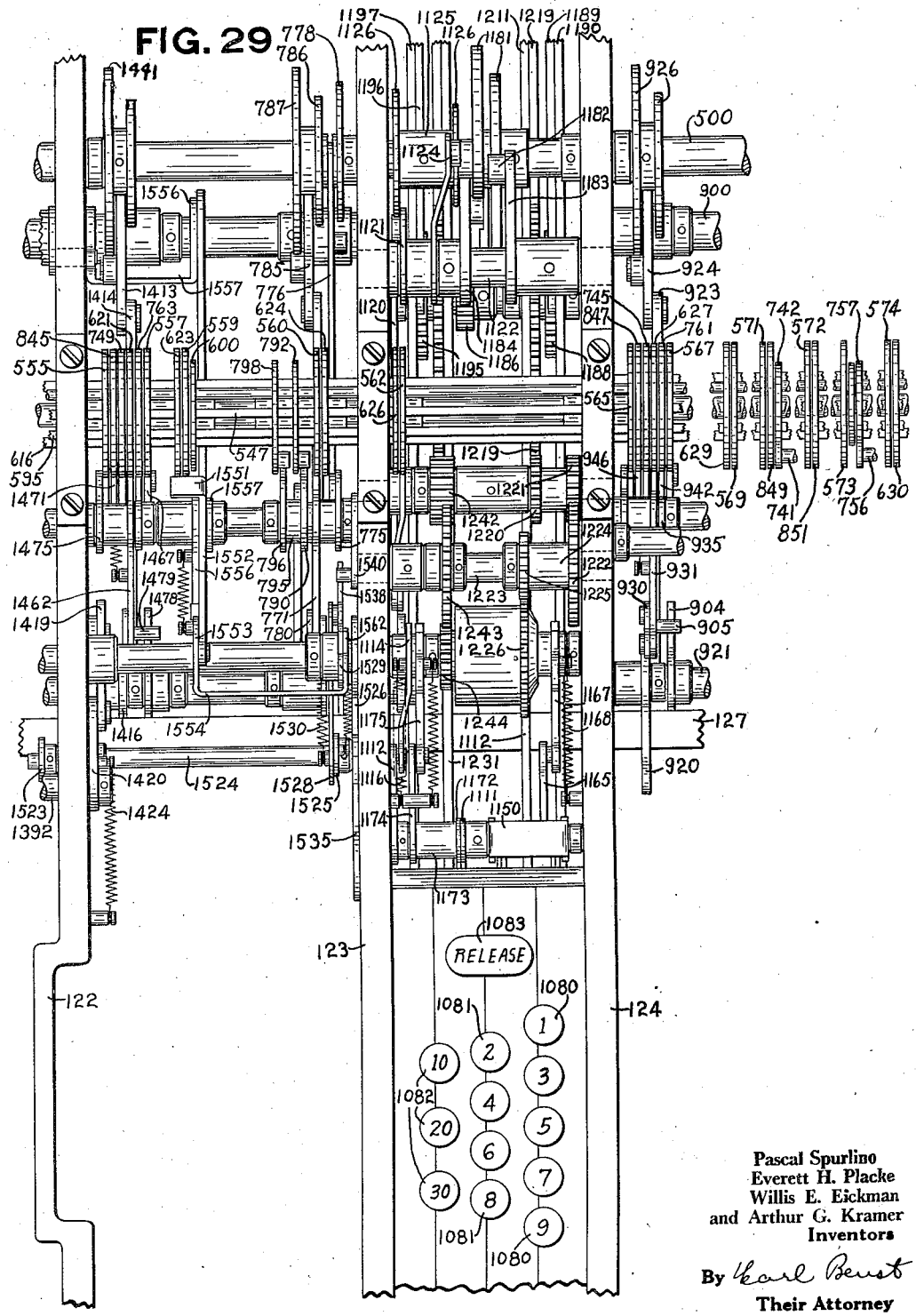

Pascal Spurlino
Everett H. Placke
Willis E. Eickman
and Arthur G. Kramer
Inventors By Carl Beust
Their Attorney April 10, 1945.   P. SPURLINO ET AL   2,373,510
ACCOUNTING MACHINE
Filed Feb. 3, 1942   30 Sheets-Sheet 15

Pascal Spurlino
Everett H. Placke
Willis E. Eickman
and Arthur G. Kramer
Inventors By Earl Beust
Their Attorney

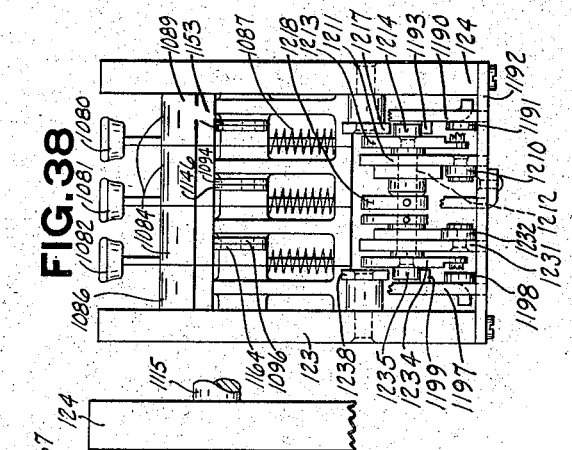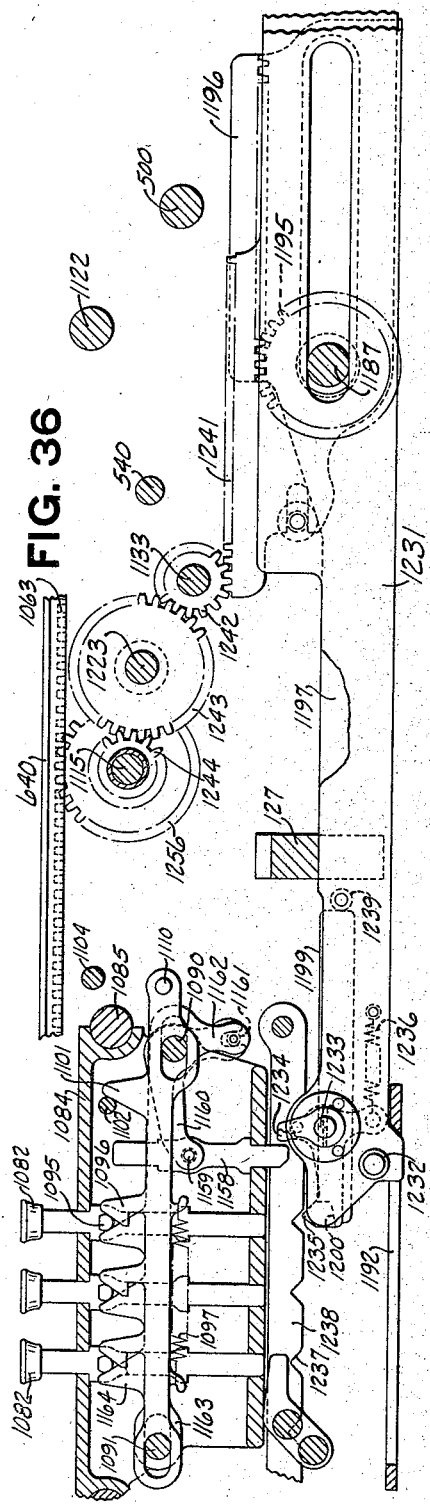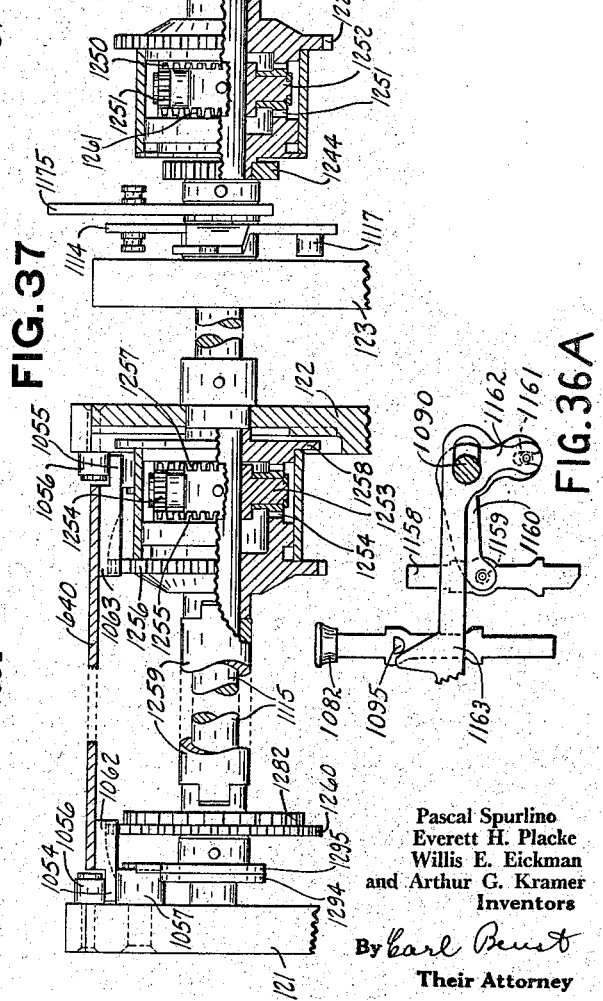

April 10, 1945.  P. SPURLINO ET AL  2,373,510
ACCOUNTING MACHINE
Filed Feb. 3, 1942  30 Sheets-Sheet 17
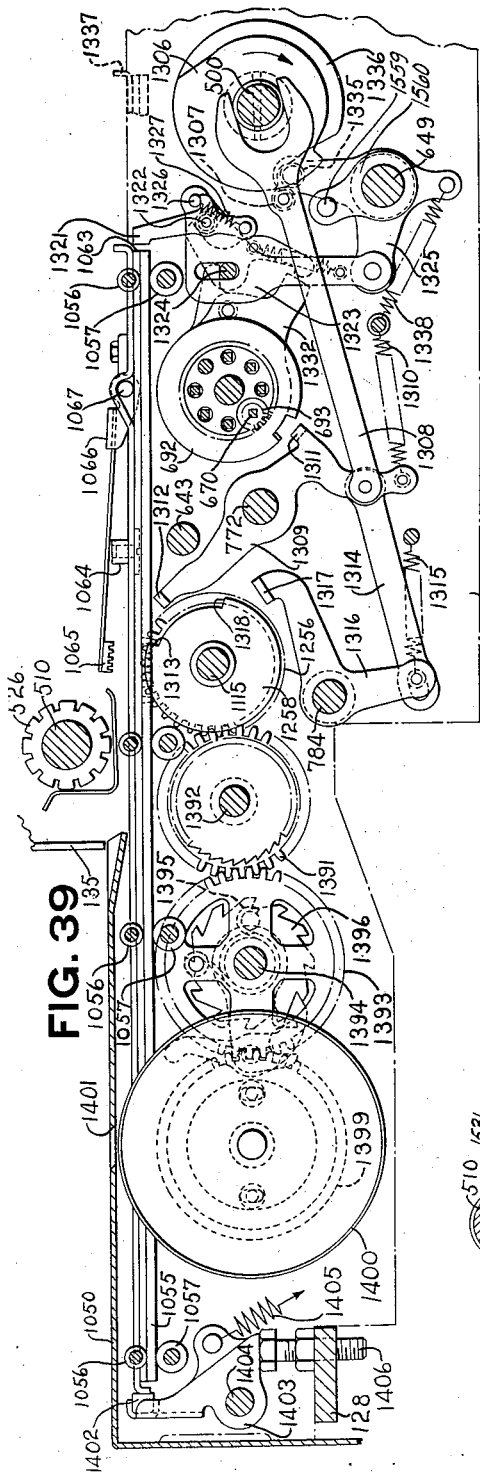
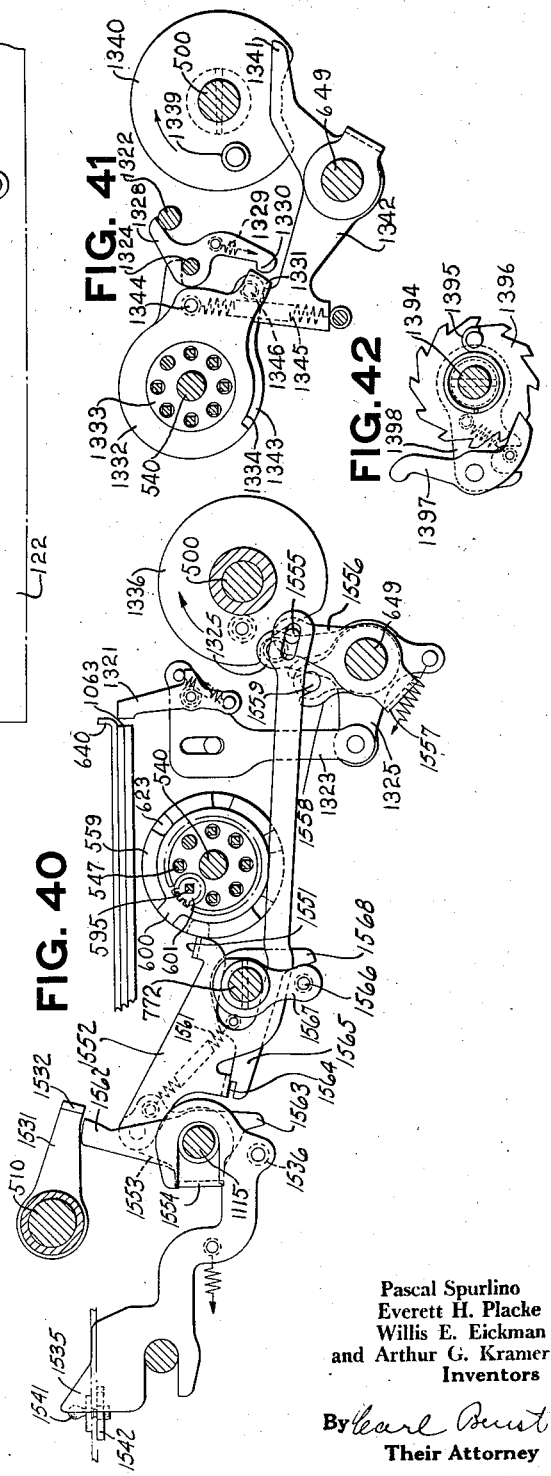
Pascal Spurlino
Everett H. Placke
Willis E. Eickman
and Arthur G. Kramer
Inventors
Their Attorney

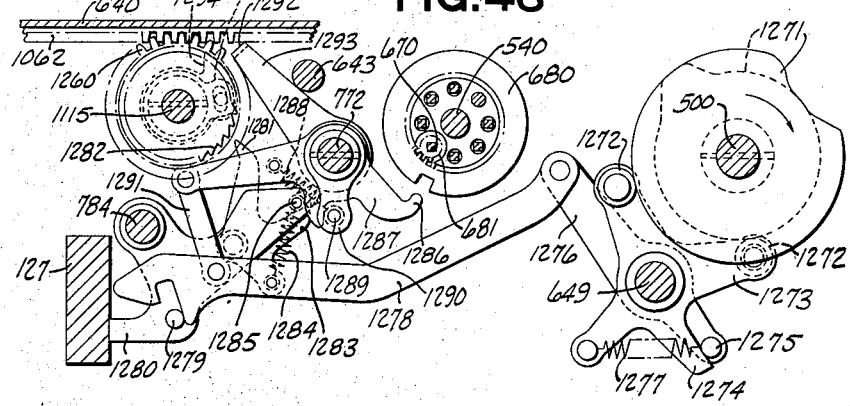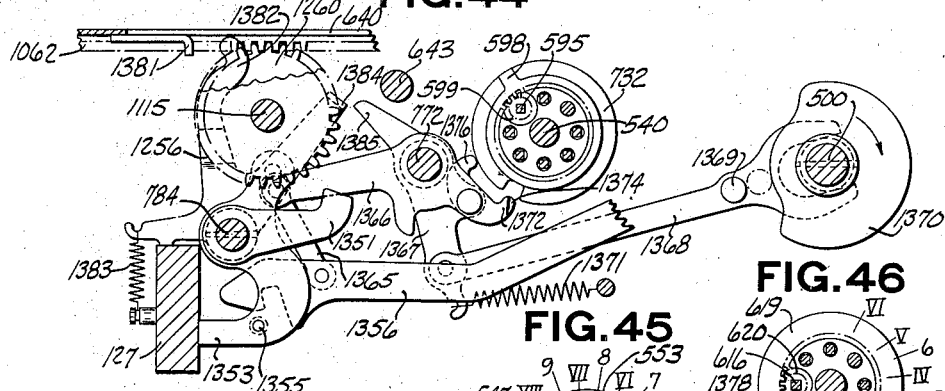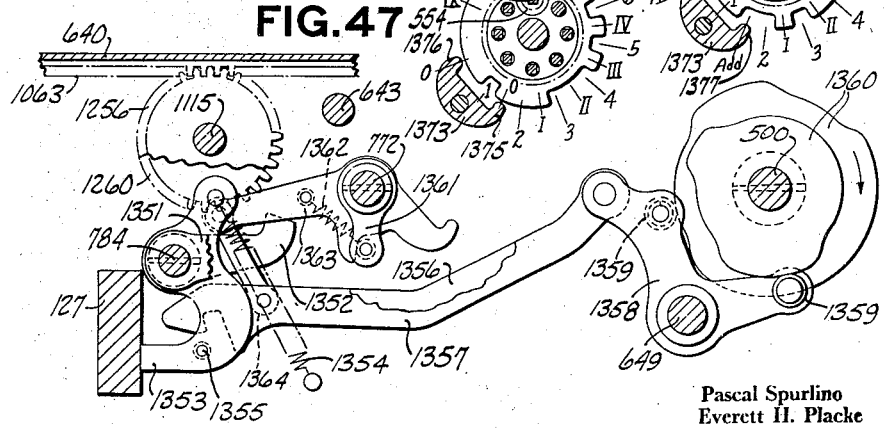

April 10, 1945.　　P. SPURLINO ET AL　　2,373,510
ACCOUNTING MACHINE
Filed Feb. 3, 1942　　30 Sheets-Sheet 19

Pascal Spurlino
Everett H. Placke
Willis E. Eickman
and Arthur G. Kramer
Inventors By Carl Beust
Their Attorney April 10, 1945.  P. SPURLINO ET AL  2,373,510
ACCOUNTING MACHINE
Filed Feb. 3, 1942  30 Sheets-Sheet 20
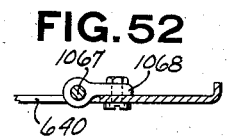
FIG. 52
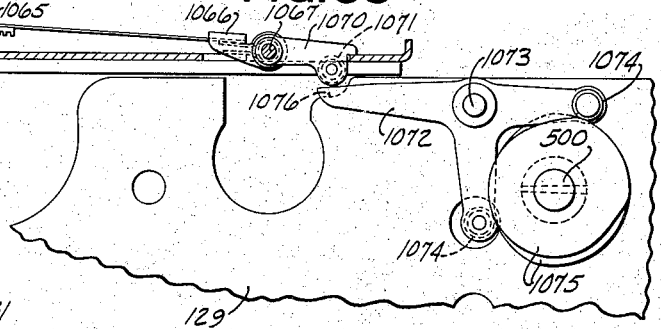
FIG. 53
FIG. 54
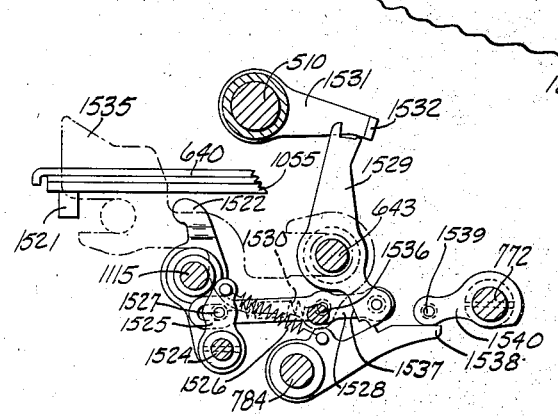
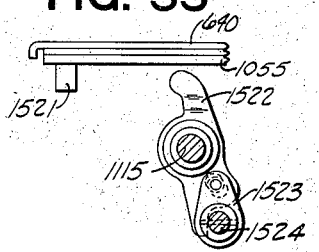
FIG. 55
FIG. 56
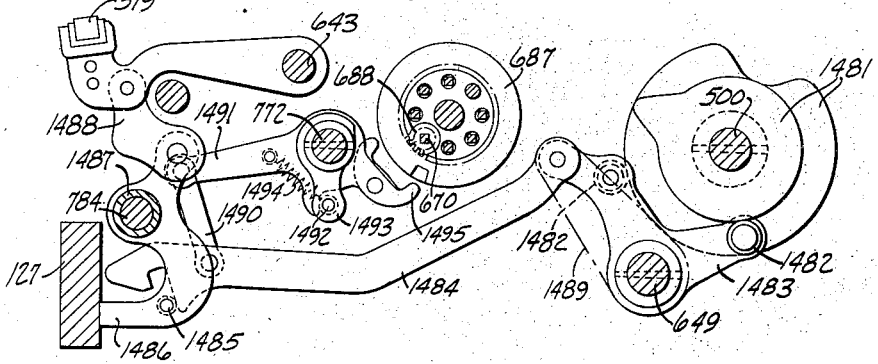
FIG. 57
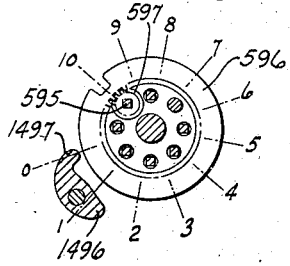
FIG. 58
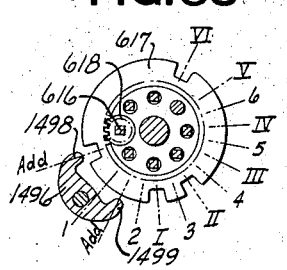
Pascal Spurlino
Everett H. Placke
Willis E. Eickman
and Arthur G. Kramer
Inventors
By Carl Benst
Their Attorney April 10, 1945.  P. SPURLINO ET AL  2,373,510
ACCOUNTING MACHINE
Filed Feb. 3, 1942  30 Sheets-Sheet 21
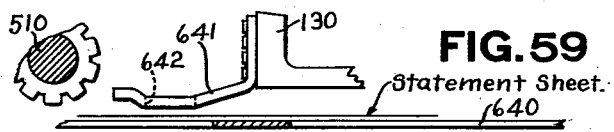
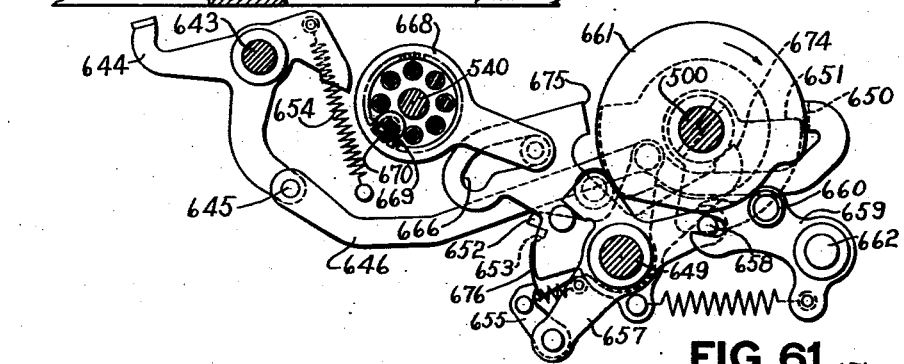
Pascal Spurlino
Everett H. Placke
Willis E. Eickman
and Arthur G. Kramer
Inventors
By Earl Bust
Their Attorney April 10, 1945.  P. SPURLINO ET AL  2,373,510
ACCOUNTING MACHINE
Filed Feb. 3, 1942   30 Sheets-Sheet 22
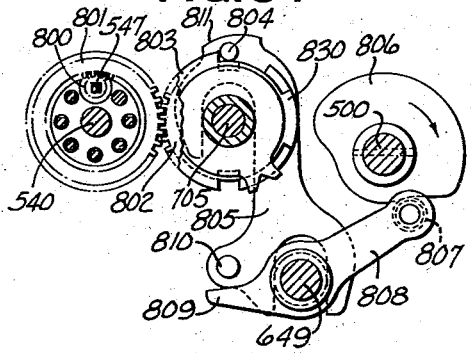
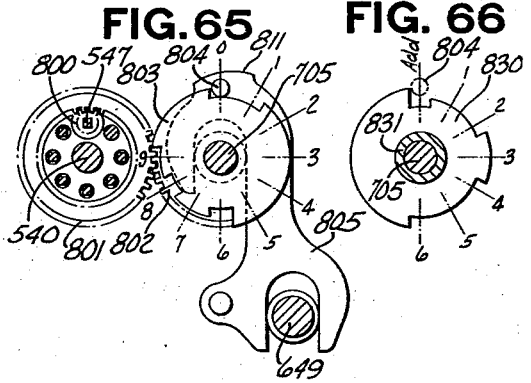
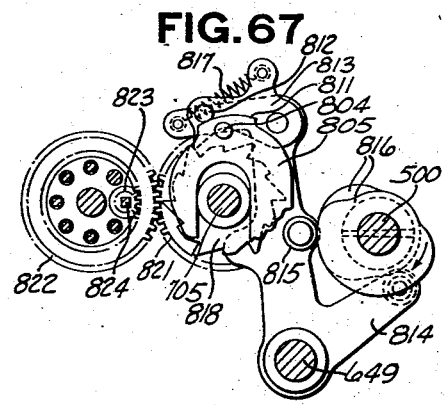
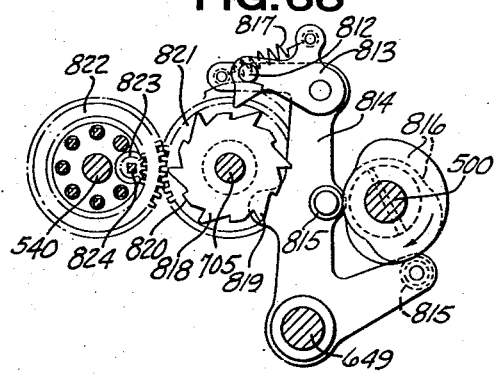
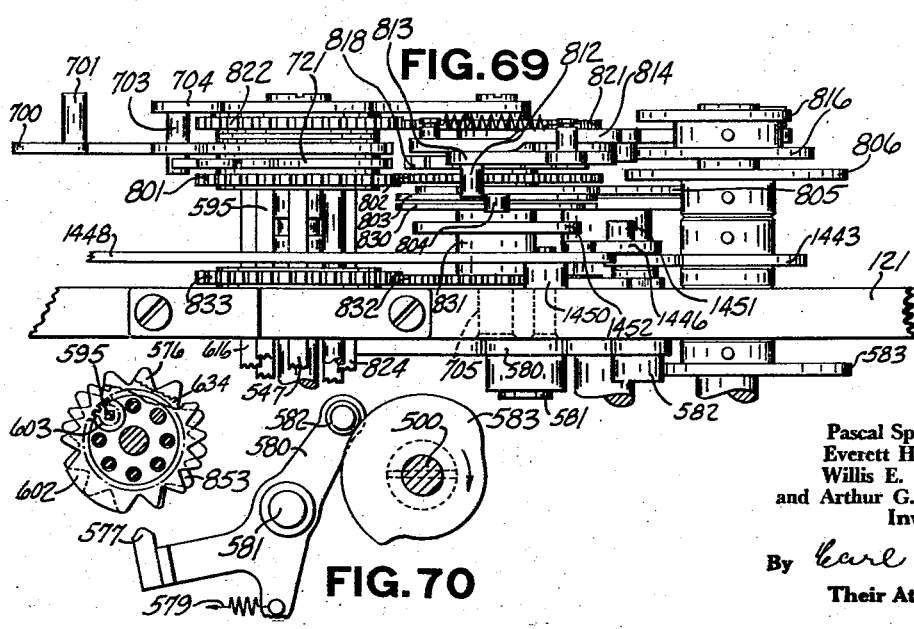
Pascal Spurlino
Everett H. Placke
Willis E. Eickman
and Arthur G. Kramer
Inventors
By Earl Benst
Their Attorney

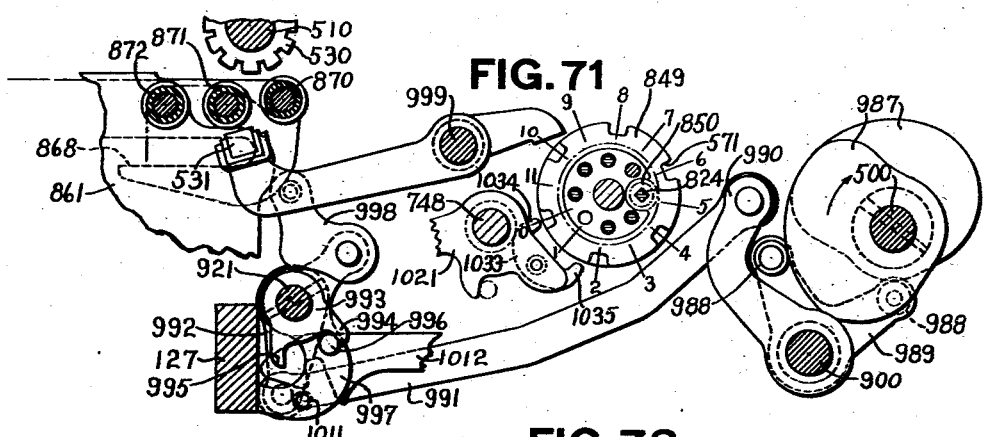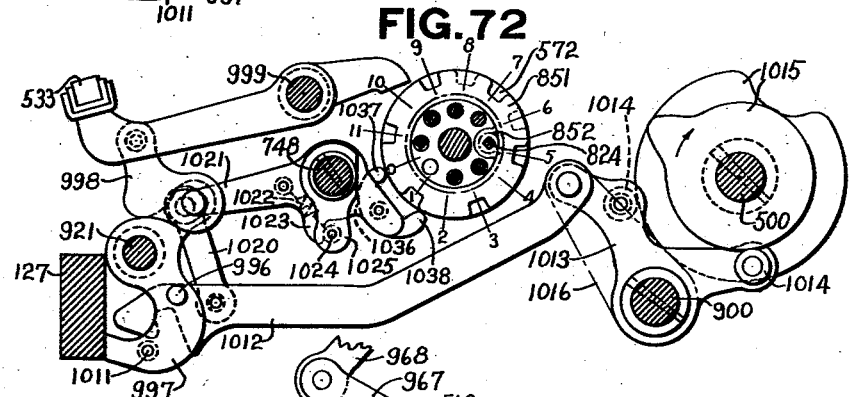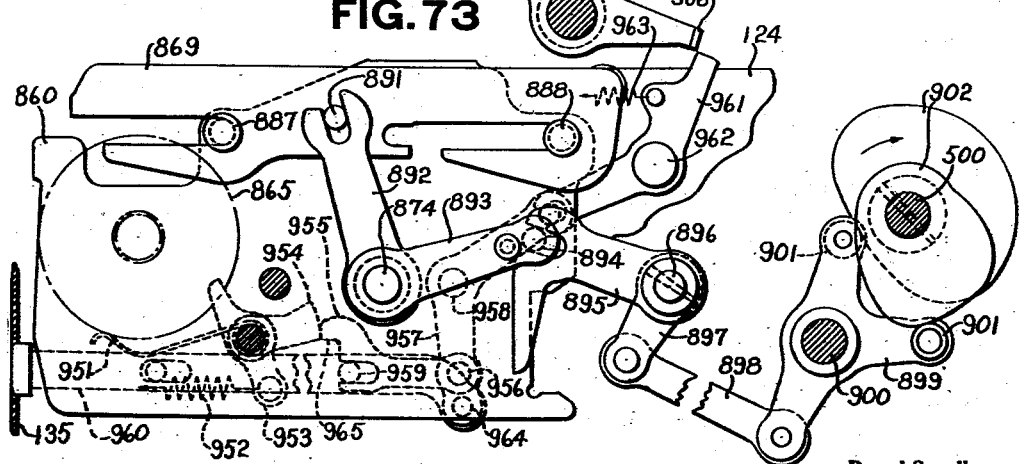

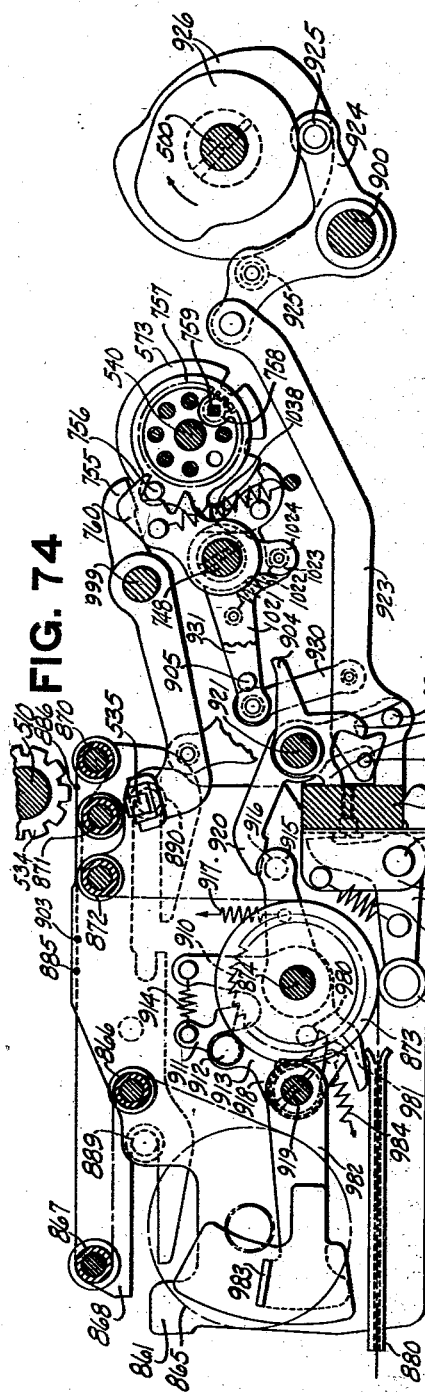

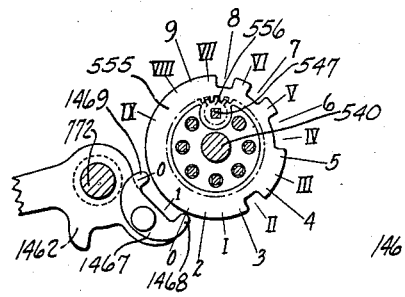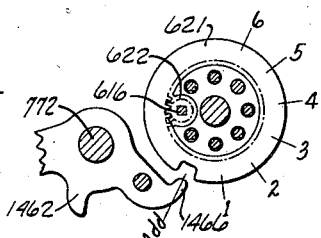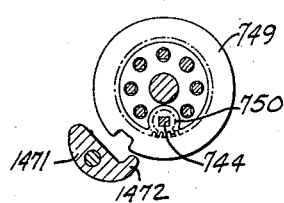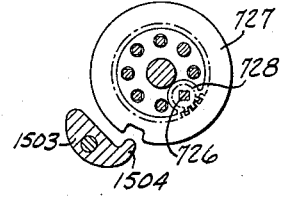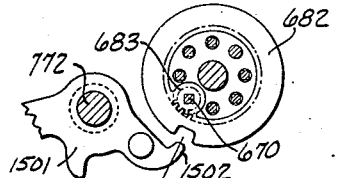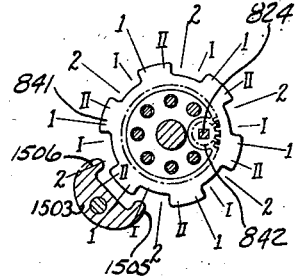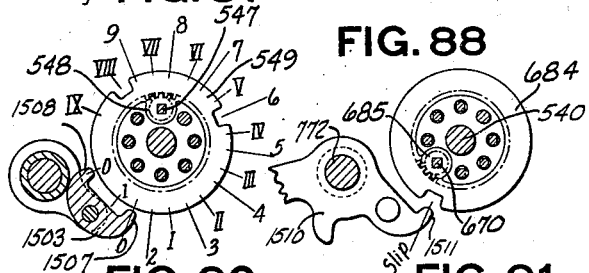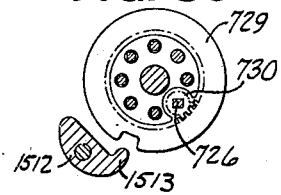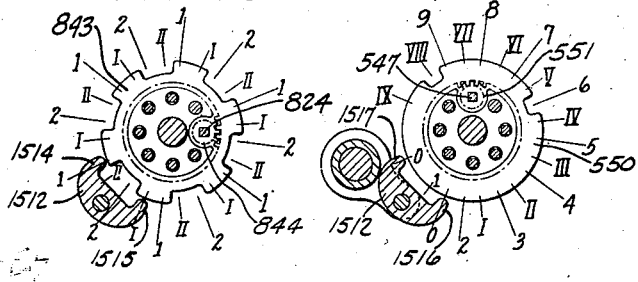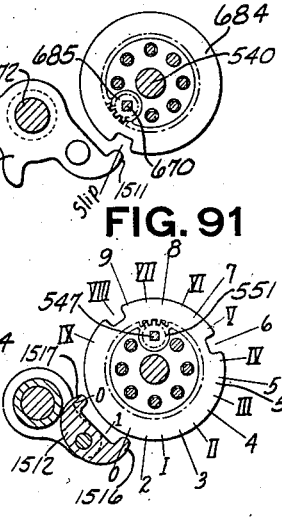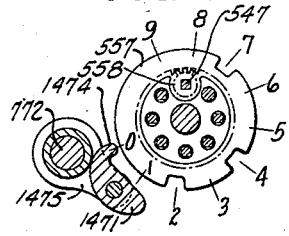

April 10, 1945.  P. SPURLINO ET AL  2,373,510
ACCOUNTING MACHINE
Filed Feb. 3, 1942    30 Sheets-Sheet 26
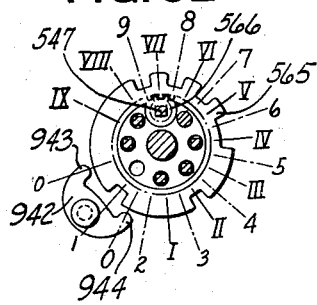
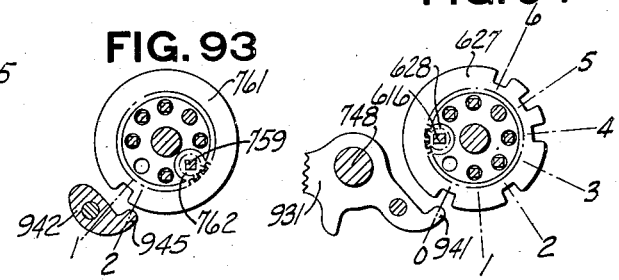
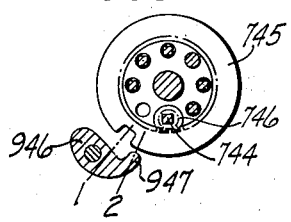
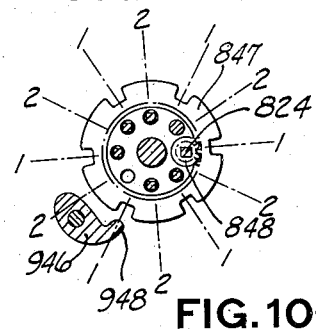
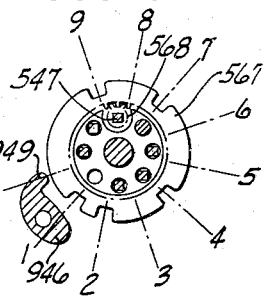
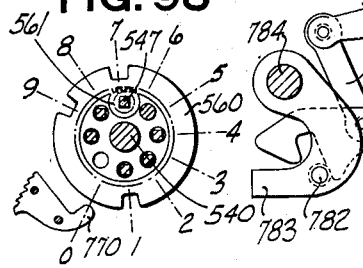
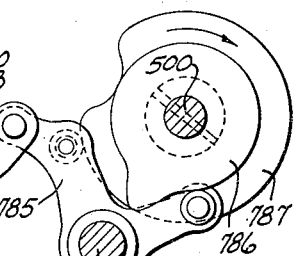
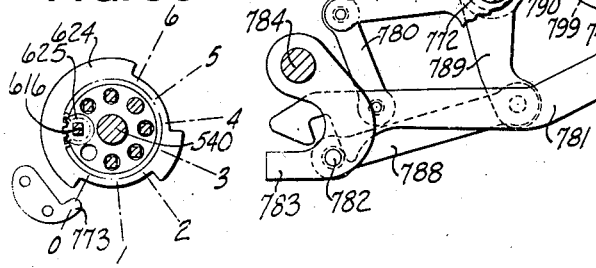
Pascal Spurlino
Everett H. Placke
Willis E. Eickman
and Arthur G. Kramer
Inventors
By Carl Beust
Their Attorney April 10, 1945.   P. SPURLINO ET AL   2,373,510
ACCOUNTING MACHINE
Filed Feb. 3, 1942   30 Sheets-Sheet 27

FIG.102

| DEBITS | | CREDITS | | DATE | BALANCE | |
|---|---|---|---|---|---|---|
| | | BALANCE FORWARD ☞ | | OCT 1-41 | 500.00 | |
| 5.00 | 10.00 | 500.00 | | OCT 12-41 | 985.00 | *2 |
| 10.00 | 6.00 DM | | | | | *3 |
| 5.00 RT. | 50.00 | 1000.00 CM | | OCT 15-41 | 1869.00 | *5 |
| 40.00 | 5.00 | | | | | |
| 2025.00 LS | 2025.00 EC | | | | | |

| | DATE | NO. OF CHECKS | BALANCE. |
|---|---|---|---|
| | OCT 1-41 | | 500.00 * |
| | OCT 12-41 | 2 | 985.00 |
| | OCT 15-41 | 8 | 1869.00 * |

FIG.103

| DEBITS | | CREDITS | | DATE | BALANCE | |
|---|---|---|---|---|---|---|
| | | BALANCE FORWARD ☞ | | OCT 1-41 | 500.00 | *2 |
| 5.00 | 10.00 | 500.00 | | OCT 12-41 | 985.00 | *3 |
| 10.00 | 6.00 DM | | | | | |
| 5.00 RT | 50.00 | 1000.00 CM | | OCT 15-41 | 1869.00 | *5 |
| 40.00 | 5.00 | | | | | |
| 2025.00 LS | 2025.00 EC | | | | | |

| DATE | NO. OF CHECKS |
|---|---|
| OCT 1-41 | |
| OCT 12-41 | 2 |
| OCT 15-41 | 8 |

FIG.104

| DEBITS | | CREDITS | | DATE | BALANCE | |
|---|---|---|---|---|---|---|
| | | BALANCE FORWARD ☞ | | OCT 1-41 | 500.00 | *2 |
| 5.00 | 10.00 | 500.00 | | OCT 12-41 | 985.00 | *3 |
| 10.00 | 6.00 DM | | | | | |
| 5.00 RT | 50.00 | 1000.00 CM. | | OCT 15-41 | 1869.00 | *5 |
| 40.00 | 5.00 | | | | | |
| 2025.00 LS | 2025.00 EC | | | | | |

Pascal Spurlino
Everett H. Placke
Willis E. Eickman
and Arthur G. Kramer
Inventors By *Earl Beust*
Their Attorney April 10, 1945.  P. SPURLINO ET AL  2,373,510
ACCOUNTING MACHINE
Filed Feb. 3, 1942   30 Sheets-Sheet 28

FIG.105

| DEBITS | | CREDITS | | DATE | BALANCE |
|---|---|---|---|---|---|
| | | BALANCE FORWARD | 500.00 | OCT 1-41 | 500.00 |
| 5.00 | 10.00 | | | OCT 12-41 | 985.00 |
| 10.00 | 6.00 DM | | | | |
| 5.00 RT | 50.00 | | | | |
| | 5.00 | 1000.00 CM | | OCT 15-41 | 1869.00 |
| 40.00 | 2025.00 EC | | | | |
| 2025.00 LS | | 50.00 CL | | OCT 20-41 | 116.00 OD |
| 2035.00 LS | | 2126.00 | | | |
| | | 2126.00 EC | | | |
| | | 2125.00 | | OCT 31-41 | 2009.00 |

| CREDITS | DATE | BALANCE | NO. OF CHECKS | DATE | BALANCE | H | T | C | F |
|---|---|---|---|---|---|---|---|---|---|
| BALANCE FORWARD | | | | OCT 1-41 | 500.00 | | | | 12345 |
| 500.00 | | | 2 | OCT 12-41 | 985.00 * | 10 | 12 | 123 | |
| 1000.00 CM | | | 8 | OCT 15-41 | 1869.00 * | | | | |
| 50.00 CL | | | 22 | OCT 20-41 | 116.00 OD* | | | | |
| 2126.00 | | | | | | | | | |
| 2126.00 EC | | | | | | | | | |
| 2125.00 | | | | OCT 31-41 | 2009.00 * | | | | |

FIG.106

| | | | | | |
|---|---|---|---|---|---|
| | 2166.00 * | | | 3675.00 * | 116.00 OD* |
| | | | | | 4863.00 |
| 500.00 | 5.00 | | 10.00 | | |
| 500.00 | 10.00 | | 6.00 DM | | |
| 985.00 | 5.00 RT | | 50.00 | 500.00 | 2 | 985.00 * |
| | 40.00 | | 5.00 | | |
| | 2025.00 LS | | 2025.00 EC | | |
| | 2035.00 LS | | | | |
| 2 | | | | | |
| 8 | 1869.00 | | | 1000.00 CM | 8 | 1869.00 * |
| | | | | 50.00 CL | 22 | 116.00 OD* |
| | 116.00 OD | | | 2126.00 | | |
| | | | | 2126.00 EC | | |
| | | | | 2125.00 | | 2009.00 * |

Pascal Spurlino
Everett H. Placke
Willis E. Eickman
and Arthur G. Kramer
Inventors By *Carl Beust*
Their Attorney April 10, 1945.    P. SPURLINO ET AL    2,373,510
ACCOUNTING MACHINE
Filed Feb. 3, 1942    30 Sheets-Sheet 29

FIG. 107

Pascal Spurlino
Everett H. Placke
Willis E. Eickman
and Arthur G. Kramer
Inventors By Carl Beust
Their Attorney

FIG. 108

| SPACE | 0 | 30 | 60 | 90 | 120 | 150 | 180 | 210 | 240 | 270 | 300 | 330 |
|---|---|---|---|---|---|---|---|---|---|---|---|---|
| 18 Table Positioning (Differential). Cam 1181. Fig.30B. | | | | Table Sets Up. | | | | | | | | |
| 19 Table Liner Selection. Cam 1370. Fig. 44. | | Return 20–40 | | | | | | | | Return Racks. 240 | 325 330 | |
| 20 Table Liner (Controls Ejection of Table). Cam 1360. Fig. 47. | | Out 20–40 | | | | | | | In. 195–215 Out 240 | | 285–300 In. 300–320 | |
| 21 Table Overthrow Backup. Cam 1271. Fig. 43. | | | | | Back Up Table. 180 | | | 200 210 | 240 | | | |
| 22 Feed Pawl Control Roll, 1441. Fig. 51. | | | | | | | | 200 | 240 280 | | | 340 |
| 23 Return of Selection Plate for Table. Roll 1339 on Cam 1340. Fig. 41. | | | | | | | | | Restore 240 280 | | | |
| 24 Table Feed Pawl Control Cams 1340 & 1426. Fig. 50. | Lower Pawl. 0–20 | | | | | | | | Raise Pawl & Eject Table. 315 350 | | | |
| 25 Consecutive Table Feed.(Before Print). Cam 1411. Fig. 48. | | | | | | Feed 140–180 | | Retain 215 240 | | | | |
| 26 Automatic Selection Feed. Cam 816. Figs. 67 & 68. | | | | | | 150 | Back Up. 210 | | | | | |
| 27 Consecutive Table Feed. (After Print). Cam 1443. Fig. 49. | | | | | | | | | Feed 240 290 | 300 345 | | |
| 28 Selecting Drive Plate Restoring Selection. Cam 778. Fig. 100. | Restore 0–40 | | | | | | Select. 185–195 | | | | | |
| 29 Selecting Drive Plate Restoring Cams 786 & 787. Fig. 101. | | | | | | | | | | | 290 320 350 | |
| 30 Line Finding Key Release. Cam 1126. Fig. 34. | Restore Feeler 5–35 | | | | | | | Select. 220 260 | | | Rel Key Rest. 315 335 340 | |
| 31 Automatic Selection Feed Selection. Cam 806. Fig. 64. | Raise Pitman. 0–40 | | | | | | | Select. 210 270 | | | | |

Pascal Spurlino
Everett H. Placke
Willis E. Eickman
and Arthur G. Kramer
Inventors By *Earl Beust*
Their Attorney Patented Apr. 10, 1945

2,373,510

UNITED STATES PATENT OFFICE 2,373,510

ACCOUNTING MACHINE

Pascal Spurlino, Everett H. Placke, Willis E. Eickman, and Arthur G. Kramer, Dayton, Ohio, assignors to The National Cash Register Company, Dayton, Ohio, a corporation of Maryland Application February 3, 1942, Serial No. 429,397

36 Claims. (Cl. 101—93)

The present invention relates to accounting and similar business machines, and in the illustrated form is particularly directed to a machine for registering and recording various types of posting transactions in banks, and also other types of transactions incident to the banking business.

This invention is an improvement over the invention shown in the application of Spurlino, Carroll, Colley, and Kibler, Serial No. 376,670, filed January 30, 1941.

The present invention is embodied in a machine of the general type disclosed in the following United States patents, to which reference may be had for a complete showing and description of standard mechanism not fully disclosed herein: United States Patents No. 1,619,796, No. 1,747,397, and No. 1,761,542, issued, respectively, on March 1, 1927, February 18, 1930, and June 3, 1930, to Bernis M. Shipley; Patent No. 2,175,346, issued on October 10, 1939, to Maximilian M. Goldberg; Patent No. 2,141,332, issued on December 27, 1938, to Charles H. Arnold; and Patent No. 1,693,279, issued on November 27, 1928, to Walter J. Kreider.

The machine embodying the present invention and as illustrated herein is commonly referred to as a "commercial posting" machine or a "bank service" machine and is used by banks and similar business institutions for the posting of individual checking accounts and other types of posting operations incident to the banking business.

It is common practice to post each individual checking account daily, provided said individual accounts remain active every day, and this posting includes the picking up of the old balance; the subtracting of debits, generally in the nature of checks drawn against said account from said old balance; the addition of credits, generally in the nature of deposits to said account; and the performing of a total-taking operation to arrive at a new balance.

While the machine of this invention is arranged for use by banks for the posting of individual checking accounts and the handling of other types of accounts incident to the banking business, it is not the desire to limit the invention to such use, as it is so constructed as to be quite flexible in the various types of functions which it may perform.

One object of this invention is to provide an accounting machine with improved mechanism capable of balancing accounts in an efficient and speedy manner, said balancing including the picking up of old balances, the subtraction of debit items therefrom, the addition of credit items thereto to arrive at new balances, and the transferring of totals for future use.

Another object of this invention is to provide a machine of improved design for use by banks and analogous institutions in the preparation of periodical statements of their customers' accounts.

Another object of this invention is to provide a novel column-printing accounting machine with novel and improved means for selectively printing on the various lines of a statement and/or ledger sheet and at the same time for simultaneously selectively printing on the various lines of an audit or journal sheet.

A still further object of this invention is to provide an accounting machine adapted to record a plurality of different items on the various lines of record material, with novel manually-controlled means to select any desired line of the record material for the recording of the first item, and also to provide novel mechanism for automatically controlling the feeding of the record material to cause a plurality of different items to be recorded on the same line of the record material or a plurality of like items to be recorded on different lines of said record material.

Another object of this invention is to provide a novel manually operable means for setting up a condition whereby both the ledger sheet and the journal sheet or audit strip may be spaced.

Another object of this invention is the provision of a special ejecting key whereby the ledger card may be ejected at any time at the will of the operator.

Another object is to provide means for the indicating of the balances in the machine, whenever desired by the operator, merely by the depression of a key in the total row of keys, whereby the machine is operated to indicate the amount on the crossfooter or balance totalizer.

A still further object of this invention is the provision of novel means for preventing a depression or operation of the overdraft key unless there is an actual overdraft in the machine on the crossfooter.

Another object of this invention is to provide a machine suitable for use in banks in connection with banking systems of all types, which machine can be readily adapted to print upon ledger cards or statement sheets of four different widths.

Another object is to provide a special manually adjustable guide which can be easily and readily set to act as a guide for each of the four various widths of ledger cards.

Another object of this invention is to provide automatically controlled means for controlling the impression hammers in the printer to render certain of the hammers ineffective or inoperable when certain widths of ledger cards are used.

Another object of this invention is to provide a novel mechanism for rendering a certain one of the hammers ineffective at all times except when the operator is using the widest type of ledger card in the machine.

Another and more specific object of this invention is the provision of novel mechanism to permit the operator to prelist in succession a plurality of old balances from a group or groups of cards for the purpose of proof work in the bank.

A still further object of this invention is the provision of new and improved line-selecting mechanism for the statement or ledger sheet.

A still further object of this invention is the provision of a novel latch mechanism to control the driving means for the ledger card table under control of the line-selecting keys.

Another object of this invention is the provision of a novel feeling device to control the actuation of the ledger card table depending upon whether or not there is a ledger card on the table to receive a print.

A further object of this invention is the provision of a special mechanism which permits the operator to place the ledger card or statement sheet on the table either before or after the picking up of the old balance, preparatory to the posting of further items in connection with the particular account recorded on that ledger card.

A further object of this invention is the provision of novel mechanism for positively and definitely alining the ledger card table so as to produce very accurate line selection, whereby the printing of the record is always on the proper line and in the proper space.

A further object of this invention is the provision of novel mechanism for controlling the feeding of the audit sheet or journal under control of the journal deposit hammer.

Another object of this invention is the provision of a novelly-constructed unit of selecting or control disks for the table feed, the journal sheet feed, and the selection and operation of the hammers which cooperate with the ledger sheet and also with the journal sheet.

A further object of this invention is the provision of novel interlocking features throughout the machine in connection with the various controls.

A still further object of this invention is the provision of a novel differential driving mechanism for the ledger card table, which makes for better accuracy and smoother operation of the table.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a perspective view of the machine embodying the present invention.

Fig. 2 is a diagrammatic view of the keyboard of said machine.

Fig. 3 is a diagrammatic view of the indicator, showing the date, the number of checks, and the amounts and types of transactions.

Fig. 4 is a sectional view through the machine, taken to the right of one of the amount banks, showing the differential mechanism associated therewith and the drive from the main drive shaft to the printer drive shaft.

Fig. 5 is a diagrammatic view of the totalizers and the totalizer selecting cams.

Fig. 6 is a section of the machine taken to the right of the first transaction bank of keys, looking toward the left of the machine.

Fig. 9 is a detail view of the overdraft mechanism for the crossfooter on the upper totalizer line.

Fig. 10 shows a view of the overdraft key locking mechanism.

Fig. 11 shows a part of the overdraft control means to prevent release of the machine by the total keys associated with the crossfooter on the upper totalizer line when said crossfooter is in an overdrawn or minus condition.

Fig. 12 shows the remaining part of said overdraft control means of Fig. 11.

Fig. 13 is a detail of the means to restore the overdraft mechanism of Figs. 11 and 12.

Fig. 14 shows portions of the overdraft key retaining and locking detent.

Fig. 15 is a detail of the overdraft latch which controls the machine release mechanism.

Fig. 16 shows the control of the zero stop pawl in the symbol row by the Check correction key and the Deposit correction key of the first transaction bank or row one.

Fig. 17 shows the interlock between the total keys and the Balance pickup and Overdraft pickup keys of row one.

Fig. 18 shows the manually operated means for locking all keys in row one except the Balance pickup and the Overdraft pickup keys.

Fig. 19 shows the releasing means operated by the total keys for releasing the pickup keys in row one.

Fig. 20 shows the means operated by the second, third, seventh, and eighth keys of row one for locking out all of the total keys of the total row.

Fig. 21 is a detail of the manually operated stay-down key means for the keys of the symbol row.

Fig. 22 shows the drive from the total row to set up the appropriate type and to operate the hammer selection, audit strip, and table feed control disk.

Fig. 23 shows the interlock between the machine releasing means and certain sections of the printing mechanism.

Fig. 24 is a plan view, in reduced scale, showing the relations between the machine frames and the printer frames and certain main shafts in the printer.

Fig. 25 is a front view, in reduced scale, showing the relation between the type wheels, the hammers, and the printer frames.

Fig. 26 is a plan view of the statement sheet or ledger table, the gripper means for the statement sheet or ledger sheet, and the relation of the printing hammers to the table.

Fig. 27 is a plan view of a portion of the mechanism between the two left-hand printer frames, with parts thereof broken away.

Fig. 28 is a diagrammatic view of all of the drive shafts for the printer control and selecting disks.

Fig. 29 is a plan view of the line-selecting mechanism and also shows a part of the audit strip or journal sheet feed control.

Figure 30A:
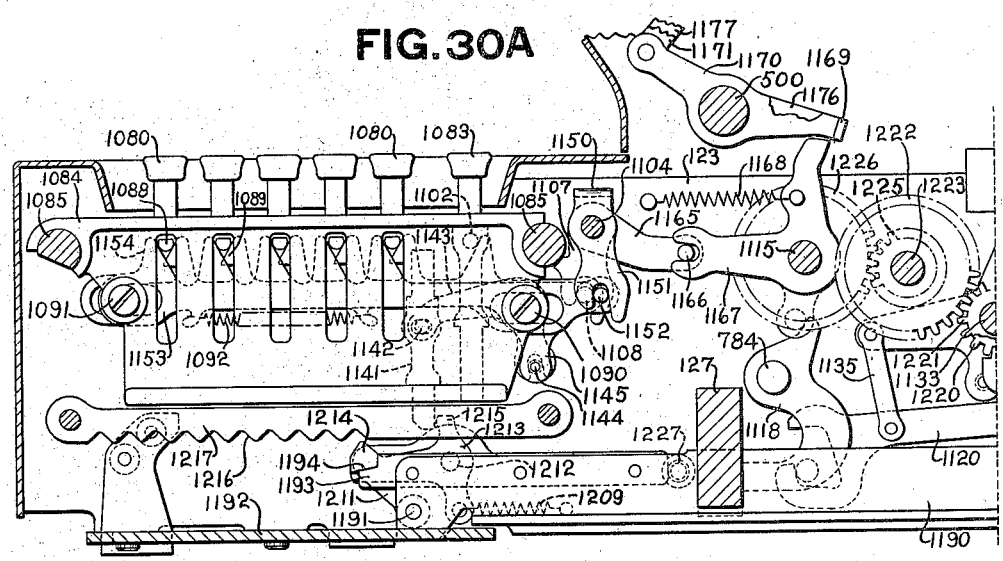
Figure 30B:
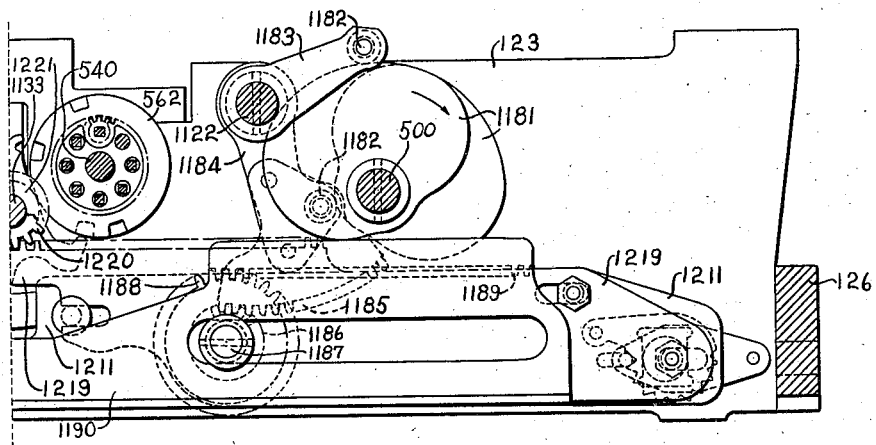

Figs. 30—A and 30—B together constitute a section through the units bank of the line-selecting mechanism for the statement or ledger sheet.

Figure 31:
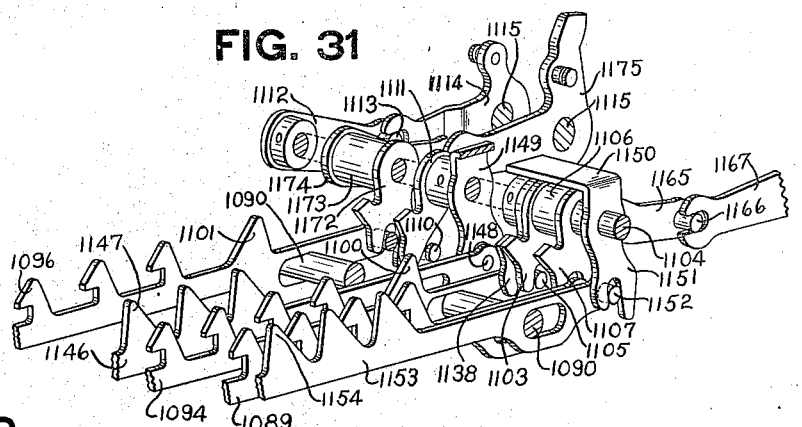

Fig. 31 is a perspective view showing the line-selecting key detents and their associated mechanisms.

Figure 32:
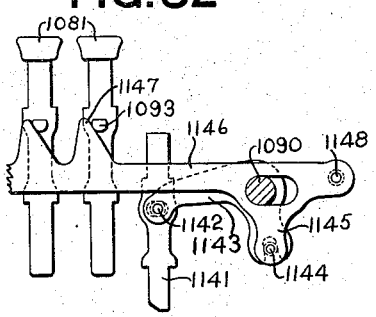

Fig. 32 shows the means for controlling the zero stops in the line-selecting key banks.

Figure 33:
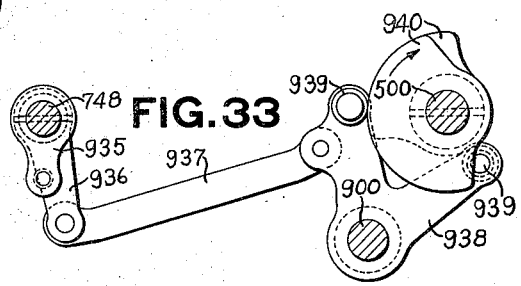

Fig. 33 shows the driving means for the selecting feeler shaft.

Figure 34:
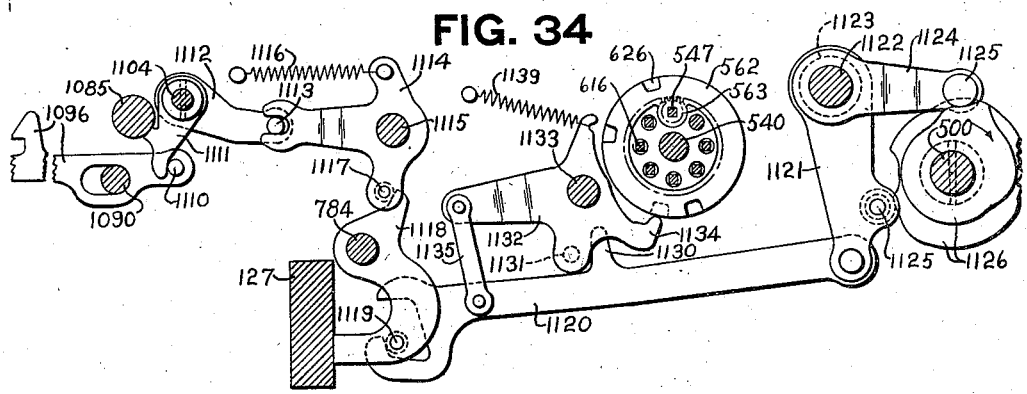

Fig. 34 shows the key-releasing means in the line-selecting banks.

Figure 35:
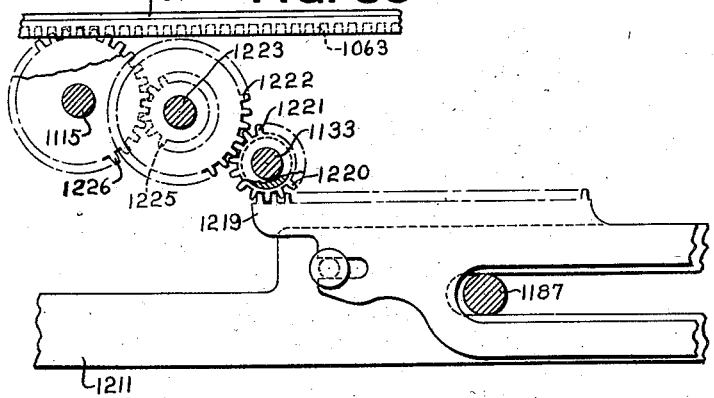

Fig. 35 shows the drive between the units rack of the line-selecting key bank and the ledger sheet table.

Fig. 36 shows the drive between the tens rack of the line-selecting key bank and the ledger sheet table.

Fig. 36A is a detail view of a zero stop means shown in Fig. 36.

Fig. 37 is a front view of the ledger sheet table differential driving means.

Fig. 38 is a front view, in reduced scale, of the line-selecting key banks.

Fig. 39 shows the controlling means for the table driving differential.

Fig. 40 shows the table drive control from the table and also shows the interlock control between the machine release and the table.

Fig. 41 is a detail of a portion of the means for the table-driving differential mechanism.

Fig. 42 is a detail of the means for setting the tension of the table ejecting spring.

Fig. 43 shows the means to take up all lost motion and clearances in the table drive means except when the table is in normal position or when there is no statement sheet on the table.

Fig. 44 shows the table lining means and also the means to release the table for ejecting the statement sheet, and shows the control disks under control of the second transaction bank or symbol row and the correction ejecting control lever.

Figs. 45 and 46 show the remaining control disks, which cooperate with the two disks shown in Fig. 44, to control the lining and ejecting of the table.

Fig. 45 shows the disk controlled by the first transaction bank, and Fig. 46 shows the disk controlled by the total control plate.

Fig. 47 shows the table lining means and its control of the table ejecting means.

Figure 48:
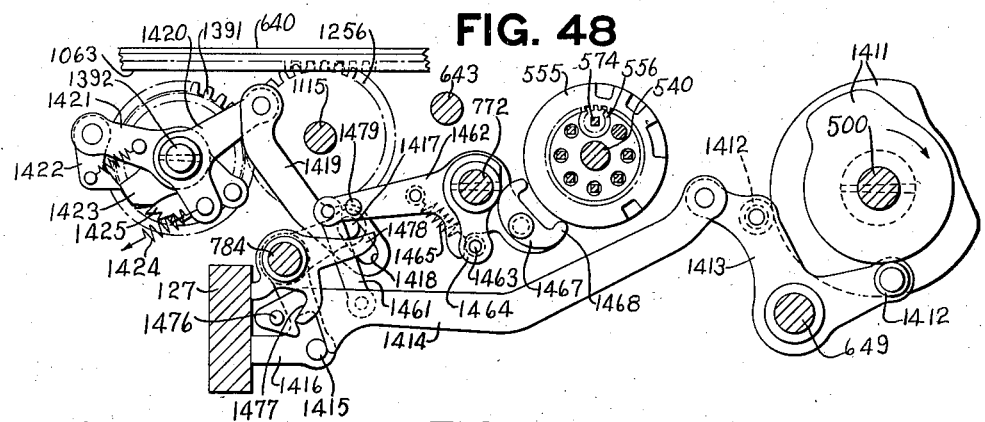

Fig. 48 shows the means for line-spacing or feeding the table step by step before printing.

Figure 49:
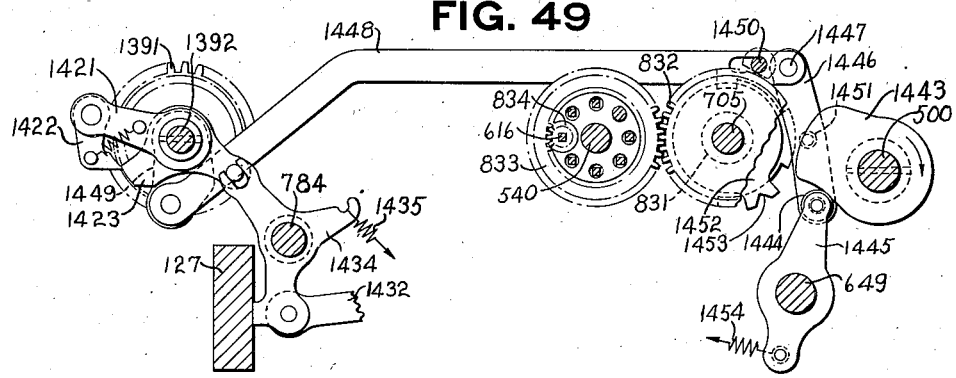

Fig. 49 shows the means for feeding the table step by step after printing.

Figure 50:
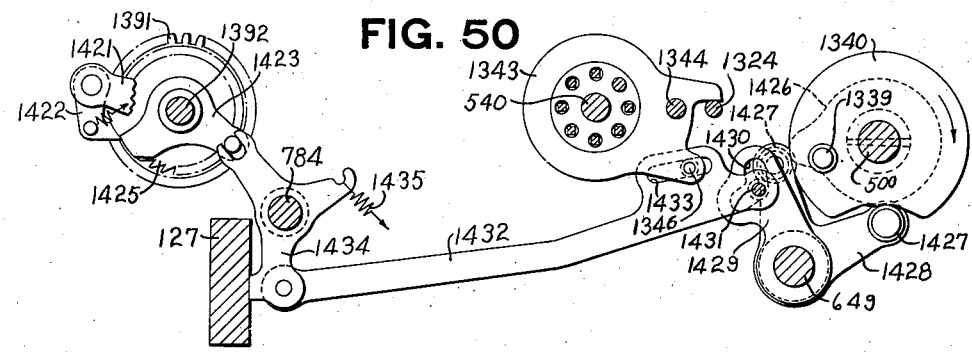

Fig. 50 shows the table feed pawl control means for the step-by-step means.

Figure 51:
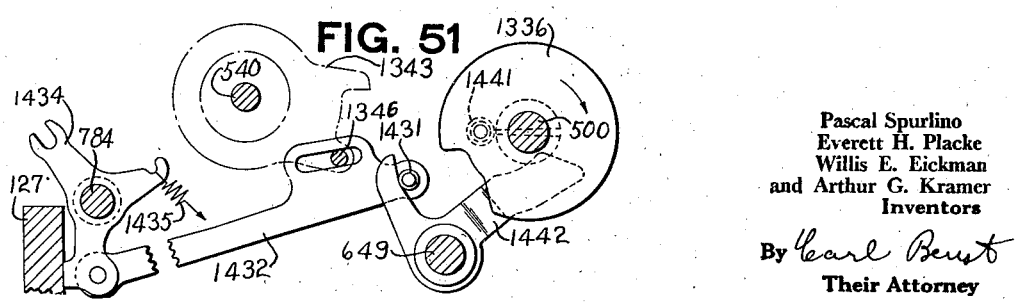

Fig. 51 shows the restoring means for the feed pawl control means.

Fig. 52 shows the bracket to hold the gripper shaft on the table.

Fig. 53 shows the statement sheet gripper operating means.

Fig. 54 shows the "line 39" locking mechanism for the statement sheet and the table.

Fig. 55 is a detail part of the same mechanism.

Fig. 56 shows the hammer-operating mechanism for the statement sheet.

Fig. 57 shows the statement sheet balance hammer selecting disk which is set under control of the symbol row.

Fig. 58 shows the statement sheet balance hammer selecting disk which is set under control of the total plate.

Fig. 59 shows the statement sheet feeler mechanism.

Fig. 60 shows a portion of the statement sheet feeler mechanism in a moved position.

Fig. 61 shows another portion of the statement sheet feeler mechanism in a moved position.

Fig. 62 shows the manual means to control the statement sheet ejection after or on a correction operation.

Fig. 63 shows the manual means for disabling certain of the statement sheet hammers, depending upon the width of the statement sheet being used in the machine at the time.

Fig. 64 shows the feeler means to control the automatic feed of the statement sheet check hammer selecting disk and the table feed disk.

Fig. 65 shows the control disk set under control of the first transaction bank to control the feeler mechanism of Fig. 64.

Fig. 66 shows the control disk set under control of the total plate to control the feeler mechanism of Fig. 64.

Fig. 67 shows the automatic feed for the control disk for the statement sheet check hammer selection and table feed in their normal position.

Fig. 68 shows the same mechanism illustrated in Fig. 67, but in a position ready to feed said disk.

Fig. 69 is a plan view of the mechanisms shown in Figs. 62 to 68 inclusive.

Fig. 70 shows the liner for certain of the selecting disk shafts.

Fig. 71 shows the means for raising and lowering all of the audit strip or journal sheet hammers.

Fig. 72 shows the means for operating all of the audit strip or journal sheet hammers.

Fig. 73 show the audit strip shifting means and the means to lock the machine when the supply roll reaches a predetermined size.

Fig. 74 shows the audit strip or journal sheet feed mechanism and the deposit hammer control of the selecting disk for the journal sheet feed.

Fig. 75 shows the audit strip feed mechanism in a non-feed moved position, showing the audit strip feed feeler in a position to permit operation of the audit strip feed control disk by the deposit or check hammer associated with the audit strip.

Fig. 76 shows a portion of one of the audit strip check hammers and the audit strip feed control disk operating means driven by the check hammers which are associated with the audit strip.

Fig. 77 shows a means to prevent retrograde movement of the audit strip supply roll during the shifting of the audit strip.

Figs. 78 to 83 inclusive are details of the control disk for controlling the step-by-step feed of the table.

Fig. 78 shows the disk controlled by the first transaction bank.

Fig. 79 shows the disk controlled by the audit strip deposit hammer.

Fig. 80 shows the disk controlled by the total plate.

Fig. 81 shows the disk controlled by the audit strip check hammer No. 1.

Fig. 82 shows the disk controlled by the automatic feed mechanism shown in Fig. 67.

Fig. 83 shows the disk controlled by the first transaction bank.

Figs. 84 to 87 inclusive are details of the controlling disks for controlling the operation of the statement sheet check hammer No. 1.

Fig. 84 shows the disk controlled by the statement sheet feeler.

Fig. 85 shows the disk controlled by the manually operated hammer disabling lever of Fig. 62.

Fig. 86 shows the disk controlled by the automatic feed mechanism shown in Fig. 67.

Fig. 87 shows the disk controlled by the first transaction bank.

Figs. 88 to 91 inclusive are details of the control disks for controlling the operations of the statement sheet check hammer No. 2.

Fig. 88 shows a disk controlled by the statement sheet feeler.

Fig. 89 shows the disk controlled by the manually operated hammer disabling lever of Fig. 62.

Fig. 90 shows the disk controlled by the automatic feed mechanism of Fig. 67.

Fig. 91 shows the disk controlled by the first transaction bank.

Figs. 92 to 97 inclusive are details of the disk for controlling the feeding of the audit strip or journal sheet.

Fig. 92 shows the disk controlled by the first transaction bank.

Fig. 93 shows the disk controlled by the audit strip deposit hammer.

Fig. 94 shows the disk controlled by the total control plate.

Fig. 95 shows the disk controlled by the audit strip check hammer No. 1.

Fig. 96 shows the disk controlled by the automatic feed mechanism of Fig. 67.

Fig. 97 shows the disk controlled by the first transaction bank.

Figs. 98 and 99 show the disks to control the restoring of the control disks which are set by the audit strip deposit hammer and the audit strip check hammer No. 1, which themselves assist in controlling the audit strip feed and the statement table feed.

Of these disks, Fig. 98 shows the disk controlled by the first transaction bank.

Fig. 99 shows the disk controlled by the total plate.

Fig. 100 shows the selecting means controlled by the disks of Figs. 98 and 99.

Fig. 101 shows the operating mechanism for restoring the control disks which are set by the audit strip deposit hammer and the audit strip check hammer No. 1 during an operation wherein said disks have been set to assist in the controlling of the feeding of the audit strip and the statement sheet table.

Figs. 102 to 105 inclusive are facsimiles of portions of four different widths of statement sheets or ledger cards which may be used in the present invention.

Fig. 102 shows a portion of the facsimile of the next-to-largest statement sheet printed by the machine, which sheet has duplicate printing of the date and the balance and also has a printed record of the number of checks.

Fig. 103 shows the next-to-smallest statement sheet printed by the machine, which sheet has the date printed in duplicate and also has a print showing the number of checks run through for each transaction.

Fig. 104 shows the smallest statement sheet printed by the machine, which sheet has only one date and one balance print.

Fig. 105 shows the largest statement sheet printed by the machine, which sheet has duplicate date and balance printing, also the print of the number of checks, and in addition to this has an analysis print in the four right-hand columns.

Fig. 106 is a facsimile of a portion of the audit strip or journal sheet.

Figs. 107 and 108 are charts showing the time of operation of various sections of the machine.

Fig. 109 is a detail of the driving means from the symbol bank of keys to the printer selecting and control unit.

Fig. 110 shows the selecting disks controlled by the total row and row 1 to control the old balance pickup hammer for journal sheet printing.

Fig. 111 shows the selecting disks controlled by the total row and row 1 to control the new balance hammer for journal sheet printing.

Fig. 112 shows the selecting disks which control the statement sheet duplicate printing of date, check number and balance, and the analysis print.

Fig. 113 shows the disks controlled by the non-print lever to non-print the statement sheet duplicate date, check number, and balance hammers.

Fig. 114 shows a detail view of a control disk set by the slip feeler to control certain elements of the impression means.

GENERAL DESCRIPTION

The machine embodying the present invention is of the general type disclosed in the Arnold Patent No. 2,141,332, hereinbefore referred to, and, as above mentioned, is an improvement on the machine shown in the above-mentioned Spurlino, Carroll, Colley, and Kibler application.

The machine is provided with a column-printing mechanism located at the front of the machine for simultaneously recording identical data in one or more columns of an insertable statement sheet or ledger card during one operating cycle of the printing mechanism. Machines of this character are useful in the preparation of bills or statements by banks, public utility companies, and the like, said bills or statement being provided with a plurality of vertical columns either for the printing of the same data in the several columns or for the printing of different data in said columns.

Likewise, the statements or bills may be provided with two separate portions containing identical data, one for the customer and one to be retained as a file copy. This is evident from the facsimiles of statement sheets shown in Figs. 102 to 105 inclusive, all of which may be printed on this machine by merely adjusting a guide at the front of the machine to accommodate the various widths of statment sheets.

In the present case, the specific example chosen to illustrate the system used in connection with the machine of this invention is the preparation, by a banking institution, of statement sheets of the individual checking accounts of a plurality of customers of said institution. However, as previously stated, it is not the intention or desire to limit this invention to the banking system outlined above, as it is susceptible of use in connection with many other types of business systems.

The main portion of the machine of this invention is of standard construction well known in this art, and, as this standard mechanism is fully disclosed in the patents referred to at the beginning of this specification, such mechanism will be but briefly treated herein.

The machine chosen to illustrate the present invention is provided with a plurality of rows of amount keys for entering items in the various totalizers with which the machine is equipped and for setting up corresponding type wheels to record the amounts on record material.

The machine also has a row of transaction keys for use in entering positive and negative items in the various totalizers and a row of symbol printing keys for controlling the printing of symbols for identifying various items. Instead of the conventional total lever illustrated in some of the earlier patents mentioned above, this machine is equipped with a row of total keys which control certain elements of the machine for reading and resetting operations.

The machine embodying this invention is provided with an automatic counting mechanism for counting "1" automatically each time a certain item key—in this case the Check key—is depressed in an operation. However, since this check counting mechanism is substantially the same as that shown and described in the above-mentioned Spurlino, Carroll, Colley, and Kibler application, with the exception that it has a higher capacity, it has not been thought necessary to go into any description of the check counting mechanism in this application.

The machine illustrated herein is provided with two totalizer lines; namely, an upper or No. 1 totalizer line and a back or No. 2 totalizer line.

The upper or No. 1 totalizer line supports the balance totalizer, often referred to as a crossfooter, which is used for computing positive and negative amounts to arrive at new balances.

The back or No. 2 totalizer line has thereon four totalizers, two of which are add-subtract totalizers or crossfooters, one being used for keeping a total of the debit or check items and the other for keeping a total of the credit or deposit items. The reason add-subtract totalizers or crossfooters are used for totals of check and deposits is that in deposit correction operations it is necessary to make a subtract operation in order to secure a correct total in case of an error, and in check correction operations it is necessary to make an add operation to correct the error.

One of the adding totalizers on the No. 2 totalizer line is for storing a grand total of positive new balances, and the other adding totalizer on this line is used for storing a grand total of negative new balances. These grand totals are transferred from the balance totalizer to the corresponding adding wheels of the No. 2 totalizer line during new balance operations.

In the present invention, the computations in connection with the posting of individual checking accounts are recorded in some instances on a straight statement sheet and in other instances on a combination statement and ledger sheet. The plain statement sheet is shown in Fig. 104, and the combination statement and ledger sheets are shown in Figs. 102 and 105.

Whenever the bank is using what is known as the dual form, two statment sheets are used, one such as that shown in Fig. 104, which goes to the customer, and another such as that shown in Fig. 103, which is retained by the bank.

When the bank uses what is known as the unit system of posting, it uses the statement sheet shown in Fig. 102 and also in Fig. 105. The only difference between the statement sheets in Figs. 102 and 105 is that on the sheet shown in Fig. 105 there has been provided a space for an analysis of the postings.

All four of the statement sheets are identical so far as the first three left-hand ruled sections of the sheets are concerned. The first section, headed "Debits," is divided into two columns for the entry of checks to be posted against the accounts. The next section, under the heading "Credits," has only one column of printing, in which column are printed all of the deposits. The next section, under the heading "Date and balance," is, as shown, divided into two columns, one column showing the date and the other column being used to receive the printing of the balance.

The ledger sheet shown in Fig. 103, in addition to the three sections just described, has two other sections as shown, one for recording the date and the other for recording the number of check.

The statement sheet of Fig. 102 has three sections, in addition to the three sections shown on the smallest ledger statement sheet of Fig. 104, which are used to record the date, the number of checks, and the balance. In other words, on the statement sheets used by the banks where they have the unit plan, there is a duplicate printing of the date and the balance and also an additional printing showing the number of checks for each posting. This section of the statement sheet may be cut off and the three right-hand columns retained by the bank, and that part of the sheet including the three left-hand sections is sent to the customer. The statement sheet shown in Fig. 105 is like the one shown in Fig. 102, plus the addition of four columns, which are used for an analysis of the posting on this particular statement sheet.

In the illustrated form, the analysis section is divided into four columns, headed "H," "T," "C," and "F."

The "F" column represents the amount of float in even dollars, and the five right-hand banks of amount keys as shown in Fig. 2 are used to set up this amount. The "C" column represents the clearing house checks, and the three banks of keys under the heading "Clearing house checks" of Fig. 2 are used to set up and print this amount. The next, under the "T," represents the transit checks, and the operator uses the two banks of keys under the heading "Transit checks" (Fig. 2) to set up and print the amount of checks in transit. The "H" column represents the time to hold checks to clear on the original bank. This amount of time is printed under control of the banks of keys under the heading "Hold," as shown.

While the three banks of keys in the "Hold" column are more than would ever be used by a bank to record the number of days to hold a check, these three banks of keys may be used in different types of analysis for other purposes, such, for example, as in an analysis where the bank may want to know the number of items which are passing through the bank for a certain period of time, and in that event three banks of keys would not be too large a capacity for such recording.

In printing the number of checks and the amount of the deposits, the ten right-hand rows of amount keys, as shown in Fig. 2, are used. The date is set up to be printed under control of the two extreme left-hand rows of keys of Fig. 2:

that is, as far as the day is concerned. The month and the year are set by a lever at the front of the machine.

The number of checks, of course, in some instances is printed automatically, because, as above stated, there is an automatic check count in this machine. However, in certain instances where large bundles of checks come in and the posting is made as one lump sum—for example, where there might be 22 or 25 checks—then, instead of the check count being automatic, the operator depresses the proper keys, such as 22 or 25 in the columns of keys above the heading "Number of checks" in Fig. 2, to print such number of checks in any particular bundle which is being posted.

From this it can be seen that any particular size of statement sheet, such as that shown in Figs. 102 to 105, may be used in connection with the present invention. All that it is necessary for the operator to do is to set the guide slide on the front of the machine to accommodate the width of statement sheet being used at the particular time.

In addition to the records on the statement sheet, a duplicate recording of all transactions, except the date, takes place on an audit or journal strip, such as that shown in Fig. 106. There are seven vertical printing columns on this journal sheet. The first column at the left is for the recording of the number of checks. The second column records the amount of the pickups, whether it be a balance pick-up or an overdraft pick-up. The next two columns are for the purpose of recording the debits, or the checks or various other items of debit, which are to be posted against any of the accounts. In the next column to the right, which is the fifth column from the left, the amount of the deposit and other credit items are printed. The next column again shows the number of checks, and the final or right-hand column is for recording the balances, which balances at the end of a posting, of course, are considered as new balances.

A horizontally shiftable table, located at the front and left of the machine, is provided for presenting the statement sheets of various widths to the recording mechanism. Each statement sheet is provided with 39 lines, and therefore the table has 39 line positions, corresponding to the number of lines on the sheet, and a normal or home position, which corresponds to the balance forward position on the statement sheet. A full complement of unit line selecting or line finding keys, and three tens keys; namely, 10, 20, and 30, are provided for manually selecting the first line of the statement sheet upon which a recording is to be made. After this initial selection of the desired line, the consecutive feeding of the table and the statement sheet is entirely automatic and is controlled by the transaction keys of row 1 and the keys in the total row.

In a balance forward operation, the old balance is picked up from a previous statement sheet, and, as the Balance forward key has been depressed prior to this operation, the positioning of the table and the statement sheet under the influence of the line finding keys is prevented, and consequently the balance forward item is posted in the line space reserved therefor, which is located just above line No. 1. After the balance forward operation, the No. 1 line finding key is depressed to select the first line of the statement sheet, after which the posting of the account proceeds. As a rule, the debit items or checks are posted first, and it will be noted that the debit section of the statement sheet is divided into two vertical columns and that the first debit item prints in the first or left-hand column and the second prints in the second column and on the same line as the first column, and, if there is a third debit item, this prints on the next line in the first column, and so on, in alternate fashion, until all of the debit items are listed.

Next, the credit or deposit items are listed in the credit section of the statement sheet, and, if there is more than one deposit item, the table automatically line-spaces so that these items are printed in a single column in consecutive order.

After all of the debits and credits have been posted, a new balance operation is performed, in which the recording of the date and the new balance takes place in the balance section of the statement sheet and in the corresponding section of the ledger portion of the sheet when the large sheet is used, as shown in Fig. 102.

All of these operations are also printed on the audit or journal sheet shown in Fig. 106.

In subsequent operations of posting on this account, the line finding keys corresponding to the next available line of the statement sheet are depressed to select the next available line for the entry of the first item. After the entry of this item, the line-spacing of the statement sheet is entirely automatic, with one exception, and that is where the space key of row 1 is used for the purpose of saving space when certain analysis types of postings are being used. This will be explained in detail later on. At the end of a new balance operation, the statement sheet table is returned forwardly to normal or home position, so that the sheet may be removed from the table and a new one placed thereon.

By referring to Fig. 105, it will be noted, as has been previously stated, that the machine as constructed herein is arranged to print on 39 lines of the statement sheet. Immediately after the first item is recorded on the 39th line, the machine is automatically locked to call the operator's attention to the fact that the last line of the statement sheet is being used. If the operator wishes to enter more items on line 39, it is necessary to release the machine by a manual slide at the front of the machine, for each item entered on this line, as the machine will lock automatically after each entry.

The Balance pickup key and the Overdraft pickup key do not, as in past machines, cause the statement sheet to be ejected from the machine, because in the present invention there is provided a locking device whereby the line finding keys may be set up prior to the entry of a balance pickup or an overdraft pickup operation and the statement sheet inserted in the machine at the very beginning of the operation of posting; that is, even prior to the time the operator picks up the balance or picks up the overdraft, as the case may be.

However, the New balance key and the Subtotal key, when depressed, do cause the table to eject the statement sheet. There is another key on the machine called the Eject key, whereby the operator may have the statement card ejected during any machine operation.

On ordinary operations, when the Balance pickup key is used or when the Overdraft pickup key is used, such amount is not printed on the statement sheet, but on the audit or journal sheet only. However, when a new statement sheet is begun, the Balance forward key is depressed, along with the Balance pickup or the Overdraft pickup key, and this amount will be printed in the Balance forward line at the very top of the statement sheet, ahead of the first posting line No. 1.

When an account has been overdrawn, all of the keys except the Overdraft key are locked, and this requires the operator to depress the Overdraft key to ascertain the amount of the overdraft. In other words, in this invention there must actually be an overdraft in the machine before the Overdraft key can be depressed. It is locked against depression at all other times.

The machine is also provided with a locking device which will cause the machine to lock after the entry of the first check or deposit if the operator fails to insert the ledger card against the stops on the table, even though the line-finding key has been depressed. Then, to release the machine after the ledger card is properly inserted on the table, there is provided a special manually operated lever on the table in the front part of the machine, whereby the machine may be released for operation. Also, if the operator has placed a statement sheet in the machine and has not pressed a line finding key, the first item posted will appear in the balance forward line and the machine will be locked to prevent any further operation thereof. Here again the manual lock on the front of the machine must be operated in order to release the machine for the subsequent operation.

There is also provided a manually shiftable member on the table whereby the above-mentioned manually operated lever may be disabled or rendered ineffective when desired, so that the machine will not lock against release. This disabling feature is used when the operator makes a "proof run" on the machine to produce a duplicate of a certain statement sheet on the journal sheet. During such a "run" or series of operations, there will be no statement sheet in the machine; the machine would therefore repeatedly lock against release, due to the absence of the statement sheet; and it would be necessary to operate the manual release lever after each operation in the "run." To eliminate all this extra work, the above-mentioned shiftable member is operated to disable the control effected by the release lock lever.

As has been stated above, the machine is flexible enough so that four different widths of statement sheets may be used, and the guide on the front of the machine is moved to the left or to the right, as the case may be, to correspond to the particular width of statement sheet being used. When the narrower statement sheets are used, it is desirable to disable certain of the hammer or impression mechanisms in the machine so that they will not be operated while the narrow statement sheet is being printed upon, because these particular hammers are used to print on the wider or right-hand section of the wider statement sheet. This particular control of the impression or hammer mechanism is effected by a manually operable lever which is located at the left side of the machine and is accessible to the operator to be moved from one position to another, depending upon the width of the statement sheet which is being printed upon by the machine.

In some banks, the posting machines are also used for listing purposes; that is, they are used to make prelists of old balances of accounts which are to be affected by checks which are to be posted and also deposits which are to be posted. When the machine is so used, the old balance total, plus the total of deposits, minus the total of the checks, would be the figure to which the new balance total should prove after the posting has been completed.

To prelist old balances, the Balance forward key is depressed and locked down with a manually operable lever located just above the symbol row of keys, as shown in Fig. 2. A second manually operable lever, located above row 1, is shifted to the proper position to disable the old balance locking mechanism. This lock is necessary because ordinarily, after a balance pickup or an overdraft operation, another such type of operation cannot be made, due to the various interlocks in the machine.

When listing checks, the operator uses the regular check key in row 1, whereupon the machine prints in columns 3 and 4 on the journal sheet, as shown in Fig. 106. The total is cleared upon depression of the Clear row 1 key in the total row, together with the Check key in row 1. This total will be printed in the third column on the audit or journal sheet. Deposits may be listed through the operation of the Deposit key in row 1, which controls the printing mechanism whereby it prints in the fifth column on the journal sheet, as shown in Fig. 106. After all of the deposits have been listed, the total is cleared upon depression of the Clear row 1 key in conjunction with the Deposit key. This total is also printed in the fifth column on the journal sheet. After these listings, the lever at the top of the symbol row is restored and the Balance forward key is released.

When all of the listings have been completed, the crossfooter is cleared by depression of the New balance N. T. key in the total row. Since the Balance forward key has already been released, the total cleared from the crossfooter is printed in the last or right-hand column of the journal sheet, as shown in Fig. 106. This total represents the difference between the total of the checks and the total of the deposits, or the net change in the control figure, or the difference between the old balances and the new balances after the posting is completed.

All balances are transferred to new forms at the end of each month. This is accomplished by depression of the Balance forward key and movement of a lever above row 2 from normal position, which causes the Balance forward key to stay depressed during several following operations. At the same time, the lever above row 1 is moved from its normal position to disable the old balance lock so that the crossfooter may be used to accumulate a trial balance as the balances are transferred. This lever also prevents any key in row 1 except the Balance pickup key, or the Overdraft pickup key, in case of an overdraft, from being depressed.

During the transfer of these balances from the old cards to the new cards at the beginning of the month, the Balance pickup key is used to release the machine for operation, and this key, together with the Balance forward key, causes the amount set up on the amount keyboard to be printed in both balance columns when the two widest forms are used. During this Balance forward operation, the printer prints in the second column of the journal sheet (Fig. 106). If the controls are set up in groups or units, then, at the end of one unit, the crossfooter will be cleared by depression of the New balance key in the total row, which will cause the unit control to be transferred from the crossfooter to the New balance total. When the last unit is entered, the stored total is cleared, which will represent the general control figure. If the control is carried as only one figure, then the unit totals will not be cleared, but will be sub-totaled upon depression of the Sub-balance key in the total row, and at the end of the entire run the crossfooter will be cleared upon depression of the New balance N. T. key in the total row. This operation clears the crossfooter without transferring the amount to any other totalizer.

Balances may also be transferred to a new form during the posting operations whenever, during a current posting, the line 39 of the statement sheet is reached. When the very first entry that is to be made on line 39 is set up on the keyboard, the machine will be automatically locked, which calls the operator's attention to the fact that postings are being made on this last line. This lock is rendered effective as the table feeds from line 38 to line 39. To release the machine, the operator moves a releasing slide at the front of the machine. Then as many as two checks and one deposit may be made on this line after that, but the machine will lock after each entry, and the operator must release this lock each time. After the third entry is posted, the crossfooter is sub-totaled upon operation of the Sub-balance key in the total row. This sub-total is printed in line 39, and the statement sheet is ejected.

However, since there are additional items to be entered on the same account, an additional sub-total operation prints the "sub-balance forward", on the new form inserted on the table, on the Balance forward line, and automatically advances the form to line 1 for the succeeding posting entries of this operation.

The means for selecting the various columns on the statement sheet to be printed upon and also the various columns of the journal sheet to be printed upon are controlled automatically upon the depression of keys either singly or in combination. There is provided a novel mechanism which cooperates with these keys and which is controlled thereby for controlling the selection of columns on the statement sheet and the journal sheet.

A novel mechanism is also provided for controlling the operation, or non-operation, of several of the hammers or impression mechanisms and devices which cause the printing from the type in the various columns of the statement sheet and the journal sheet.

The machine illustrating the present invention is also provided with novel mechanism for controlling the movement of the statement sheet table to cause the printing on various lines to feed the statement sheet at certain times when necessary. A new and improved statement sheet feeler mechanism is provided to control the actuation of the statement sheet table, depending upon whether or not there is a statement sheet on the table to receive a print.

New and improved alining mechanism for the statement sheet table has been provided to positively and definitely aline the table so as to produce very accurate line printing, whereby the record is always printed on the proper line and in the proper space.

Novel and improved mechanism for controlling the feeding of the audit or journal sheet under the control of the journal sheet deposit hammer is provided for use under certain circumstances.

DETAILED DESCRIPTION

*Framework and operating mechanism*

The main framework of the machine includes that part of the framework which supports the entire printing mechanism, which in the present invention lies immediately below the main differential sections of the machine, plus that part of the framework which supports the main section of the machine.

Referring particularly to Figs. 24 and 25, which are shown more or less diagrammatically in a reduced scale, the printer base 120 has rising therefrom a left printer frame 121, three intermediate printer frames 122, 123, and 124, and a right printer frame 125, tied together at the rear by a tie bar 126 and near the front thereof by a tie bar 127. An additional bar 128 is secured to the frames 121, 122, and 123 at the front ends thereof. An auxiliary frame 129 is secured to the rear tie bar 126 and the tie bar 127. Mounted on top of the printer frames 121 to 125 inclusive is a machine base 130, which supports a left side frame 131 and a right side frame 132, tied together at the front and near the lower end by a tie bar 133, and at the rear edges by a back frame 134.

The machine proper and also the printing mechanism thereof are enclosed in a suitable cabinet 135 (Figs. 1, 4, and 6) having the necessary hinged sections for access to certain parts of the machine by the operator whenever necessary. Certain of these sections will be described later in connection with the printing mechanism of the machine. All of the hinged sections, where necessary, are provided with suitable locks to prevent unauthorized persons from having access to the inner parts of the machine.

Mounted on a pivoted table 136 (Fig. 1), which is hinged to the machine stand (not shown), is a partitioned box 137 to hold checks and deposit slips for the convenience of the operator during posting operations.

Normally the machine is electrically operated by a conventional type of motor, such as that disclosed in the Shipley patents referred to hereinbefore, and, in addition, a hand crank is provided for operating the machine manually when necessary. The well-known electric starting bar used on previous machines, as shown in the Shipley Patents Nos. 1,747,397 and 1,761,542, mentioned at the beginning of this specification, has been omitted from this machine, and, instead, the machine is released for operation by the depression of any one of a plurality of so-called "motorized" or "operating" keys located in the total control row and in the transaction row or row 1. These keys will be explained more in detail later in the specification.

Depression of any of the operating keys releases a key lock or machine release shaft 139 (Figs. 4, 6, 9, 10, 11, 12, and 13) to the action of a spring (not shown), which rocks said shaft a slight distance clockwise to operate the clutch mechanism which connects the driving motor to the main shaft 140 journaled in the machine side frames 131 and 132. The movement of this shaft 139 simultaneously operates the switch mechanism, whch closes the circuit to the motor, thus causing the motor to operate and drive the main drive shaft 140 in the usual manner.

The machine disclosed herein is adapted to make two cycles of operation, one of which is an adding operation, consisting of one rotation of the main shaft 140, and the other of which is a total operation, consisting of two rotations of the main shaft 140, as fully disclosed in the above-mentioned Shipley patents.

After the machine has performed the proper number of cycles to complete the type of operation being executed, the shaft 139 is returned counter-clockwise to disengage the clutch mechanism and simultaneously open the switch to the electric motor. When the machine is manually operated by the use of a hand crank, the operating keys are used for releasing the machine in exactly the same manner as when the machine is operated electrically.

It might be well to state at this point that the present machine is provided with a total control plate 141 (Fig. 22) for controlling the engaging and disengaging movement of the two totalizer lines in adding, subtracting, total printing, and sub-total printing operations. The positioning of the total control plate 141 is controlled by the keys in the total row (Fig. 2) in exactly the same manner as fully illustrated and described in the above-mentioned Goldberg Patent No. 2,175,346, and therefore it is not thought necessary to go into any further description of the control of this plate 141 at this time.

In addition, the control plate is used to control various sections of the printing mechanism, which will be fully described in detail later on in this application.

*Keyboard*

With particular reference to Fig. 2, which is a diagrammatic showing of the keyboard, a full description of the keys of the keyboard and their functions will now be given.

The two left-hand banks of keys, marked "Date," are used for setting up the days of the month to be printed on the statement sheet. The year and the month are set by two levers 148 and 149, respectively, shown in Fig. 1.

The next four rows of keys 151 (Fig. 2), above the heading "No. of checks," are used for setting up the number of checks in any given bundle. The differential mechanisms for these keys are used for automatically counting the number of checks when the checks are posted one at a time.

The next ten rows of amount keys 152 are used for setting up amounts for pickups of balances, the amounts of checks and deposits, and any other desired information used in connection with the banking business, which information is represented by dollars and cents, or any other numbers.

The three right-hand rows of keys 151, under the heading "Hold," are used in analysis operations to set up the number of days which the bank holds the account closed as against outside checks pending their return to the bank of original source. The three banks of keys 151 may be used for other information than the number of days; for instance, where it may be desirable to show by such analysis the number of items which are to be held. This is the reason for having three banks of keys in connection with this analysis entry.

The first two banks of amount keys 152, under the heading "Transit checks," are used to set up the number of transit checks which are going through in connection with certain postings. The next three rows of keys 152, under the heading "Clearing house checks," are used to set up the numbers of checks which are to pass through the clearing house at certain times. The next five rows of amount keys 152, under the heading "Amount," are used to set up the amount of float in dollars, no regard being paid to the decimal point in this analysis float.

The keys 153 in the next or symbol row are used as print keys only, to control the setting of symbols to be printed on the statement sheet and the journal sheet in connection with posting, so that certain information may be had. For example, the "SC" key represents service charge; the "CC" key represents certified check; the "CM" key represents credit memorandum; the "DM" kep represents a debit memorandum; the "LS" key represents list of check; the "RT" key represents return checks; and the "CL" key represents collection.

The "Eject" key is used with the "Space" key of row 1 when it is desired to eject the statement sheet without anything being printed thereon. This is the normal function of the "Eject" key, but it can be used with any key in row 1 to cause the ledger sheet to be ejected at the end of the particular operation represented by the key of row 1 which is depressed. In other words, the only function of the "Eject" key is to cause the statement sheet to be ejected, and the use of this "Eject" key with any of the keys in row 1 will not change the function of the keys in row 1 used, but, as above stated, will only cause the ejection of the statement sheet after the printing has occurred.

The "NC" key represents "no count" and may be used alone or with any key in the same row below the "Eject" key in order to prevent functioning of the automatic check count feature when that feature is not wanted. When the "NC" key is used alone, the symbol "NC" will be printed, but when it is used with either of the keys in the symbol row below the "Eject" key, the symbol of that particular key will be printed and the "NC" will not be printed.

The "Balance forward" key is used with the Balance pickup key of row 1 when balances are transferred from one card to another at the end of the month.

There is actually no key in the "Auto EC" position, enclosed by a dotted circle. However, this is an automatic position and controls the printing mechanism to automatically print the characters "EC," which represent "error correction," when the Deposit correction key or the Check correction key of row 1 is used for the purpose of correcting a deposit entry or a check entry.

The keys 154 to 162 inclusive of row 1 will now be described.

The Overdraft pickup key 154 is used when the account balance to be picked up is an overdraft or debit balance. Amounts entered through this key will add on the subtract side of the crossfooter or totalizer on the upper totalizer line.

The Deposit correction key 155 is used to correct any deposit which might have been entered incorrectly. It controls the machine to cause amounts to be subtracted from the crossfooter or balance totalizer on the upper line and also to cause the amount of this deposit correction to be subtracted from the deposit totalizer, which in this particular machine is a crossfooter. In other words, it selects the minus side of the crossfooter to have that amount added thereto, which takes the amount off the plus side of this deposit crossfooter.

The analysis key 156 is used when it is desired to indicate on the wide form of statement sheet any information in connection with any deposit which contains checks which are to be collected from other banks, such as the number of checks in transit or out-of-city checks, clearing house or other banks in the same city, and also the amount involved. This is a print key, does not cause any totalizer to be selected, and does not affect any of the crossfooters in the machine.

The Deposit key 157 is used when deposits or credits are posted to any and all accounts. Amounts entered through this key will add into the plus side of the balance totalizer on the upper line, as shown by the chart in Fig. 5, and also will add into the plus side of the deposit crossfooter, which is on the back totalizer line.

The Overdraft key 158 is used to unlock the overdraft lock or, in other words, to release the machine when there is an overdraft in the balance totalizer or crossfooter, in which event the New balance key is locked against operation and it becomes necessary to depress first the Overdraft key 158 and then the New balance key in the total row to release the machine.

The Check key 159 is used to post all checks or debits to any and all accounts. Amounts posted through this key are automatically subtracted from the crossfooter on the upper or No. 1 line, because the minus side of this crossfooter is selected by this Check key and also the plus side of the check totalizer, which is a crossfooter, located on the back or No. 2 line, is selected to have added thereinto the amounts of the checks as they are listed.

The Space key 160 is used to space the statement sheet and the journal sheet for any purpose other than a regular posting operation, this being its sole function when used alone. However, when it is used with the Eject key 153 of the symbol row, the statement sheets will be ejected without any printing, which provides for the inspection of the statement sheet for any purpose whatsoever.

The Check correction key 161 is used to correct or take out a check which has been posted incorrectly or posted to the wrong account. Amounts entered through this key will be added to the balance totalizer on row 1 and will be subtracted from the check add-subtract totalizer on row 2.

The Balance pickup key 162 is used in the normal operations of the machine to pick up the old balance from the statement sheet prior to posting operations, and this key, when so used, selects the plus side of the balance totalizer, so that, as the posting continues by the entry of checks and deposits, the final new balance may be taken from this upper crossfooter on line No. 1.

The Balance pickup key 162, as has been mentioned previously, may also be used in connection with the Balance forward key 153 of the symbol row to pick up forward balances from statement sheets at the end of the month to new sheets which are to be used the subsequent or succeeding month.

The keys 163 to 168 inclusive of the total row are used for either total operations or sub-total operations.

The New balance key 163 is used to extend the new balance after all items have been posted. However, if this new balance should be an overdraft, the machine will not be released when the New balance key is depressed, until the Overdraft key 158 has been depressed first.

The Sub-balance key 164 is used to print the balance without clearing it from the crossfooter. When this key is used to print the balance on the last line of the statement sheet, the sheet will be ejected after such printing. When the Sub-balance key 164 is used to print the balance on the "Balance forward" line on the statement sheet, the statement will be spaced automatically to the next line after printing.

The "Indicator balance" key 165 is used to "set" the indicator of Fig. 3 to indicate the balance standing on the crossfooter after items have been posted. This operation does not cause any printing on the statement sheet or the journal, and neither of these two printing media is spaced during an indicating balance operation.

The Sub-total row 1 key 166 is used with the Overdraft pickup key 154, the Deposit key 157, the Check key 159, and the Balance pickup key 162 to read, or take a sub-total, of the accumulations which are on the corresponding totalizers.

Below the keys 163 to 168 of the total row, there is the word "Add" surrounded by a dotted circle. This represents the zero position of the total row, and the differential mechanism associated with these keys will stop in this position on all add operations, as fully illustrated and described in the above-mentioned Goldberg Patent No. 2,175,346. This construction is well known, and it is therefore not thought necessary to go into any description or illustration of the same in this application. For any further information in connection with this mechanism, reference may be had to said Goldberg patent.

Above and slightly to the right of the bank of symbol keys 153 is a lever 169, which, when moved out of its normal position, causes any of the keys 153 to stay down or remain depressed at the end of an operation.

Above and to the right of the keys 154 to 162 of row 1 is a lever 170, which, when moved out of its normal position, disables the old balance lock so that a listing of "Balance forward" items may be made by the machine when the "Balance forward" standing on the end of a card is transferred, at the end of a month, to the "Balance forward" position on a new card, to be used the subsequent month.

When this lever 170 has been moved out of its normal position, all of the keys 155 to 161 inclusive of row 1 are locked against depression, so that only the "Balance pickup" key 162, or the "Overdraft pickup" key 154, in case there is an overdraft of the balance to be forwarded, may be operated during such manipulations of the machine.

In Fig. 1 there is also shown the usual key release lever 171, which is used to release any and all amount keys which have been depressed erroneously, or which have been depressed and which for some reason it is desired to release. This release lever 171 will also release any of the other keys on the keyboard which are not motorized keys.

Amount banks and amount differentials

The ten banks of amount keys and their associated differential mechanisms are alike in every respect and are similar in construction to those shown in the patents to Shipley and Goldberg hereinbefore referred to. Inasmuch as the amount banks are alike, it is believed that a description of one of said banks and the differential mechanism associated therewith will be sufficient.

Fig. 4 is a transverse sectional view of the machine, taken just to the right of one of the amount banks, showing said bank and its associated differential mechanism, which will be considered as representative of all the amount banks.

The amount keys 152 are mounted in a key bank framework 200 supported by rods 201 and 202 extending between the main frames 131 and 132 of the machine. Depression of any one of the amount keys 152 rocks a zero stop pawl 203, associated with that particular denomination, counterclockwise out of the path of a reset spider 204 free on a hub of an amount differential actuator 205 rotatably supported on a bushing 206 extending between two similar support plates 207 (only one shown here), said plates being in turn supported by rods 208 and 209 extending between the main frames 131 and 132. There is a pair of supporting plates 207 for each amount differential, and a tie rod 210 extends through holes in the center of the bushings 206 to secure all of the amount differentials in a compact unit.

A notch in the forward end of the spider 204 engages a stud 211 in a forward extension of a bell crank 212 pivoted on an extension of the actuator 205. Carried by the vertical arm of the bell crank 212 is a stud 213, on which is pivoted an arm 214. The arm 214 is also pivoted to the upper end of a latch 215 pivotally mounted on the actuators 205. The latch 215 has a foot 216, normally held in contact with the periphery of a driving segment 217, just above a shoulder 218 thereon, by means of a spring 219. The driving segment 217 is rotatably supported on the hub of the actuator 205. A link 220 pivotally connects the driving segment 217 to a cam lever 221 pivoted on a stud 222 in the left-hand one of the plates 207, said lever 221 carrying rollers 223 and 224, which coact with the peripheries of cams 225 and 226, respectively, secured on the main shaft 140. Depression of any one of the amount keys 152 moves the lower end thereof into the path of a rounded surface 227 of an extension of the forward arm of the bell crank 212.

In adding operations, the main shaft 140 and the cams 225 and 226 make one clockwise revolution, causing the lever 221 to rock the driving segment 217 first clockwise and then counterclockwise back to normal position, according to the time given in space 1 of the chart (Fig. 107). Clockwise movement of the segment 217 causes the shoulder 218 thereon, in cooperation with the foot 216 of the latch 215, to carry the latter and the amount actuator 205 clockwise in unison, until the rounded surface 227 contacts the stem of the depressed amount key 152. This rocks the bell crank 212 and, through the arm 214, the latch 215 counter-clockwise to disengage the foot 216 of the latch from the shoulder 218 to arrest the clockwise movement of the actuator 205 and to position said actuator according to the value of the depressed amount key 152. Disengagement of the latch 215 moves a rounded extension 233 of the arm 214 into engagement with the corresponding one of a series of locating notches 234 in a plate 235 secured between the rod 208 and an upward extension of the left-hand support plate 207.

After the latch 215 is disengaged from the shoulder 218, an arcuate surface 236 on the segment 217 moves opposite the foot 216 to retain the latch in its set position.

When the lever 221 reaches the terminus of its clockwise movement, a roller 237 carried thereby coacts with an arcuate surface 238 on a beam 239 pivoted on a stud 240 in the actuator 205, and forces a concave surface on the upper edge of said beam into contact with the hub of the actuator 205 to move the rearward end of said beam into a position commensurate with the value of the depressed amount key.

The rearward end of the beam 239 is bifurcated to engage a stud 241 in a link 242, the upper end of which link is pivoted to a segment 243 mounted on one of a series of nested tubes 244 supported by a shaft 245 journaled in the main side frames 131 and 132. The lower end of the link 242 is pivotally connected to a segmental arm 246 free on a shaft 247 journaled in the side frames 131 and 132. The arm 246 carries a stud 248, which engages a camming slot in a zero elimination cam plate 249 pivotally mounted on a stud 250 in a segmental gear 251 free on a shaft 252 journaled in the main side frames.

The teeth of the segmental gear 251 mesh with external teeth of an external-internal ring gear 253 having internal teeth which, in cooperation with the periphery of a disk 254 fixed on a shaft 255, form a rotatable support for said gear 253. The shaft 255 is supported by brackets 256 (Figs. 22 and 25) secured to a cross bar 133 and the main framework of the machine. The bar 133 is secured to the main side frames of the machine. The internal teeth of the ring gear 253 mesh with a pinion 258 rotatably supported in a boring in the disk 254. The pinions 258 and the square shaft 259 in turn drive other pinions, similar to the pinions 258, which mesh with internal teeth of a gear similar to the gear 253, the external teeth of which gears mesh with and drive corresponding denominational type wheels 260 in each row of the column printing mechanism. The column printing mechanism in this case is adapted to print the same data simultaneously on a statement or ledger sheet and a journal sheet, as will be explained more fully hereinafter.

This method of driving the type wheels of the present column printing mechanism is fully explained in the previously mentioned Arnold Patent No. 2,141,332 and embodies an application of the well-known principle of driving mechanism, as disclosed in the above mentioned Kreider Patent No. 1,693,279.

For the purpose of properly alining the differential mechanism and the type wheels set thereby, there is provided on each of the segments 243 a series of notches 271 engaged by an aliner 272 secured to a shaft 273 journaled in the machine side frames.

The aliner 272 is disengaged from the notches 271 during the differential setting of the type wheels, and, after they have been set under control of the amount keys 152 through the differential mechanism, the aliner 272 is again moved into engagement with the notches 271 to aline the type wheels during printing.

The plate 249 (Fig. 4) carries a stud 274, which is engaged by a notch formed in the end of a zero elimination operating slide 275 having parallel slots which engage, respectively, a shaft 276, journaled in brackets 277 secured to the base 130, and a rod 278 supported by arms 279 (only one of which is shown) secured on the shaft 276. A spring 280, tensioned between the arm 246 and the plate 249, normally maintains the lower end of the cam slot in said plate 249 in engagement with the stud 248, as shown here.

Inasmuch as the zero elimination mechanism shown here is similar to and functions precisely like the zero elimination mechanism disclosed in United States Patent No. 2,141,333, issued December 27, 1938, to Charles H. Arnold, it is believed that a brief description of this mechanism, as shown in Fig. 4, will be sufficient.

The zero elimination slide 275 carries a roller 281, which cooperates with an arcuate surface 282 on a slide operating arm 283 free on a shaft 284 journaled in the brackets 277. The arm 283 is connected by a hub free on the shaft 284 to a companion arm 285, which cooperates with a stud 286 in the arm 283 for the next lower denomination. Likewise, the arm 283 for the denomination being described carries a stud 286, which cooperates with the arm 285 for the next higher denomination, and so on. The stud 286 in the arm 283 for the highest denomination cooperates with an arm similar to the arm 285, which is secured to the shaft 284, and said shaft is rocked first clockwise near the beginning of machine operations and back to normal position in the same manner as shown in Fig. 5 of the Arnold patent, last referred to. Clockwise movement of the shaft 284 and the arm 285 for the highest denomination is transmitted through the stud 286 to the arm 285 for said highest denomination, and on down the line through all the denominations to rock the arm 283, shown here, first clockwise to shift the slide 275 rearwardly to disengage the notch in said slide from the stud 274 in the cam plate 249.

Assuming, for example, that a key has been depressed in the amount bank shown in Fig. 4, after the slide 275 therefor has been shifted rearwardly out of engagement with the stud 274 and after the actuator 205 has been positioned under the influence of the depressed key 152, the roller 237 engages the arcuate surface 238 to position the beam 239, the link 242, and the segments 243 and 246 commensurate with the value of said depressed amount keys. Prior to the positioning of the segment 243, as explained above, the aliner 272 is rocked clockwise out of engagement with the notches 271 in the segment 243, and, after said segment is positioned under the influence of the beam 239, said aliner 272 is again engaged with the notches 271 to secure the segments 243 and 246 against displacement.

Positioning of the segment 246 moves an arcuate surface 291 thereon into the path of a roller 292 carried by the arm 283 for this particular denomination. Consequently, return movement forwardly of the slide 275 under the influence of the spring 293 is obstructed, and said slide is retained in its rearward position. The stud 286 in the arm 283 for the denomination shown in Fig. 4 obstructs return movement counter-clockwise of the arm 283 for the next lower denomination, and so on down the line, to hold the slides 275 for all lower denominations in their rearward positions, to retain the notches in said slides out of engagement with the studs 274, so that no movement will be imparted to the cam plate 249 when the shaft 276 and the arms 279 are rocked counter-clockwise and back to normal position, after the segments 246 have been positioned under the influence of the depressed amount keys.

When no key 152 is depressed in the amount bank shown in Fig. 4, or in any of the higher order amount banks, the segment 246 is positioned to zero, as shown here, in which position a clearance portion of said segment is opposite the roller 292. This permits return movement forwardly of the arm 283 and the slide 275, under the influence of the spring 293, to cause the notch in the end of said slide to reengage the stud 274. After the notch in the slide has reengaged the stud 274, counter-clockwise movement is imparted to the shaft 276, the arm 279, and the slide 275 by mechanism similar to that shown in Fig. 4 of the Arnold Patent No. 2,141,333. Counter-clockwise movement of the slide 275 rocks the zero elimination cam plate 249 clockwise, causing the cam slot therein, in cooperation with the stud 248, which is held stationary at this time, to rock the segment 251 counterclockwise against the action of the spring 280 to move the ring gear 253 clockwise from zero position, as shown here, to one position beyond zero, which in this case is a blank or non-printing position. Clockwise movement of the ring gear 253, through the pinions 258, the shaft 259, and other pinions and ring gears (similar to the pinions 258 and the gears 253, respectively) for this particular denomination, moves the type wheels 260 counter-clockwise from zero positions to non-printing positions, so that the zeros will not be in position to print. Obviously, zero printing will be eliminated in a like manner in all higher denominations. In other words, the zero elimination mechanism functions, for example, when a key 152 is depressed only in the fourth amount bank (Fig. 2), to cause zeros to print in the three lower denominations and to eliminate the printing of zeros in the higher denominations.

After the amount differential actuator 205 (Fig. 4) has been positioned under the influence of the depressed amount keys 152, as explained above, the wheels of the selected totalizer are engaged with the corresponding one of two sets of teeth 294 and 295 thereon, after which return movement of the cam lever 221 and the segment 217 causes the arcuate surface 236 on said segment to move beyond the sole of the foot 216 on the latch 215 to permit said latch, under the influence of the spring 219, to drop behind the shoulder 218 and disengage the rounded nose 233 from the notch 234 in the plate 235. At the same time, an enlarged surface on the segment 217 engages a stud 296 carried by the actuator 205 and returns said actuator counter-clockwise in unison with said segment to zero position. This return movement counter-clockwise of the actuator 205 rotates the wheels of the engaged totalizer or totalizers an extent commensurate with the value of the depressed amount key 152 to add or subtract in said totalizer or totalizers the amount represented by the depressed amount key 152.

If no amount key 152 is depressed, the zero stop pawl 203 (Fig. 4) remains in the path of the spider 204 and, therefore upon initial movement of said spider and the actuator 205, the zero stop pawl is engaged by an extension of said spider and breaks the latch 215 in zero position, after which the roller 237, cooperating with the beam 239, positions the segments 243 and 246 and associated mechanism in proportion thereto to position the type wheels 260 for this particular amount bank in zero position.

At the end of any type of operation, the actuator 205 (Fig. 4) is always returned to home position, as shown here; however, the link 242 and the segments 243 and 246, as well as the printing mechanism controlled thereby, remain in their set positions at the end of machine operation and are moved directly from said set positions to their new positions in the succeeding machine operation.

The usual transfer mechanism is provided for transferring digits from lower denominations to higher denominations in adding and subtracting operations.

Indicators

The ring gears 253, driven from the main differentials, and other ring gears to be described later, which are driven under control of the transaction keys, the symbol row of keys, and the date keys, operate gears 297, to which are secured indicators 298 (Fig. 3), so that each transaction, as it is entered into the machine, is visibly displayed to the operator.

Totalizers

As previously explained, the machine embodying this invention has two lines of totalizers, including an upper or No. 1 totalizer line and a back or No. 2 totalizer line. The No. 1 totalizer is a balance totalizer, often referred to as a crossfooter, and comprises denominational sets of plus wheels 300 (Figs. 4 and 5) and denominational sets of minus wheels 301, said plus and minus wheels of each denominational order being reversely geared together, so that, when one wheel is turned in one direction, the other turns in the opposite direction, and vice versa.

The No. 2 or back totalizer line (Figs. 4 and 5) has thereon two add-subtract totalizers, one for storing the amounts represented by the value of the checks and the other for storing totals of the deposits, the add-subtract feature being necessary in each case for check and deposit corrections in case of errors. The add-subtract totalizer for the storing of the check totals comprises adding wheels 302 and subtracting wheels 303 (Fig. 5), which are geared together for reverse movement in exactly the same manner as the No. 1 or balance totalizer wheels, explained above. It should be noted that, in the "check" totalizer, the relative positions of the "add" and "subtract" totalizer wheels 302 and 303 are the reverse of those usually shown in this form of totalizers. This is an expedient employed in the present machine to effect adding into the "check" totalizer when subtracting from the balance totalizer on line No. 1, and to subtract from the "check" totalizer when adding into the balance totalizer of line No. 1 to make corrections. The usual relationship between the plus and minus wheels could have been maintained by a different key arrangement coupled with a corresponding shape of cam 327. However, the present arrangement provides a simpler and easier camming action for shifting the balance totalizer line. The deposit totalizer comprises adding wheels 304 and subtract wheels 305, which are likewise geared together for reverse movement. In addition to the two adding and subtracting totalizers, the No. 2 totalizer line includes a set of adding wheels 306 for the storing of the positive total of the new balances, and a set of adding wheels 307 for the storing of the positive total of the new balances.

In new balance operations, if the balance totalizer contains a plus amount, the plus side of said balance totalizer (wheels 300) will be reset and the amount thereon will be simultaneously transferred to the wheels 306. On the other hand, if the balance totalizer contains a negative amount, the minus side thereof (wheels 301) will be reset and the amount thereon will be transferred to the wheels 307 of the No. 2 totalizer line.

The No. 1 totalizer line and the No. 2 totalizer line are mounted in shiftable frameworks 308 and 309, respectively (Fig. 4), of the type shown and described in the Shipley and Goldberg patents hereinbefore referred to.

The means for engaging the No. 1 totalizer line and the No. 2 totalizer line with and disengaging them from the amount actuators 205 is also fully shown and described in the above-mentioned Shipley and Goldberg patents, as well as in the application of Spurlino et al., Serial No. 376,670, filed January 30, 1941, for accounting machines.

Transfer total mechanism

Inasmuch as it is desirable to transfer amounts from the balance totalizer to a selected one of the two adding totalizers on the No. 2 line in new balance operations, special means is provided to control the engaging and disengaging movement of the No. 2 totalizer line. Such mechanism is fully illustrated in Figs. 12 to 16 inclusive of the above-mentioned Spurlino et al. application, Serial No. 376,670, filed January 30, 1941, for accounting machines, to which reference is hereby made for a complete understanding of this particular mechanism.

The lateral shifting of the No. 1 or balance totalizer to select the plus or the minus side thereof for engagement with the amount actuators is controlled by a shifting cam 326, shown in diagrammatic form in Fig. 5, and the lateral shifting of the No. 2 totalizer line to select the plus or the minus side of the two add-subtract totalizers thereon, as well as the two adding totalizers thereon, is controlled by a shifting cam 327, also shown diagrammatically in Fig. 5. The two shifting cams 326 and 327 are secured in fixed relationship to each other, and the positioning of these two shifting cams is controlled by the transaction keys 154 to 162 inclusive (Fig. 2).

First transaction bank or row 1 and differential mechanism associated therewith The manner in which the cams 326 and 327 are positioned by the differential mechanism associated with the transaction keys is disclosed in the Shipley and Goldberg patents hereinbefore referred to. Therefore, it is believed that a brief description of this mechanism, in connection with Fig. 6, will be sufficient for the purpose of this specification.

All of the transaction keys, except the Overdraft key 158, are motorized or machine-operating keys. The Overdraft key 158 is normally locked against operation and is only released for operation when an overdraft occurs in the balance totalizer on the No. 1 line, and then it is necessary to operate said key in conjunction with one of a certain group of keys in the total row—viz., the New balance key 163, the Sub-balance key 164, the Indicator balance key 165, and the New balance N. T. key 168, which are motorized keys—in order to operate the machine.

All of the transaction keys control the positioning of the transaction differential mechanism shown in Fig. 6. However, only the Deposit key 157, the Deposit correction key 155, the Check key 159, and the Check correction key 161 are effective in check posting operations to select corresponding sides of the two add-subtract totalizers on the No. 2 totalizer line. As explained previously, the two adding totalizers (wheels 306 and 307) on the No. 2 totalizer line for storing the total new balance plus and minus are not engaged with the amount actuators in check posting operations, but are engaged therewith only in new balance operations to store the amount of the new balance. The transaction differential mechanism controlled by the transaction keys, in addition to selecting the totalizers on the No. 2 line corresponding to said keys and the proper side of the balance totalizer for engagement with the amount actuators, also controls the positioning of type wheels for recording characters representative of the type of operation being performed adjacent the amount recorded.

Depression of any one of the transaction keys, except the Overdraft key 158, will project the lower end thereof into the path of movement of means associated with the differential latch 341 to disengage said latch in a position corresponding to the value of the key depressed. This means, as well as the mechanism associated therewith, will now be described.

The drive shaft 140 carries a pair of cams 330 (space 2, Fig. 107), which coact with rollers carried by a Y-shaped lever 331 pivoted on a stud 332 mounted in the left-hand one of a pair of plates 333 (only one of which is shown) supported by rods 208 and 209. The lever 331 is connected by a link 334 to a driving segment 335 rotatably mounted in an old and well-known manner. The forward end of the arm 328 has a slot 336, through which projects a stud 337 in a forward extension of a bell crank 338 pivoted on a differentially adjustable arm 339 freely mounted on the rod 210. Pivotally mounted on the vertical arm of the bell crank 338 is an arm 340, which is also pivoted to the upper end of the latch 341 pivotally mounted on the differentially adjustable arm 339. The latch 341 has a foot 342, normally held in contact with the periphery of the driving segment 335, just above a shoulder 343 thereon, by means of a spring 344.

In adding operations, the main shaft 140 and the cams 330 make one clockwise rotation, causing the lever 331 to rock the driving segment 335 first clockwise and then counter-clockwise back to normal position, according to the time given in space 2 of the chart shown in Fig. 107. Clockwise movement of the segment 335 causes the shoulder 343 thereon, cooperating with the foot 342 of the latch 341, to carry the latter, together with the arms 339 and 328, clockwise in unison, until a rounded surface 345 on the bell crank 338 strikes the lower end of the depressed transaction key. This rocks the bell crank 338 and, through the arm 340, the latch 341 counter-clockwise to disengage the foot 342 from the shoulder 343 to arrest the clockwise movement of the arms 328 and 339 in positions corresponding to the depressed transaction key. Disengagement of the latch 341 moves a rounded extension 346 of the arm 340 into engagement with the corresponding one of a series of locating notches 347 in a plate 299 secured between the rod 208 and an upward extension of the plate 333. This serves to maintain the differentially adjustable arm 339 in its adjusted position.

After the latch 341 is disengaged from the shoulder 343, an arcuate surface 348 on the segment 335 moves opposite the foot 342 to maintain the latch 341 in its set position.

When the lever 331 reaches the terminus of its clockwise movement, a roller 349 carried thereby coacts with an arcuate surface formed on the under side of the usual minimum movement beam 350, pivoted at one end to the differentially adjustable arm 339 and bifurcated at its other end to engage the stud 351 in a link 352, and forces said beam upwardly to position the link 352 in proportion to the position of the transaction key depressed. The upper end of the link 352 is pivoted to a segment 353 secured to one of the tubes 244 on the shaft 245, while the lower end of said link is pivotally connected to a segment arm 354 free on the shaft 247. The segment arm 354 is connected by a link 355 to an arm 356 secured on the shaft 252. Also secured on the shaft 252 is a segment gear 362, which meshes with the external teeth of an external-internal ring gear 357 rotatably mounted on a disk which in turn is supported by the shaft 255. The gear 357 has secured thereto a ring gear 358, which meshes with a pinion 359 secured on a shaft 360 journaled in the bracket 256. Other pinions 359 secured on the shaft 360 drive other internal-external gears similar to the gear 358, which position transaction type wheels located in the different columnar positions of the record material, so that a character indicative of the transaction being performed will be recorded on said record material.

The tube 244 (Fig. 6), which is driven by the gear segment 353, is connected to another segment (not shown), which in turn is connected by a link to the totalizer line positioning cams 326 and 327 (Fig. 5), to cause said cams to be positioned in relation to the depressed transaction keys. The cams 326 and 327 are secured together, so that they move like extents when adjusted as just described.

The numbers from 0 to 9 inclusive, opposite the horizontal lines in the diagrammatic view of the totalizer selecting cams 326 and 327 (Fig. 5), indicate the positions to which these cams are adjusted under control of the various transaction keys. For example, the "1" position (Fig. 5) represents the position which is selected by the Overdraft key 158 when the balance totalizer contains a negative amount. The Overdraft key 158, which arrests the differential in the first position, as described later, is used in conjunction with the New balance key 163, to clear the balance totalizer to record the negative new balance, and to simultaneously transfer said negative new balance to the total new balance minus totalizer 307 (TNB—).

As mentioned before, the Overdraft key 158 is a non-operating key, and it is necessary, when depressing said key, to also depress one of the keys 163—164—165—168 in the total row, in order to release the machine for operation. When this occurs, the Overdraft key 158 controls mechanism to arrest the differential latch associated therewith in the first position to select the minus side (wheel 301) of the balance totalizer on the No. 1 line and the total new balance totalizer (wheels 307) on the No. 2 line (Fig. 5). The means for accomplishing this result will now be described.

Associated with the first transaction bank of keys (Fig. 6) is a detent 385 pivotally mounted on the rod 210. The detent 385 has formed integral therewith an upwardly extending arm 386, which is normally held, by a spring 389, against a stud 387 carried by one arm of the yoke 388. The yoke 388 is pivotally mounted on a rod 390 mounted in the hanger plates. The detent 385 is connected by a link 391 to an arm 392 of the yoke 393 freely mounted on a rod 394 suitably supported in the hanger plates. The yoke 393 is provided with another arm 395, the free end of which normally lies in the path of movement of a lug 396 secured to a plate 397 formed integral with the upper portion of the arm 328. The above-mentioned arm of the yoke 388 is connected by a link 398 to an arm 399 pinned to the machine release shaft 139.

It will be seen from the above that, upon release and clockwise movement of the release shaft 139, the yoke 388 will thereby be rocked counter-clockwise, moving the stud 387 away from the arm 386 of the detent 385. Since the Overdraft key 158 is depressed, its pin 401, cooperating with a lug 400 of the detent 385, prevents the spring 389 from rocking the detent 385 and the yoke 393, whereupon the arm 395 and the lug 396 will stop the differential in the first position to select the minus side (wheel 301) of the balance totalizer. If any one of the transaction keys, except the Overdraft key 158, is depressed, the lug 400 no longer controls the differential, and the spring 389 may then move the detent 385 and the yoke 393 to remove the arm 395 from the path of the lug 396, whereupon the differential latch will be disengaged from the driving segment 335 in a position corresponding to the key depressed, as previously described.

If the machine is operated without any key in the transaction bank being depressed, the differential means will be free to move up to the ninth position before being arrested by a stud (not shown), thus causing the latch to be disengaged in the ninth position.

The means for normally locking the Overdraft key 158 against operation and for releasing said key for operation when an overdraft occurs on the balance totalizer will now be described.

Secured to the side of the higher order wheel 300 (Figs. 7 and 9) on the plus side of the balance totalizer is a disk 402 having a node 403 on its periphery. In subtracting, the balance totalizer is shifted from the position shown in Fig. 7 toward the left, wherein the minus wheel 301 is engaged with the amount differential actuator 205 and is rotated clockwise, which imparts counter-clockwise movement to the plus wheel 300 to rotate the latter reversely as is well known, so that, when an overdraft occurs, the highest order plus wheel passes from 0 to 9. When the plus wheel 300 passes from 0 to 9 on an overdraft, the disk 402 will be rotated counter-clockwise, whereupon the node 403 will coact with a projection 437 formed on an arm 407 to rock the latter clockwise. The arm 407 is secured by a hub 406 to a second arm 405, both of said arms and the hub being supported on a rod 408 (Fig. 9) carried at one end by a hanger plate 329, like the amount hanger plates 207, but for the highest order, and at its other end to a bracket 409 also secured to said plate 329. Carried by the arms 405 and 407 is a rod 410 embraced by an arm 411 secured to a shaft 412 suitably journaled in the left frame 131 and the hanger plate 333. It will thus be seen that both arms 405 and 407 will be rocked clockwise together as a single unit, at which time the rod 410, coacting with the arm 411, will rock the latter and the shaft 412 clockwise. Such clockwise movement of the shaft 412 (Fig. 10) will rock an arm 413 secured thereon clockwise to remove the upper end thereof from beneath a projection 414 on an arm 415 loosely mounted on the rod 390. The arm 415 (Figs. 7 and 10) carries a stud 417 embraced by one arm of a lever 418 loosely mounted on a reset shaft 419 journaled in the frames 131 and 132. The other arm of the lever 418 normally coacts with a stud 420 on a detent 421, to hold the latter against downward movement to render the Overdraft key 158 inoperable when there is no overdraft. The detent 421 is slidably mounted on a stud 422 and is pivoted at its other end to an arm 423 freely mounted on a stud 424, both of the studs 422 and 424 being carried by a frame 425 supported on the rods 201 and 202. When the detent 421 is thus held against downward movement, an inclined projection 426 thereon will coact with the pin 401 on the Overdraft key 158 to prevent depression of the latter.

When an overdraft occurs and the arm 413 (Fig. 10) is rocked clockwise, as described above, to remove the upper end thereof from beneath the projection 414, the arm 415 will thus be freed for clockwise movement and the lever 418 will be released for counter-clockwise movement. The Overdraft key 158 may then be depressed, whereupon its pin 401 will coact with the projection 426 to cam the detent 421 downwardly against the action of a spring 427 and thereby rock the lever 418 counter-clockwise and the arm 415 clockwise against the action of the spring 428.

When the detent 421 is cammed downwardly by the Overdraft key 158, projections 429 and 430 on said detent will be positioned directly below the pins 401 on the Check key 159 and the Deposit key 157, respectively, to prevent depression of any of said keys in conjunction with the Overdraft key 158. After the Overdraft key is returned to its normal undepressed position, the springs 427 and 428 return the detent 421 and its associated parts to their normal positions.

The Overdraft key 158 is held in its normal position by a spring (not shown) in an old and well-known manner and is retained in its depressed position by a spring-urged locking detent 431 (Fig. 14) engaging the pin 401 on said key. The detent 431 is carried by a pair of arms 416 (only one shown) pivotally mounted on the framework 425 in an old and well-known manner. When the Overdraft key 158 is depressed, a hook 432 on the detent 431 retains the key in its depressed position.

To aline the arms 405 and 407, a plunger 433 (Fig. 9) is slidably mounted in a lug 434 on the bracket 409. The upper end of the plunger 433 has a notched head, which engages a stud 435 carried by the arm 405. A spring 436, wound around the plunger 433 and compressed between the lug 434 and the head on the plunger, constantly maintains the latter in engagement with the stud 435. When the arms 405 and 407 are rocked clockwise, the plunger 433 will rock counter-clockwise about its support a distance commensurate with the full extent of clockwise movement imparted to said arms, in which moved position said plunger 433 will retain said arms until the overdraft is removed from the balance totalizer. When the overdraft is removed from the balance totalizer, the totalizer is again shifted toward the left (Fig. 7), if not already in such position, in an old and well-known manner, so as to engage the minus side of the totalizer (wheel 301) when the totalizer is moved into engagement with the amount differential actuators 205. Such shifting of the balance totalizer will again position the disk 402 so that the node 403 thereon will be opposite a projection 437 formed integral with the arm 407. After the balance totalizer has been moved into engagement with the amount differential actuators 205 and the minus wheel 301 is moved counterclockwise thereby, the disk 402 will move clockwise therewith, and since at this time the projection 437 on the arm 407 is in its clockwise (Fig. 9), or overdrawn, position, the node 403 on disk 402 cannot strike the node 437. During the negative balance operation, the minus wheels 301 are all reset to zero and the plus wheels 300 are all set to nine. During the first adding operation following a negative balance operation, the totalizer wheels are shifted to the right (Fig. 7), wherein the node 403 of disk 402 is alined with the projection 404 on arm 405. During this first adding operation following a negative balance operation, the highest order wheel 300 passes from 9 to 0 by reason of the tens transfer mechanisms being tripped across the totalizer. When the highest order plus wheel passes from 9 to 0, the node 403 engages the projection 404 to rock the arms 405 and 407 counter-clockwise back to the position shown in Fig. 9, and, through the rod 410, impart a like movement to the arm 411 and the overdraft shaft 412. Such counter-clockwise movement of the shaft 412 will move the arm 413 counter-clockwise to again position the upper end thereof beneath the projection 414 on the arm 415 to again lock the Overdraft key 158 against operation. When the arms 407 and 405 are thus rocked counter-clockwise, the plunger 433 will be moved toward the right, as viewed in Fig. 9.

If, after an overdraft occurs, an amount is added into the balance totalizer before the balance is taken, which amount is great enough to again change the condition of the balance totalizer from the overdrawn condition to a positive balance condition, the Overdraft key 158 is again locked.

Figure 7:
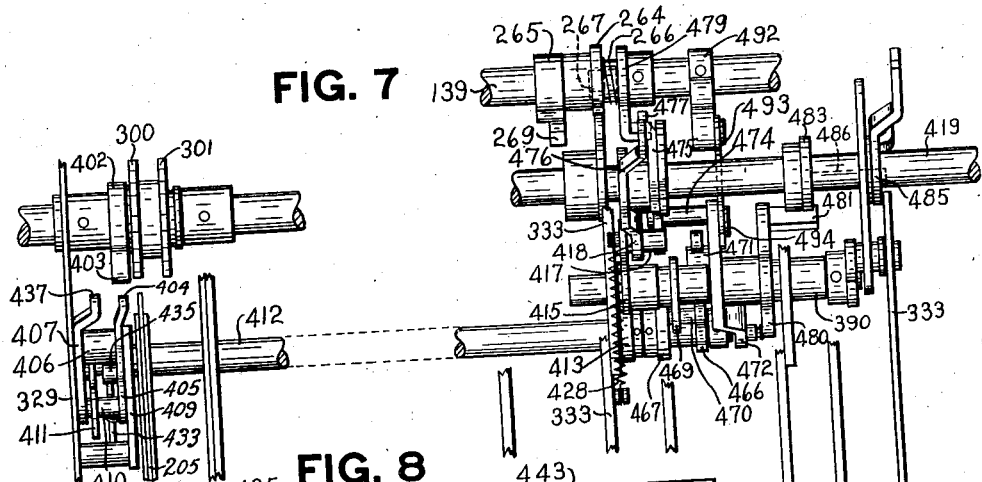
Fig. 7 is a fragmentary front view, showing a portion of the overdraft mechanism and its control over the machine releasing mechanism.

When an amount is added into the balance totalizer, said totalizer is in the position shown in Fig. 7, with the positive wheel 300 in alinement with the actuator 205, and the disk 402 in alinement with the projection 404 of arm 405. When the balance totalizer wheel 300 is engaged with the actuator 205, the node 403 of the disk 402 is in position to engage the projection 404 of arm 405 when the totalizer wheel 300 passes from 9 to 0, at which time the totalizer changes from the overdrawn condition to the positive condition. This engagement rotates the arm 405 in a counter-clockwise direction back into the position shown in Fig. 7. As the arm 405 moves back into such position, the arm 411, the shaft 412, and the arm 413 move counter-clockwise (Fig. 10) to restore the arm 413 into the path of the projection 414 on arm 415, to again lock the Overdraft key 158 against depression.

The usual and well-known fugitive 1 mechanism is operated by shaft 412, when rocked by disk 403, in the manner shown and described in the above-named Goldberg Patent No. 2,175,346, or in the Shipley Patent No. 1,791,907, so that true negative balances may be printed.

By means to be later described, when the Overdraft key 158 is free to be depressed, the machine is locked against release by the New balance key 163, the Sub-balance key 164, the Indicator balance key 165, and the New balance N. T. key 168.

Upon release of the machine by mechanism not illustrated nor described in this case, because it forms no part of this invention, but fully illustrated and described in the above-mentioned Shipley patents, a locking detent 438 (Figs. 8 and 14) engages the pin 401 of the depressed transaction key in row 1, thus holding said key in depressed position until the proper time near the end of the operation of the machine, when the key is released. This locking detent also serves to prevent depression of any of the other transaction keys during an adding operation.

Symbol keys—Differential mechanism associated therewith

The symbol keys 153 (Figs. 1 and 2) control the differential setting of symbol printing type wheels as well as means for controlling the operation of the printing hammers associated with said type wheels. The bank of symbol keys 153 is of substantially the same construction and operates in the same manner as the bank of transaction keys, except that there are eleven symbol keys 153.

Associated with the symbol keys 153 is a differential mechanism which also is of substantially the same construction and operates in the same manner as the differential mechanism heretofore described in connection with the transaction keys, except that said mechanism has eleven different positions of adjustment instead of the usual nine.

Since both the bank of symbol keys 153 and the differential mechanism adjustable under control thereof are substantially like the bank of transaction keys and the differential mechanism associated therewith, which latter has been fully described previously herein, it is not thought necessary to describe the same in connection with the symbol keys 153.

Associated with the differential mechanism for the symbol keys 153 is a link 444 (Fig. 109) corresponding to the link 352 of the transaction bank. This link 444 is pivoted at its lower end to a segment arm 445 secured to the shaft 247. The arm 445 is connected by a link 446 to a gear sector 447 freely mounted on the shaft 252 and meshing with an external-internal ring gear, not shown, but similar to the gear 357 (Fig. 6) of the transaction bank, and controls the differential setting of symbol-printing type wheels in the same manner as the type wheels for the transaction keys are differentially adjusted.

The means by which the symbol keys 153 control mechanism for controlling the operation of the printing hammers associated with the symbol-printing type wheels will be described hereinafter.

The symbol keys 153 are slidably mounted in the frame 448 (Fig. 16), which is supported on the rods 201 and 202. Pivotally mounted on the frame 448 is a zero stop pawl 449, which is normally positioned to arrest the movement of the differential mechanism associated with said bank in the zero position. Slidably mounted on studs 450 and 451 (Figs. 8 and 16), supported in the frame 448, is a slide 452 having projections 453 and 454. The slide 452 is disposed in cooperative relationship with the bank of transaction keys in row 1. For example, when the Check correction key 161 is depressed, its pin 401 will coact with the projection 453 to cam the slide 452 downwardly. When this occurs, a surface 455 on the lower end of the slide 452 coacts with a pin 456 in the zero stop pawl 449 to rock the latter counter-clockwise to an ineffective position, thus allowing the differential mechanism associated with the bank of symbol keys 153 to move up to its eleventh position of adjustment, which corresponds to the automatic error correction position. Likewise, when the Deposit correction key 155 in row 1 is depressed, the pin 401 thereof will coact with the projection 454 to cam the slide 452 downwardly to render the zero stop pawl 449 ineffective and thereby allow the differential mechanism associated therewith to move to automatic error correction position.

Total keys—Differential mechanism

The total keys 163 to 168 (Fig. 2) inclusive are slidably mounted in a frame 443 (Fig. 8) similar to the frame 425 for the transaction keys in row 1. All of the totals keys are motorized or chine-operating keys except the Sub-total row 1 key 166 and the Clear row 1 key 167.

Associated with the bank of total keys 163—168 is the previously-mentioned total control plate 141 (Figs. 17 and 22) for controlling the engaging and disengaging movement of the two totalizer lines in adding, subtracting, totalizing, subtotalizing, and total transfer operations. The positioning of the total control plate 141 is controlled by the above-mentioned bank of total keys. The means by which the total keys control the differential positioning of the total control plate 141 is fully illustrated and described in the above-mentioned Goldberg patent, and reference may be had to said patent for a thorough understanding of this means.

Pivoted to the total control plate 141 (Fig. 22) is a link 457, which is pivoted to one arm of a bell crank 458 loose on the shaft 247. The other arm of the bell crank 458 is connected by a link 459 to a gear sector 460 freely mounted on the shaft 252. The gear sector 460 meshes with an external-internal gear 461 rotatably supported by a disk on the shaft 255 in exactly the same manner as the gear 253 for the amount bank of keys shown in Fig. 4.

The external teeth of the gear 461 mesh with the external teeth of another internal-external gear 462, the internal teeth of which mesh with a pinion which drives a square shaft. The square shaft in turn drives similar pinions meshing with the internal teeth of gears 463 similar to the gear 462, the external teeth of the gears 463 meshing with the teeth of gears 464, the latter in turn meshing with and driving total type wheels 465 into a position corresponding to the position of the total control plate 141, to cause identifying characters to be printed in various columns of the record material (see also Fig. 25).

As previously described, when an overdraft occurs on the balance totalizer, the Overdraft key 158 is thereby rendered operable. However, it is necessary, when depressing the Overdraft key 158, also to depress one of the total keys 163, 164, 165, or 168 in conjunction with the Overdraft key, in order to release the machine for operation. Furthermore, when the balance totalizer is in overdraft condition, it is impossible to release any one of the above-mentioned total keys, until after the Overdraft key 158 is depressed.

The means for compelling depression of the Overdraft key 158 in conjunction with one of the total keys 163, 164, 165, and 168, when an overdraft occurs on the balance totalizer, in order to release the machine for operation by depression of said total key, will now be described.

When an overdraft occurs on the balance totalizer and the overdraft shaft 412 is rocked clockwise, as previously described, a hook-shaped arm 466 (Figs. 12 and 15), loose on the shaft 412, is rocked clockwise also. In order to impart to the arm 466 a greater clockwise movement than that which the shaft 412 receives at this time, an indirect drive between said shaft and said arm is provided, which includes an arm 467 secured to the shaft 412. The arm 467 is bifurcated to engage a pin 468 in another arm 469 free on the rod 390. The arm 469 is bifurcated to engage a pin 470 in the arm 466. The hook portion of the arm 466 is normally engaged with a stud 471 carried by a lever 472 freely mounted on the rod 390. A spring 473 constantly tends to rock the lever 472 counter-clockwise, but is normally prevented from doing so by engagement of the hooked arm 466 with the stud 471. The lever 472 carries a stud 474, which is embraced by an arm 475 freely mounted on the shaft 419. The arm 475 is hubbed to another arm 476 (Figs. 7 and 12) having a surface 477, which is normally out of the path of movement of a lug 478 on an arm 479 secured to the machine release shaft 139.

When the arm 466 is disengaged from the stud 471, the lever 472 is still held against counter-clockwise movement by the spring 473 by means of an arm 480 (Fig. 11), which is hubbed to the lever 472 and carries a square stud 481. A surface 482 on an arm 483, free on the shaft 419, normally engages the square stud 481 to prevent counterclockwise movement of the arm 480 and, consequently, of the lever 472 by the spring 473. A spring 484 normally maintains the arm 483 in cooperative relationship with the stud 481 on the arm 480. Also loosely mounted on the shaft 419 is a lever 485, one arm of which coacts with the under side of a stud 486 in the arm 483, while the other arm is bifurcated to embrace a stud 487 carried by a plate 488 slidably mounted in the total key bank.

Each of the total keys 163 to 168 inclusive carries a stud 489. Upon depression of any one of the total keys 163, 164, 165, and 168, its stud 489 will coact with a cam surface on the plate 488 to cam the latter downwardly against the action of a spring 490. Such downward movement of the plate 488 will rock the lever 485 counter-clockwise, causing the latter to coact with the stud 486 to rock the arm 483 counter-clockwise to disengage the surface 482 thereof from the stud 481. When this occurs, the spring 473 will rock the arm 480 and the lever 472 counter-clockwise. Such counter-clockwise movement of the lever 472 will, through the stud 474, rock the arms 475 and 476 sufficiently clockwise to position the surface 477 on the latter in the path of movement of the lug 478 on the arm 479 to prevent clockwise movement of the last-mentioned arm and the machine release shaft 139 and thus prevent release of the machine for operation. However, if the Overdraft key 158 is first depressed before operation of any one of the total keys 163, 164, 165, and 168, the stud 417 of the arm 415 will be positioned so as to coact with the surface 491 on the arm 475 and prevent any clockwise movement of the arm 475 and the arm 476, thereby permitting clockwise movement of the arm 479 and the shaft 139 to release the machine for operation.

Since the total keys 166 and 167 (Fig. 11) exercise no control over the No. 1 totalizer line, the plate 488 is cut away, so that upon depression of either one of said keys the studs 489 thereon will have no camming action on said plate.

Near the end of the operation, the machine release shaft 139 is given a counter-clockwise movement, as previously described. When this occurs, an arm 492 (Fig. 13), secured to the shaft 139, will, through a pitman 493 and a stud 494 carried by the lever 472, rock the lever 472, as well as the arm 480, sufficiently clockwise to again engage the stud 481 (Fig. 11) with the surface 482 of the arm 483. Upon counter-clockwise movement of the overdraft shaft 412 to its normal position, the hook-shaped arm 466 will again engage the stud 471 on the lever 472.

Symbol keys—Stay-down key control

In the performance of a series of machine operations which are all of the same character, it is desirable to have the symbol key 153 for that particular kind of operation remain depressed until all of said operations have been completed. For example, if a plurality of certified checks are to be entered into the machine, the "CC" symbol key 153 is depressed, and means is operated manually to keep said key depressed until all of said checks have been properly entered into the machine. The means for accomplishing this result will now be described.

The symbol keys 153 are held in their normal positions by springs (not shown) and are retained in depressed position by a spring-urged locking detent 257 (Fig. 21) having thereon hooked projections 261, which cooperate with pins 262 mounted in the symbol keys 153. The detent 257 is carried by a pair of arms (not shown), which in turn are pivotally mounted on the frame 448 in an old and well-known manner.

When a symbol key 153 is depressed, the pin 262 thereon will coact with the proper one of the projections 261 on the detent 257 to cam the latter downwardly until the hook portion of the projection clears the pin 262, whereupon a spring 263 will move the detent 257 upwardly to hook said projection over the pin 262 to retain said key depressed until near the end of the operation.

Near the end of the operation, the shaft 139 and the arm 479 (Figs. 7 and 21) receive a counter-clockwise movement, as previously described. Freely mounted on the shaft 139 is an arm 264 secured by a hub to another arm 265. The arm 479 (Fig. 12) is resiliently connected to the arm 264 by means of a torsion spring 266 wound around the shaft 139, one end of said spring being secured to a stud 267 carried by the arm 479 and the other end of the spring being fastened to a tail 268 formed on the arm 264. When the shaft 139 and the arm 479 are moved counter-clockwise near the end of the operation, the latter will, through the stud 267, the spring 266, and the tail 268, rock the arms 264 and 265 counter-clockwise. As the arm 265 is thus moved counter-clockwise, a projection 269 integral therewith will coact with a surface 270 formed on the upper end of the detent 257 to cam the latter downwardly sufficiently to disengage the hook projection 261 from the pin 262 of the depressed symbol key 153, whereupon said key is returned to its normal undepressed position.

However, when it is desired to have the depressed symbol key 153 remain depressed during subsequent operations of the machine, the lever 169 is manually moved counter-clockwise after the symbol key is depressed. The lever 169 is pivotally mounted on a stud 287, carried by the frame 448, and carries a stud 288 engaged by an arm 289 free on the shaft 419. When the lever 169 is manually rocked counter-clockwise, it will, through the stud 288, rock the arm 289 clockwise to position a surface 290 thereon in the path of movement of the arm 264. It will thus be seen that, when the shaft 139 and the arm 479 are rocked counter-clockwise near the end of each operation, the surface 290 on the arm 289 will coact with the free end of the arm 264 to prevent counter-clockwise movement of the latter, as well as the arm 265. Consequently, the locking detent 257 will not be moved downwardly to release the depressed symbol key 153. The depressed symbol key 153 will remain depressed until the lever 169 is manually moved clockwise to its home position, thereby removing the surface 290 of the arm 289 from the path of movement of the arm 264. When this has been accomplished, the depressed key 153 will be returned to its normal undepressed position near the end of the operation.

The present machine is arranged so that immediately after performance of an old balance pickup operation or an overdraft pickup operation, the Balance pickup key 162 and the Overdraft pickup key 154 will be locked against operation until the New balance key 163 is depressed to complete the posting of an individual checking account. With such an arrangement, a certain definite series of machine operations may be easily followed in the posting of each checking account. Means for accomplishing this result will now be described.

Associated with the transaction bank of keys in row 1 is a locking bar 310 (Fig. 17) carried by a pair of arms 311 and 312 pivoted to the frame 425. The bar 310 has formed integral therewith upwardly extending projections 313 and 314, which, in the normal position, are located in the path of movement of the pins 401 on the Overdraft pickup key 154 and the Balance pickup key 162, respectively (Fig. 2), thereby rendering said keys inoperable.

Manually operable means is provided for releasing the Overdraft pickup key 154 and the Balance pickup key 162 for operation. This means includes the lever 170, which is pivotally mounted on a stud 315 (Figs. 17 and 18) in the frame 425. Also associated with the transaction bank of keys in row 1 is another locking bar 316, one end of which is pivoted to the lower arm of the lever 170 and the other end of which is pivoted to an arm 317 free on a stud 318 in the frame 425. Formed integral with the upper side of the bar 316 are a plurality of projections 319, which are adapted to be moved into the path of movement of the pin 401 on the Deposit correction key 155, the Analysis key 156, the Deposits key 157, the Check key 159, the Space key 160, and the Check correction key 161. The bar 316 has formed on the under side thereof a lug 320, which is adapted to coact with a stud 321 on the bar 310. To release the Overdraft pickup key 154 and the Balance pickup key 162, the lever 170 is manually moved clockwise to move the bar 316 downwardly, thereby positioning the projections 319 thereon beneath the pins 401 to render the keys 155, 156, 157, 159, 160, and 161 inoperable. Upon the downward movement of the bar 316, the lug 320 coacts with the stud 321 to move the bar 310 downwardly, against the action of a spring 322, to remove the projections 313 and 314 out of the path of movement of the pins 401 on the Overdraft pickup key 154 and the Balance pickup key 162 to render said keys operable. It will be seen from the foregoing that, when the last two mentioned keys are thus released for operation, the keys 155, 156, 157, 159, 160, and 161 are at the same time locked against operation.

As previously mentioned, when a new balance operation is performed, the Overdraft pickup key 154 and the Balance pickup key 162 are rendered operable for the next operation of the machine preparatory to posting a new checking account. The manner in which this is accomplished will now be described.

The total control plate 141 is shown in its add position, as viewed in Fig. 17. The plate 141 is provided with an irregularly shaped cam slot 323 coacting with the roller 324 carried by an arm 325 freely mounted on the rod 390. Loosely mounted on the shaft 419 is a lever 364, the lower arm of which is bifurcated to engage the roller 324, while the upper arm of said lever coacts with a stud 365 carried by the arm 311.

When the New balance key 163 is depressed and the total control plate 141 (Fig. 17) is rocked clockwise to a position corresponding to said key, the roller 324 will be moved by the cam slot 323, which will rock the lever 364 counter-clockwise, at which time the upper end of said lever will coact with the stud 365 to rock the arm 311 clockwise, thereby moving the bar 310 downwardly to render the Overdraft pickup key 164 and the Balance pickup key 162 operable. Since the total control plate 141 remains in its adjusted position until the next operation of the machine, the Overdraft pickup key 154 and the Balance pickup key 162 will thus remain operable for said next operation. However, if no total key is depressed in the total row, the total control plate 141 will, upon the next operation of the machine, return to its normal add position, as shown in Fig. 17, whereupon the Overdraft pickup key 154 and the Balance pickup key 162 will again be locked against operation.

If, on the other hand, the New balance N. T. key 168 in the total row is depressed, means is controlled thereby for releasing the Overdraft pickup key 154 and the Balance pickup key 162 for the next operation, just as is done when the New balance key 163 is depressed. Depression of the New balance N. T. key 168 will control the clockwise movement of the total control plate 141, so that the extreme left-hand end of the cam slot 323 will act on the roller 324, thus rocking the lever 364 counter-clockwise to move the locking bar 310 downwardly to render the Overdraft pickup key 154 and the Balance pickup key 162 operable in connection with the next operation of the machine. Upon the next operation of the machine, if no key in the total row is depressed, the total control plate 141 will return to its normal add position, as viewed in Fig. 17, which will in turn cause the locking bar 310 to return to its normal effective position.

Figure 8:
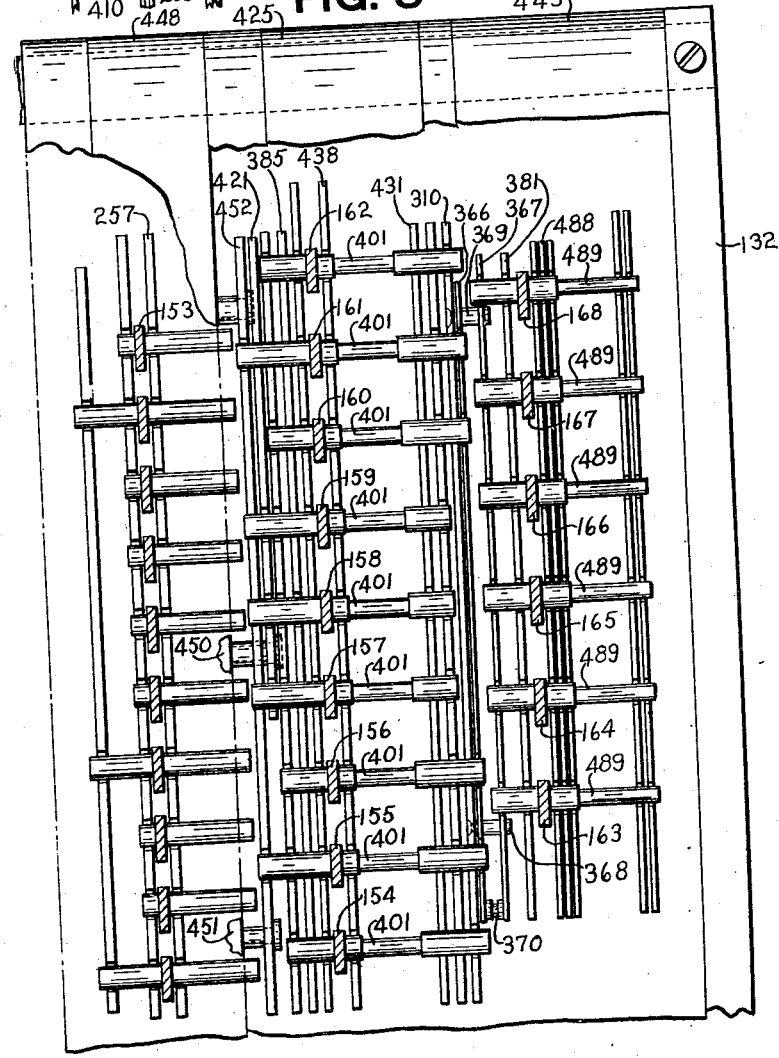
Fig. 8 is a diagrammatic view showing the relation of the detents in the total control row, the first transaction row of keys, and the symbol row of keys.

Means is provided in connection with the transaction keys for locking all of the total keys 163–168 in the total row against operation whenever one of the Deposit correction key 155, the Analysis key 156, the Space key 160, and the Check correction key 161 in row 1 is depressed. This means includes a control bar 336 and a latch bar 367 (Fig. 20) both slidably mounted on studs 368 and 369 carried by the locking bar 310 (Fig. 17). The bars 366 and 367 are secured together at their lower ends by a pin 370 (Figs. 8 and 17). Formed integral with the upper side of the bar 366 is a plurality of camming surfaces 378, each associated with a different one of the pins 401 on the keys 155, 156, 160, and 161. Depression of any one of the last-mentioned keys will cause the pin 401 thereon to coact with its appropriate surface 378 on the bar 366 to cam the latter, together with the bar 367, downwardly, against the action of a spring 379, to position a plurality of projections 380 on the bar 367 in the path of movement of the studs 489 on all of the keys 163 to 168 inclusive in the total row, to prevent operation of any one of said last-mentioned keys.

As previously mentioned herein, only the New balance key 163 and the New balance N. T. key 168 in the total row control the positioning of the total control plate 141 (Fig. 17) so that the latter will render the locking bar 310 ineffective and thus make the Overdraft pickup key 154 and the Balance pickup key 162 operable for the next operation of the machine. However, when it is desired to take either a total or a sub-total from the balance totalizers on the No. 1 totalizer line, it is necessary to depress either the Sub-total row 1 key 166 or the Clear row 1 key 167 in the total row. It will be recalled that neither of the last two mentioned keys is motorized or a machine operating key. Means is provided under control of the last-mentioned keys for moving the latch bar locking bar 310 to ineffective position and rendering the Overdraft pickup key 154 and the Balance pickup key 162 operable in connection with the Sub-total row 1 key 166 or the Clear row 1 key 167, to release the machine for operation. This means includes a control bar 381 (Fig. 19) slidably mounted on a pair of studs 382 and 383 carried by the total key frame 443. The lower end of the bar 381 is bifurcated to engage a stud 384 carried by a lever 439 free on the rod 208. The lever 439 is provided with a surface 440, which is adapted to coact with the stud 441 on the arm 312. When either the Sub-total row 1 key 166 or the Clear row 1 key 167 is depressed, the stud 489 will coact with one of a plurality of projections 442 formed integral with the control bar 381 to cam the latter downwardly against the action of a spring 495, thus rocking the lever 439 counter-clockwise. Upon such counter-clockwise movement of the lever 439, the surface 440 will coact with the stud 441 to rock the arm 312 clockwise, thus moving the locking bar 310 downwardly and removing the projections 313 and 314 out of the path of movement of the pins 401 on the Balance pickup key 162 and the Ovedraft pickup key 154, respectively, thereby rendering the latter operable.

It will be seen from Fig. 19 that the control bar 381 will be rocked downwardly through the depression of any of the total keys 163 to 168 inclusive. This may be explained by the fact that the bar 381 exercises a certain control over means for throwing off a check counting mechanism, which is shown and described in the above-mentioned application of Spurlino et al., Serial No. 376,670, filed January 30, 1941, for accounting machines, and forms no part of the present invention.

PRINTER

*Printer drive from main cam shaft of the machine*

The printing mechanism of this machine receives its motion from a printer cam or drive shaft 500 (Fig. 4) which in turn is driven from the main cam shaft 140 of the machine.

However, as has been previously mentioned, the cam shaft 140, during adding operations, receives one complete cycle or rotation and during totalizing or sub-totaling operations it receives two cycles or rotations. However, it is necessary that the printer be disabled during the first cycle of all total and sub-total operations, and therefore the drive from the main cam shaft 140 to the printer cam shaft 500 is accomplished by a clutch device which is old and well known in this art, and consists of generally a driving pawl and a driven member which in this particular application are not shown. For a full disclosure of a clutch type drive substantially the same as that used in the present machine, reference may be had to the application for United States letters patent of Everett H. Placke, Serial No. 384,930, filed March 24, 1941. The general type of this clutch is also quite similar to that shown, and works upon the same principle as that in the previously mentioned Shipley Patent No. 1,619,796, issued on March 1, 1927.

Therefore, only a portion of the drive mechanism from the main cam shaft 140 to the printer cam shaft 500 has been shown, and this is illustrated in dot and dash lines in Fig. 4.

Secured to the shaft 500 is a gear 501, meshing with a gear 502, mounted on a stud 503, carried by an auxiliary frame or plate 504, which is mounted to the base 130 and the right side frame 132. Meshing with the gear 502 is a gear 505, secured to a short shaft 506 in axial alinement with the main cam shaft 140.

The above mentioned clutch device for driving the shaft 506 by the shaft 140 is located between the plate 504 and the right side frame 132, and as above mentioned, consists of a driving pawl which is carried by a plate (not shown) secured to the main cam shaft 140. The driven member is secured to the shaft 506, and this pawl is adapted to be disengaged from the driven member at the very beginning of the first cycle of a two-cycle total or sub-total operation and again engaged with the driven member at the beginning of the second cycle of a total or sub-total operation in the manner described in the above mentioned application and patent.

Type wheels and hammers

It is felt that a general description of the type wheels and hammers given at this point will aid in a better understanding of the printer selecting and control unit. However, no attempt will be made to give any description of the operation or selection of the hammers or type wheels under this general heading.

In Fig. 25, which is a reduced scale drawing, the type wheels and hammers have been shown more or less diagrammatically and it is in connection with this particular figure that this general description will be given.

In this figure the type wheels are shown in groups with relation to the hammer which prints from these groups.

All of the type wheels are mounted on a shaft 510 supported by the five brackets 256, all of which are secured to the tie bar 133 and the base 130.

Beginning at the left-hand side of Fig. 25, a group of type wheels 512 cooperates with a hammer 513 to print amounts and symbols in the left-hand check column on the statement sheet (Figs. 102 to 105); a group of type wheels 514 cooperates with a hammer 515 to print amounts and symbols in the right-hand check column on the statement sheet; a group of type wheels 516 cooperates with a hammer 517 to print amounts and symbols in the deposit or credit column of the statement sheet; a group of type wheels 518 cooperates with a hammer 519 to print the date adjacent the deposits; and a group of type wheels 520 cooperates with a hammer 521 to print balance forwards, new balances, and symbols in the left-hand balance column on the statement sheet shown in Fig. 105. When the statement sheets shown in Figs. 102, 103, and 104 are used, printing is made in the three left-hand sections of Figs. 102 and 103 and in all the sections of Fig. 104 by this group of type wheels 512 to 520 and hammers 513 to 521.

A group of type wheels 522 cooperates with a hammer 523 to print dates and numbers of checks adjacent each other on the statement sheets shown in Figs. 102, 103 and 105; a group of type wheels 524 cooperates with a hammer 525 to print old and new balances and symbols in the right-hand column of Fig. 102 and the right-hand balance column of Fig. 105; and a group of type wheels 526 cooperates with a hammer 527 to print an analysis in the four right-hand columns of Fig. 105.

A group of type wheels 528 cooperates with a hammer 529 to print check numbers, old balances, and symbols in the two left-hand columns of the journal sheet of Fig. 106; a group of type wheels 530 cooperates with a hammer 531 to print the amounts of checks and symbols and also the totals of checks in the third column of the journal sheet; a group of type wheels 532 cooperates with a hammer 533 to print amounts of checks and symbols in the fourth column of the journal sheet; a group of type wheels 534 cooperates with a hammer 535 to print credits and symbols and totals of credits in the fifth column of the journal sheet; and a group of type wheels 536 cooperates with a hammer 537 to print the number of checks, the new balances, and the symbols in the two right-hand columns on the journal sheet.

The symbol type in the various groups above described are set by the symbol row of keys 153 in a manner substantially the same as the manner in which the transaction type wheels 361 are set. The year and month date wheels are set by the year and month levers 148 and 149 previously described, and the days of the months are set by the keys 150.

The selection and operation of the hammers 513 to 537 will be hereinafter described in detail under various headings.

Printer selecting and control unit

The printer selecting and control unit includes a group of square shafts, each having thereon a pinion driven by the internal teeth of an internal-external gear. There are, of course, several of these internal-external gears, and this general driving mechanism is substantially like that shown in the previously mentioned Kreider Patent No. 1,693,279.

These internal-external gears are distributed at various points along the group of shafts, and also carried by these various square shafts are many pinions which mesh with internal gear teeth of selecting and control disks to drive the disks to select various units in the printer and to control the operation of those various units, such as the table feeding mechanism, which table supports the statement sheet; the statement sheet hammers, which include the two check hammers, the date and deposit hammer, and the balance hammer; the two check hammers, the deposit and date hammer, and the balance hammer associated with the journal sheet; and the control of the feeding of the journal sheet and various other features within the printing mechanism, all of which will be fully described later in this application.

This printer selecting and control unit is shown particularly in Figs. 27, 28, 29, 69 and 112. Fig. 28 shows the unit in a diagrammatic form. The unit has running through the center thereof, as a supporting means, a shaft 540, which is supported by the printer frames 121 to 125 inclusive.

The control disks and the internal-external gears of this printer selecting and control unit are driven from nine different sources, each of which will be specifically described under a heading suitable for the particular source from which that drive originates.

Selecting and control unit drive from first transaction bank or row 1

By referring to Fig. 6 it will be remembered that the shaft 252 is differentially positioned by the first transaction bank differential mechanism under control of the keys 154 to 162 inclusive.

Secured to this shaft 252 is a segment gear 541 meshing with a pinion 542, to which is secured a gear 543. The pinion 542 and gear 543 are pivoted on a stud 544, carried by the base 130. This gear 543 meshes with the external teeth of a ring gear 545, the internal teeth of which mesh with a pinion 546 on a square shaft 547.

From the above it can be seen that the square shaft 547 will be differentially positioned according to the differential positioning of the keys 154 to 162 of the first transaction bank.

This shaft 547 carries several other pinions like the pinion 546, to differentially position several other selecting and controlling disks throughout the width of the machine. These selecting disks and their function will now be described.

The first transaction bank or row 1 effects a control over the statement sheet check hammer 513, and to accomplish this the shaft 547 carries a pinion 548 (Fig. 87) meshing with internal teeth on a control disk 549, which has notches in two positions thereof which notches are set into controlling positions under control of the Check key 159 and the Check correction key 161. On both check operations and check correction operations this disk 549 may be called upon to effect a control of the operation of the statement sheet check hammer 513.

The first transaction bank or row 1 also effects the control over the statement sheet check hammer 515 through the medium of a control disk 550 having internal teeth driven by a pinion 551 (Figs. 91 and 27) on the square shaft 547. This disk 550 has control notches in the sixth and the eighth positions, which correspond to the Check and the Check correction keys 159 and 161, respectively, of row one.

The statement sheet deposit hammer 517 (Fig. 27) is also controlled by a disk 552 driven from the row one shaft 547, through a pinion (not shown) on this shaft 547. This disk 552 has selecting notches in the second and fourth positions to correspond with the Deposit correction key 155 and the Deposit key 157 of row 1.

Row 1 also affects the alining of the statement sheet table and the ejection thereof under certain conditions, and to control this alining and ejection from row 1 there is provided a control disk 553 (Figs. 27 and 45) driven from a pinion 554 on the row 1 shaft 547.

This disk 553 has notches in all of its posititons except the second and eighth to cooperate with an upper feeler finger, later described, and notches in the second and eighth positions to cooperate with the lower feeler finger, since all of the keys 154 to 162 inclusive of row 1 have a controlling effect on the alining of the table or the ejection of the table in certain types of operations.

The statement sheet table feed is also controlled by the keys of row 1, through the medium of a disk 555 (Figs. 29 and 78), driven by a pinion 556 on the row 1 shaft 547. This disk has selecting notches in the second, fourth, sixth, seventh and eighth positions, to correspond to and be controlled by the keys 155, 157, 159, 160 and 161. The sixth, seventh and eighth notches are for the top feeler finger, later described, and the second and fourth notches are for the lower feeler.

This first transaction bank also sets up another disk 557 (Figs. 29 and 83) which is driven by a pinion 558 on the first transaction shaft 547 to assist in the controlling of the table feed. This disk 557 has selecting or control notches in the second, fourth and seventh positions, to correspond to the keys 155, 157 and 160 of row 1.

The statement sheet table drive is also controlled under certain conditions from the table itself, and this is effected partly from a control from the row one or first transaction bank. Therefore there is provided a disk 559 (Figs. 29 and 40), havig control notches in the second, fourth, sixth and eighth positions to correspond to the keys 155, 157, 159 and 161. This disk 559 is driven from a pinion (not shown) on the row 1 shaft 547.

Under certain conditions it is necessary to control the feeding of the statement sheet table and the feeding of the journal sheet from the journal sheet check hammer 531 and the journal sheet deposit hammer 535. After these hammers have effected such a control, it is then necessary to restore those controlling means to their normal position, and this is accomplished by a control disk 560 (Figs. 29 and 98) which is driven by a pinion 561 on the first transaction shaft 547. This disk 560 has control notches in the first, the seventh, and the ninth positions, so that it is to be controlled by the key 154, which is the Overdraft pickup key, the Space key 160, and the Balance pickup key 162.

The release of the line finding keys for the statement sheet is also controlled from the keys of the first transaction bank, and to effect such control there is driven from this bank a disk 562 (Figs. 29 and 34) operated from a pinion 563 on the first transaction bank shaft 547. This disk 562 therefore has control notches in the first, seventh and ninth positions to correspond to the Overdraft pickup, the Space, and the Balance pickup keys of row 1 to prevent release of the keys when these are depressed. Depression of all other keys in this row controls the disk 562 to effect a release of the line finding keys during operations with said other keys.

Row 1 controls two other selecting disks, which in combination wtih several others assist in controlling the audit strip feed. Referring to Figs. 29, 92 and 97, a disk 565, driven by a pinion 566 on the row one shaft 547, is controlled by keys in the first, second, fourth, sixth, seventh, eighth and ninth positions of row one, said disk having notches in the first, sixth, seventh, eighth and ninth positions for an upper feeler, later described, and in the second and fourth positions for a lower feeler. Another disk 567, driven by a pinion 568 on the row one shaft 547, has notches in the first, second, fourth, seventh and ninth positions corresponding to keys in those positions of row one.

To assist in controlling the journal sheet old balance pickup hammer 529, there is provided a disk 569 (Figs. 29 and 110) driven by a pinion 570 on the row one shaft 547. This disk 569 has selecting notches in the first and ninth positions to cooperate with the Overdraft pickup key 154 and the Balance pickup key 162, so that the old balance, whether it be a positive or negative amount, can be printed in the second column of the journal sheet, as shown in Fig. 106.

The journal sheet check hammer 531 (Fig. 25) is partially controlled by a selecting disk 571 (Figs. 29 and 71) driven by a pinion (not shown) on the row one shaft 547. This disk 571 has selecting notches in the sixth and eighth positions to correspond to the Check key 159 and the Check correction key 161 of row one.

Assisting in the control of the journal sheet check hammer 533 is a disk 572 (Figs. 29 and 72), which disk is driven by a pinion (not shown) on the row one shaft 547. This disk has selecting notches in the sixth and eighth positions, as shown in dotted lines in Fig. 72, to correspond to the Check key 159 and the Check correction key 161.

The deposit hammer 535 (Fig. 25) is controlled partly by a disk 573 (Figs. 29 and 74) driven by a pinion (not shown) on the row one shaft 547. This disk 573 has selecting notches in the second and fourth positions corresponding to the Deposit correction key 155 and the Deposit key 157.

The New balance hammer 537 (Fig. 25) is assisted in its control by a disk 574 (Figs. 29 and 111) which is driven by a pinion (not shown) on the row one shaft 547. This disk 574 has selecting notches in the first and ninth positions only, which correspond to the Overdraft pickup key 154 and the Balance pickup key 162.

The analysis hammer 527 (Fig. 25) is partly controlled as to its operation by the Analysis key 156 of row one, and to effect this control there is provided a disk 575 (Fig. 112) shown only in this figure, which disk is driven by a pinion on the row one shaft 547. This disk is provided with a single selecting notch, which is in the third position to correspond to the position of the Analysis key 156 of row one, so that whenever they key is pressed, then and then only will the analysis hammer 527 operate. At all other times this hammer is ineffective.

In order to aline all of the above mentioned control selecting disks which are set under the control of the keys of row one, there is an alining disk 576, located adjacent the printer frame 121 (Fig. 27). This disk is also shown in Fig. 70, and is driven by a pinion (not shown) on the row one shaft 547. There is another disk exactly like the disk 576 at the right-hand side of the machine, just inside the frame 125, so that a perfect alinement of all of these disks which are driven by the first transaction bank can be had.

There are three other alining disks in this group, to be later described, and cooperating with all four of these disks is a wide alining bar 577, carried by a lever 580 pivoted on a stud 581 on the frame 121. This lever 580 carries a roller 582 cooperating with a cam 583 secured to the printer drive shaft 500. A spring 579 maintains the roller 582 in contact with the cam 583, thus holding the bar 577 clear of the alining disks, except when the lower part of the cam is opposite the roller 582, at which time the spring 579 moves the alining bar 577 into contact with the alining disks.

*Selecting and control unit drive from symbol bank*

There are several selecting and control disks on the selecting and control unit which are controlled by the symbol bank, so that in cooperation with other disks they may control various functions of the machine. These disks, which are set under control of the symbol bank of keys 153, will now be described.

Secured to the shaft 247 (Fig. 109), which is set under control of the symbol bank of keys 153, is a segment gear 590 meshing with a pinion 591, secured to a gear 592. This pinion 591 and gear 592 are mounted on the stud 544. The gear 592 meshes with the external teeth of a ring gear 593, which has internal teeth meshing with a pinion 594 on a square shaft 595. By this means the symbol shaft 595 is set differentially under control of the symbol keys 153.

Assisting in the control of the statement sheet date hammer 519 and the statment sheet balance hammer 521 (Figs. 25 and 27) is a control disk 596 (Fig. 57) driven by a pinion 597 on the symbol shaft 595. This disk 596 has one selecting notch in the tenth position, which corresponds to the Balance forward key 153 of the symbol row.

To prevent the table lining means from locking the table when it is desired to eject a statement sheet, there is provided a disk 598 (Figs. 27 and 44) driven by a pinion 599 on the symbol shaft 595. This disk 598 is cut away, or in other words has low spots in all of its positions except the eighth position, which corresponds to the Eject key 153, so that the feeler mechanism to be later described cannot function to cause the liner to lock the table drive gears, later described, which would block an ejection of the table, and consequently an ejection of the statement sheet upon depression of the Eject key.

There is also a control disk 600 (Figs. 29 and 40) driven by a pinion 601 on the symbol shaft 595 to assist in making certain that the table drive mechanism is free at the time when the Eject key is depressed to eject the statement sheet, and therefore this disk 600, like the disk 598, is cut away, or has low spots in all positions except the eighth position, which corresponds to the Eject key, so that when this key is depressed the table driving mechanism will be free so that the table can be moved to its normal position to eject the statement sheet upon depression of that key.

Assisting in the control of the duplicate date and check number hammer 523 is a control disk 604 shown only in Fig. 112. However, this disk is identical with the disk 596 shown in Fig. 57 and is driven by a pinion like the pinion 597 from the symbol shaft 595. It has a control notch in the tenth position which corresponds to the Balance forward key 153 of the symbol row.

Assisting in the control of the statement sheet balance hammer 525 (Fig. 25) is a control disk 605 shown only in Fig. 112. This disk 605 is identical with the disk 596 (Fig. 57), which controls the statement sheet balance hammer 521, and is driven by a pinion like the pinion 597 from the symbol shaft 595. This disk 605 has a notch in the tenth position only, which corresponds to the balance forward position of the symbol row.

To make certain that the selecting and control disks, which are set under control of the symbol bank of keys, are always set in their proper positions, there is provided an alining disk 602 (Figs. 27 and 70) driven by a pinion 603 on the symbol shaft 595. This disk is provided with the proper number of notches to cooperate with the previously described aliner bar 577, for the purpose mentioned.

*Selecting and control unit drive from the total bank*

This selecting and control unit being described is also provided with several selecting and control disks, which are set under control of the total bank of keys to assist in controlling the several operations of the printing mechanism of this machine.

Connected to one arm of the bellcrank 458 (Fig. 22), which is differentially set under control of the total control plate 141, which in turn is controlled by the keys 163 to 168 in the total row, is a segment gear 610. This gear 610 meshes with a segment gear 611 secured to a shaft 612, supported by the auxiliary frame 504 (Fig. 4) and a lug (not shown) on the base 130. Also secured to the shaft 612 is a gear segment 613, meshing with the external teeth of a ring gear 614, having internal teeth meshing with a pinion 615 on a square total shaft 616, for the purpose of driving the control and selecting disks above mentioned, which will now be specifically described.

To assist in controlling the statement sheet date hammer 519 and balance hammer 521 (Fig. 27) there is a disk 617 (Figs. 27 and 58) driven by a pinion 618 on the total shaft 616. The disk 617 has notches in the first, second and sixth positions for the bottom feeler, later described, and a notch in the "add" position for the top feeler to control the hammers 519 and 521, so that they will print when the New balance key 163, the Sub-balance key 164, and the New balance N. T. key 168 are depressed. All of these operations, of course, are total operations. There is also a control notch in the add or zero position of this disk 617, which is for the purpose of permitting balance forward operations of the machine, which are add operations, so that amounts forwarded can be put on the statement sheets at the beginning of the month. Now, when the Balance forward key is depressed, the previously described disk 596 (Fig. 57) having a control notch in the tenth or balance forward position, there must necessarily be a corresponding notch in the add position of the disk 617, so that the balance hammer 521 can be operated to print the balance forward amounts.

To assist in the table alining mechanism and also in the table ejection, there is provided a disk 619 (Figs. 27 and 46) driven by a pinion 620 on the total shaft 616. This disk 619 has control notches in the add position, the second position, and the third position to cooperate with the top feeler, later described, add position for the lower feeler, whereby the aliner and retainer for the table may be effective to aline the table and prevent ejection thereof during certain types of add operations, sub-total balance operations, and the indicator balance operations as will be later described. The other parts of this disk 619 being of the normal periphery, or in other words, high spots, when the New balance key 163, the Sub-total row one key 166, the Clear row 1 key 167, or the New balance N. T. key 168, is depressed, this disk 619 assists in controlling the ejection of the statement sheet table during certain types of operations when these keys are depressed. In other words, it prevents the aliner and retainer from being rendered effective so that the table is free to be ejected when any of the above mentioned keys 163, 166, 167 and 168 is depressed.

Since the total row takes a part in the control of the table feed mechanism, there is provided a control disk 621 (Figs. 29 and 80) driven by a pinion 622 on the total shaft 616. This disk 621 has a control notch in the add position so that the table may be fed on all add operations when necessary, but it has no other low spots or control notches, so that the table will not be fed during the taking of totals under control of the keys 163, 164, 166, 167 and 168, or when the Indicator balance key 165 is depressed.

During adding operations there are certain conditions under which the machine should be locked, such as when the machine is operated to register a check or a deposit when there has been no statement sheet put on the table, and in such condition the machine will lock on the following operation, calling the operator's attention to the fact that there has been no statement sheet put on the table. In order to accomplish this the total row takes a certain part in that control in the add position; therefore there is provided a disk 623 (Figs. 29 and 40) driven by a pinion (not shown) on the total shaft 616. This disk 623 has a notch in the add position so that a part of the interlocking mechanism to be hereinafter described may be moved inwardly, or toward the shaft 540, to lock the machine under certain conditions.

As previously mentioned, on certain operations the journal check hammer 531 and the journal deposit hammer 535 (Fig. 25) control the feed of both the journal sheet and the statement sheet in adding operations as well as in totaling operations. In order to effect this full control it is necessary that a disk 624 (Figs. 99 and 100) driven by a pinion 625 on the total shaft 616, be supplied with notches or low spots in the add position, and also in the first, second, fourth, fifth and sixth positions, so that during adding operations or during any operation, when keys in the total row are depressed, except the Indicator balance key, the mechanism will be operated to restore the control set up by these two hammers.

There is a control from the total bank for the line finding keys, and therefore there is provided a disk 626 (Figs. 29 and 34) which is driven from a pinion (not shown) on the total shaft 616. This disk 626 has a notch shown in dotted lines in the add position, so that this notch, in combination with notches in the first, seventh and ninth positions of the disk 562, set under control of the first transaction bank, will prevent the line finding keys from being released. Due to the fact that the disk 562, set under control of the first transaction bank, has high spots in all positions except the 1, 7 and 9, it is therefore evident that when any of the keys in the first transaction bank or row one, except the two pickup keys and the space key, are depressed, the line finding keys will be released during that operation.

The audit strip feed is also partly controlled through the total row, and to provide this control there is a disk 627 (Figs. 29 and 94) driven by a pinion 628 on the total shaft 616. This disk has control notches in the add, 2, 4, 5 and 6 positions, which represent add, and the sub-balance, sub-total row one, clear row one, and new balance non-transfer positions, in which operations it is necessary and desirable to feed the audit strip or journal sheet. As in this case notches are required to control the feed, these notches are in those positions.

The control of the old balance hammer 529 (Fig. 25), which prints on the journal sheet, is effected partially by the previously described disk 569 (Fig. 110) and also by a disk 629, which is driven by a pinion (not shown) secured to the total shaft 616. This disk 629 has low spots or control notches in the add position and also in the 2 position so that when picking up an old balance, whether it be a positive amount or an overdraft amount, the disk 569 will present notches in alinement with the notch in the add position of the disk 629, and when taking a sub-balance, the notch in the second position of the disk 629 is moved upwardly into the position normally occupied by the add notch, and at the same time, since no key has been depressed in the first transaction bank if the amount was positive, that differential moved to the ninth position and positioned the notch in the disk 569 in the ninth position, in alinement with the notch in the 2 position of the disk 629. However, if the sub-balance was an overdraft, then the Overdraft key 158 of the first transaction bank was depressed, and this, as has been previously described, causes the differential mechanism of this bank to stop in the 1 position, which positions the notch in the 1 position of the disk 569 opposite the notch in the second position on the disk 629, which has been positioned under control of the sub-balance, and therefore under these conditions the old balance hammer 529 is permitted to print a sub-balance whether it be positive or negative, and also all of the pick-up amounts, whether they be positive or negative, which are add operations, the sub-balance operations being total operations.

The total row has a disk 630 (Figs. 29 and 111) driven by a pinion 631 on the total shaft 616, to assist in controlling the new balance hammer 537 for the journal sheet. This disk 630 has control notches in the first, fourth, fifth and sixth positions and the totals printed under control of the New balance key 163, the Sub-total row one key 166, the Clear row one key 167, or the New balance N. T. key 168 will permit the hammer 537 to print these balances in the extreme right-hand column of the journal sheet.

The duplicate date and check number hammer 523 (Fig. 25) is controlled by a disk 632 (Fig. 112), driven by a pinion (not shown) on the total shaft 616. This disk 632 has control notches in the first, second and sixth positions to cooperate with a feeler finger and therefore controls this hammer 523 in the same manner that the disk 617 effects its control of the hammers 519 and 521 when the machine is set to print on the statement sheets shown in Figs. 102, 103 and 105, by means to be hereinafter described. When the machine is set to print on the statement sheet of Fig. 104, then this hammer 523 is disabled by means which will later be described.

The hammer 525 is partially controlled by a disk 633 (Fig. 112) which is driven by a pinion (not shown) on the total shaft 616. This disk 633 is also identical with the disk 632 and effects a control over the balance hammer 525 when printing on the statement sheet shown in Figs. 102 and 105.

An aliner disk 634 (Figs. 27 and 70) is provided to aline all of the disks set under control of the total row.

*Selecting and control unit drive from the slip feeler*

All of the hammers 513, 515, 517, 519, 521, 523, 525 and 527 (Fig. 25) associated with the statement sheets for printing thereon, are under the direct control of a slip feeler mechanism which definitely prevents any operation of those hammers when there is no slip present on the table at the beginning of an operation. This same slip feeler mechanism controls the special back-up alining mechanism for the table and also the table positioning mechanism under control of the line finding keys. In other words, it prevents the table from being moved under the control of the line finding keys when there is no slip on the table, and also prevents the special back-up lining mechanism, to be later described, from operating when there is no slip on the table. These hammers, above mentioned, the table positioning mechanism, and also the back-up feed mechanism are controlled by control disks in the selecting and control unit, under the direct control of the slip feeler. This mechanism will now be described with particular reference to Figs. 27, 59, 60 and 61.

A portion of a statement sheet table 640 is shown in Fig. 59, and above this table there is mounted on a lug on the base 130 a bracket 641, having an opening 642, the purpose of which will be hereinafter described.

Pivoted on a rod 643, which is supported by the printer frames 121, 122 and 123, is a feeler lever 644, pivoted at 645 to a link 646 pivoted near its middle on a stud 647 carried by an arm 648, which is pivoted on a shaft 649, supported by the printer frames 121, 122 and 123. This link 646 extends to the right, as shown in Figs. 59 and 60, and has a flange 650 normally engaging the periphery of a cam 651, as shown in Fig. 59, which cam is secured to the printer drive shaft 500. Integral with the arm 648 is another arm 652, having a notch 653 for a purpose to be later described.

The timing of the cam 651 is shown in space 13 of the time chart (Fig. 107), and immediately after the beginning of the operation of the shaft 500 in a clockwise direction, the periphery of the cam 651 is moved away from the flange 650, at which time a spring 654 connected to the lever 644 rocks said lever clockwise, and, if there is no statement sheet on the table 640, this lever 644 will continue its clockwise movement under action of the spring 654 until the upper end of the lever 644 enters the hole 642 in the bracket 641. This will move the link 646 from the position shown in Fig. 59 to that shown in Fig. 60, wherein a pawl 655 will be drawn by its spring 656 into the notch 653 of the arm 652. This pawl 655 is pivoted on a lever 657, which in turn is pivoted on the shaft 649. The lever 657 carries a pin 658 engaged by a forked arm 659 carrying a roller 660 cooperating with a cam 661 (space 14 of Fig. 107) secured to the printer drive shaft 500. This arm 659 is mounted on a rod 662, carried by the left printer frame 121 and the auxiliary plate or frame 129 (Fig. 24). A spring 663 tends at all times to hold the roller 660 against the surface of the cam 661.

Immediately after the link 646 has been moved from the position shown in Fig. 59 to that shown in Fig. 60, the cam 661, acting on the roller 660, rocks the arm 659 counter-clockwise, which rocks the lever 657 clockwise from the position shown in Fig. 59 to that shown in Fig. 61. This clockwise movement of the lever 657 causes the following to happen.

It will be remembered that the pawl 655 engaged the notch 653 of the arm 652 when the link 646 was moved to the left, due to the fact that there was no statement sheet or slip on the table 640. This movement of the pawl 655 is sufficient to position the upper end thereof beneath a shoulder 664 of a lever 665 pivoted on the shaft 649. This lever 665 has a slot 666 into which projects a roller 667 carried by an arm of a disk 668 having internal gear teeth meshing with a pinion 669 on a slip feeler shaft 670 which is a part of the selecting and control unit.

From the above it can be clearly seen that since the pawl 655 is beneath the shoulder 664 of the lever 665, this lever 665 will, as the lever 657 is rocked clockwise by the cam 661, be rocked likewise from the position shown in Fig. 59 to that shown in Fig. 61, wherein the slot 666, through its cooperation with the roller 667, will rock the disk 668 counter-clockwise from the position shown in Fig. 59 to that shown in Fig. 61. When this disk 668 is so rocked in a counter-clockwise direction, it turns controlling disks, to be later described, which will prevent an operation of any of the hammers associated with the statement sheet, which hammers are numbered 513 to 527 in Fig. 25, and it will also prevent any movement of the slip or statement sheet table 640 under control of the line finding keys, and simultaneously prevent any operation of the back-up alining mechanism for the table, which will be later described.

Up to this point in the operation this slip feeler mechanism, just described, is now in a moved position.

As the pawl 655 is moved upwardly by the clockwise movement of the lever 657, this pawl, still being in engagement with the notch 653, will rock the arm 652 and the integral arm 648 clockwise from the position shown in Fig. 60 to that shown in Fig. 59, which brings the lever 644 counter-clockwise to its normal position shown in Fig. 59. During this operation of the mechanism as just described, the spring 663, being attached to the arm 659 and the lever 665, has been put under tension, which tension will assist in restoring these parts to their normal positions, as the cam 661 nears its normal position. This spring action is also made positive through the medium of a cam 671 (space 14, Fig. 107), secured to the cam shaft 500, which contacts a roller 672 on the lever 657 to rock this lever counter-clockwise to its normal position, which, through the pin 658, will positively rock the arm 659 clockwise to its normal position. The lever 657, as it is being restored to normal by its contact with a pin 673 on the lever 665, will rock this lever 665 counter-clockwise to its normal position, whereupon the slot 666 will rock the disk 668 clockwise from the position shown in Fig. 61 to its normal position, shown in Fig. 59, which will turn the feeler shaft 670 and all of the control disks thereon back to their normal positions.

Since the action of this mechanism is very rapid, the lever 665 is provided with a stop finger 674, which normally rests against a hub of the cam 651. This lever 665 also has another stop shoulder 675, which contacts the same hub as shown in Fig. 61, when the mechanism has been moved to its extreme position to shift or turn the slip feeler shaft 670, when there is no slip in the machine.

However, when there is a statement sheet in the machine, the feeler lever 644 moves only until it contacts the bottom of said statement sheet, whereupon the link 646 is moved only part-way between the positions shown in Fig. 59 and Fig. 60, which is not far enough to position the notch 653 in front of the pawl 655, and consequently, the pawl 655 is caused to ride upon a surface 676 of the arm 652 and is not permitted to fall beneath the shoulder 664 of the lever 665. Consequently, when the lever 657 is moved or operated by the cam 661 in the manner previously described, the lever 665 is not moved but allowed to remain in the position shown in Fig. 59, due to the fact that the nose of the arm 659 rides upon the surface 676 of the arm 652 in an idle manner until it picks up the arm 652 and restores it to its normal position shown in Fig. 59.

The various disks of the control unit, operated under control of the slip feeler 644, will now be described. Referring to Figs. 27 and 43, there is a disk 680 operated by a pinion 681 on the slip feeler shaft 670. This disk 680 has a notch in the normal position, or the position wherein there is a slip in the machine, so that the back-up mechanism for the table alining will be operated each time the statement sheet is on the table to be printed upon.

To control the statement sheet check hammer 513 (Figs. 25 and 27) there is provided a disk 682 (Figs. 27 and 84), operated by a pinion 683 on the slip feeler shaft 670. This disk 682 has a control notch in the slip position so that this hammer will be operated whenever a slip is in the machine. All other positions of the disk are normal, and consequently, when there is no slip in the machine and the disk 682 is moved out of its position shown in Fig. 84, this hammer 513 will not operate.

A disk 684 (Figs. 27 and 88) is used to control the hammer 515 in exactly the same manner. This disk is driven from a pinion 685 on the slip feeler shaft 670.

The deposit hammer 517 (Fig. 27) is controlled by the slip feeler through the medium of a disk 686, which is driven by a pinion (not shown) on the slip feeler shaft 670. This disk is identical with the disk 684 just described, and is used for the same purpose of causing the hammer 517 to print whenever a statement sheet is in the machine upon the proper operation, and preventing printing or an operation of this hammer when there is no statement in the machine.

The date hammer 519 and the balance hammer 521 are controlled in identically the same manner through the medium of a disk 687 (Figs. 27 and 56), which is driven by a pinion 688 on the slip feeler shaft 670. This disk 687 has a notch in the normal or slip position to permit printing from these hammers when a statement sheet is in the machine, and prevents any operation of these hammers when there is no statement sheet in the machine.

In Fig. 112 there are shown three disks 689, 690 and 691, which are identical with the disk 684 and are driven from the slip feeler shaft 670, and under control of the slip feeler 644. The disk 689 controls the duplicate date and check number hammer 523, the disk 690 controls the operation of the duplicate balance hammer 525, and the disk 691 controls the operation of the analysis hammer 527.

In order to prevent any movement of the table driving mechanism when there is no slip or statement sheet on the table, there is provided a disk 692 (Figs. 27 and 39) which is driven by a pinion 693 on the slip feeler shaft 670. This disk 692, like all of the other disks controlled from this slip feeler, has a notch in the slip position, so that the table will be set and positioned during the time when there is a slip on the table 640, but the table feed mechanism will definitely not be operated when there is no statement sheet on this table 640.

*Selecting and control unit drive from non-print or statement sheet duplicate printing control lever*

As has been previously stated, the machine embodying the present invention is readily adapted to print on four different widths of statement sheets, as shown in Figs. 102 to 105 inclusive. On the statement sheets shown in Figs. 102, 103 and 105, there is a duplicate printing of the date and number of checks, and on the statement sheets of Figs. 102 and 105, in addition to the duplicate date and number of checks, there is a duplicate printing of the balance.

As has been previously described, the hammer 523 (Fig. 25) prints the duplicate date and check numbers, and the hammer 525 prints the duplicate balance.

On the wide statement sheet (Fig. 105) the analysis is printed by the hammer 527, and the control for the printing and non-printing of this is effected by the Analysis key 156 in conjunction with the slip feeler mechanism, as determined by the selection and control disks 575 and 691, shown in Fig. 112. Of course, if there is no statement sheet in the machine, the control disk 691 prevents printing of the analysis, even though the Analysis key 156 has been depressed. However, if there is a statement sheet in the machine and the Analysis key is not depressed, then the hammer 527 will not function.

To determine whether or not the date and consecutive number duplicate hammer 523 will be operated, and whether or not the duplicate balance hammer 525 will be operated, there has been provided a manually movable duplicate printing control lever 700 (Figs. 63 and 69) mounted to the left of the printer frame 121 in the printer selecting and control unit and adjacent the end thereof and in such a position that a knob 701 thereon is readily accessible to the operator.

This lever 700, as shown in Fig. 63, has three positions of adjustment, namely, A, B and C. In the "A" position, the machine is capable of printing the duplicate date, number of checks, and balance, on the statement sheets shown in Figs. 105 and 102.

When the lever 700 is moved to the "B" position, the duplicate balance hammer 525 is rendered ineffective, and therefore the statement sheet (Fig. 103) is used to print only the duplicate date and number of checks by the hammer 523.

When the lever 700 is in the "C" position, both of the hammers 523 and 525 are rendered ineffective and at this time the statement sheet shown in Fig. 104 only can be printed.

To assist in an easy action for the lever 700, it has a slot 702 into which projects a pin 703 on a T-shaped plate 704, which surrounds the end of the shaft 540 and is screwed to the end of a stud 705, and also to the end of a stud 706, both of which are carried by the printer frame 121.

The lever 700, being mounted on the selecting and control unit, is provided with internal gears which drive a pinion 708 on a duplicate non-print shaft 709, shown also in Fig. 28. The lever 700 is retained in its various positions of adjustment by a spring pressed alining pawl 710 pivoted on the stud 706.

This lever 700 operates two control disks 711 and 712 (Figs. 112 and 113). The disk 711 is driven from a pinion 713 on the shaft 709. The disk 712 is driven by a similar pinion (not shown), which is also on the shaft 709.

The disk 711 has two notches as shown in Fig. 113, and the disk 712 is provided with four notches, two in alinement with the disk 711, and two others shown in dotted lines.

When the lever 700 is in the position shown in Fig. 63 or the "A" position, the disks 711 and 712 are in the positions shown in Fig. 113, whereby a feeler mechanism to be later described cooperates with the notches in both of these disks, so that both of the hammers 523 and 525 (Fig. 25) are operated to print the duplicate date, number of checks and balance on statement sheets, such as those shown in Figs. 102, 103 and 105, depending upon which one is in use at the time.

When the lever 700 is moved to the "B" position, as shown in Fig. 63, both of the disks 711 and 712 are moved by the drive shaft 709 to position the disk 711 so that there will be no selecting notches opposite its associated feeler mechanism, in which position the duplicate balance hammer 525 will be rendered ineffective, but due to the fact that the notches of the disk 712 (shown in dotted lines in Fig. 113) are at that time placed opposite its associated feeler mechanism to be later described, the date and check number duplicate printing hammer 523 may be operated to print the duplicate date and check number on a statement sheet, as shown in Fig. 103.

When the lever 700 is moved to the "C" position as shown in Fig. 63, then both of the disks 711 and 712 are moved by the shaft 709, so that none of the notches in either of the disks are opposite their associated feeler mechanisms, whereupon both of the hammers 523 and 525 are rendered ineffective so that they will not operate when a statement sheet, such as that shown in Fig. 104, is used by the operator.

*Selecting and control unit drive from ejection control and correction lever*

To control the machine to non-eject a statement sheet and print the error correction upon a check correction or deposit correction operation, or to set the machine to eject the statement sheet and non-print from the statement sheet hammers upon a deposit correction or a check correction operation, there is provided a lever 720 (Figs. 62 and 69) which may be set in either of two positions. The full-line or "on" position shown in Fig. 62 is in the non-eject and print position for the machine on check or deposit correction operations, and the dot and dash line or "off" position shows the position of this lever 720 when the machine is to eject the statement sheet and non-print a check correction or deposit correction.

This lever 720 drives certain control disks in the selecting and control unit of the printer through the medium of a disk 721 (Fig. 62) which is integral with the lever 720. This disk 721 has two shoulders 722 and 723, which cooperate with the previously described pin 703 on the plate 704, to act as stops to limit the lever in its movements. The lever is held in either of its set positions by a spring pressed pawl 724, pivoted on the stud 706. This disk 721 has internal teeth which drive a pinion 725 on an internal drive shaft 726 of the selecting and control unit.

Associated with the statement sheet check hammer 513 is a disk 727 (Fig. 85) driven by a pinion 728 on the drive shaft 726. This disk 727 has a control notch in the normal position, or the position which corresponds to the "on" position of the lever 720, so that on non-eject and print operations the check hammer 513 can print insofar as this disk 727 is concerned, and when the other disks which control this hammer are all in their proper alinement.

Cooperating with the statement sheet check hammer 515 (Fig. 27) is a control disk 729 (Fig.

89) driven by a pinion 730 on the drive shaft 726. This disk 729, like the disk 727, has a notch in the position corresponding to the "on" position of the lever 720 to permit this hammer to operate when the other disks which control the hammer are in their proper positions for printing.

Associated with the deposit hammer 517 is a disk 731 (shown only in Fig. 27). This disk is identical with the disks 727 and 729, above described, and is driven by a pinion (not shown) on the drive shaft 726, to control the operation of the deposit hammer 517, so that it will print when the lever 720 is set in the position shown in Fig. 62, when the other disks which assist in controlling the operation of this hammer are in the proper position for printing.

When the lever 720 is moved into the "off" position (Fig. 62), the shaft 726 and the pinions thereon turn the disks 727, 729 and 731 to remove the control notches from the control feelers, so that when this lever 720 is in the "off" position, none of the three hammers 513, 515, and 517 can be operated on a check correction operation or a deposit correction operation, at which time the statement will be ejected from the machine, due to the fact that the table will be released and under its spring power (to be later described) will be returned to its normal position.

Associated with the table lining mechanism and the means to release the table to eject, there is another control disk 732 (Figs. 27 and 44) which is driven by a pinion (not shown) on the drive shaft 726. This disk 732 has a control notch in a position corresponding to the position in which the lever is shown in Fig. 62, so that the alining mechanism for the table may be operated to retain the table in the proper position during printing operations. However, the effect of this notch in the disk 732 may be nullified at any time by the depression of the Eject key 153 of the symbol row, which positions its disk 598 (Fig. 44) in the manner previously described, opposite the control feeler, whereby the alining mechanism is prevented from operating, and therefore the table will be ejected to its normal position and eject any statement sheet thereon from the machine.

When the lever 720 is moved to the "off" position shown in Fig. 62, the disk 732 will be rotated to position the control notch out of relationship with the feeler finger for the table aliner. Consequently, the table aliner cannot be moved during this time, and the table 640 will at that time be ejected to eject he satement sheet from the machine when the check correction and deposit correction keys are operated.

*Selecting and control unit drive from the audit check hammer 531*

There are certain types of operations where the table must be fed to feed the statement sheet and also where the journal sheet must be fed, which operations are placed under the control of the audit or journal sheet check hammer 531.

In other words, after the entry of a balance pickup operation, if the operator should operate the machine to list checks, during the entry of the first check, upon operation of the journal sheet check hammer 531, a condition is set up to feed the statement sheet and journal sheet before the entry of the third check. If there is no third check, and the deposit is entered after the entry of the second check, the condition is still set up for a feed, but if the New balance key 163 is depressed, either after the entry of the second check or after the entry of the deposit, that condition is nullified by the restoration of the means which has previously set up that condition by the journal sheet check hammer 531, which nullification takes place during that new balance operation. The new balance operation under control of the disk 627 will not feed the journal sheet. The only exception is when a sub-balance is taken just prior to said new balance operation. Then the disk 627, having a notch in the second position, will cause the journal sheet to be fed, since the other disks of Figs. 92, 93, 95, 96 and 97 are still in positions to cause journal sheet feeding. This sub-balance operation also nullifies the automatic feed condition above mentioned.

To effect the above control, the selecting and control unit has several disks which are operated directly under control of the journal sheet check hammer 531. This mechanism will now be described.

The journal sheet check hammer 531 has a tail 740 (Fig. 76) adapted to cooperate with a pin 741 on a disk 742 of the selecting and control unit. This disk drives a pinion 743 on a drive shaft 744.

Associated with the journal sheet feeding mechanism is a disk 745 (Figs. 29 and 95) driven by a pinion 746 on the shaft 744.

Whenever the hammer 531 is rocked clockwise to take an impression, the movement thereof is sufficient for the tail 740, by its contact with the pin 741, to rock the disk 742 counter-clockwise one step until the pin is located in the bottom notch of a spring aliner 747, which is pivoted on a shaft 748, supported by the printer frames 124 and 125 (Fig. 24). By moving the disk 742 counter-clockwise, as just described, the shaft 744 rotates the disk 745 (Fig. 95) to position a control notch therein opposite a feeler device. Thus when all other conditions are right, the machine, in connection with the selecting and control unit, will cause the journal sheet to feed. This condition exists upon the entry of a third successive check during a posting operation, and also every alternate check from thereon; in other words, after the entry of every third, fifth, seventh, and so on, check which is entered during a posting operation, the journal sheet will feed and also after the entry of a deposit operation, when a second deposit is to be entered. However, if the balance is taken after the entry of the second check or after the first deposit, the journal sheet will not feed. However, if a second deposit is made before the balance is taken, there will be a feed between the first and second deposits, and also between all other successive deposits which are posted during that one particular posting transaction.

Associated with the table feed mechanism and under control of the hammer 531 is another disk 749 (Fig. 81) driven by a pinion 750 on the shaft 744. This disk assists in controlling the feeding of the table in the same manner as the disk 745 assists in the control of the audit sheet feed. In other words, this disk 749 has a control slot therein, which is normally out of relationship with a feeler mechanism to be later described, but when the hammer 531 is operated and drives the disk 742, the disk 749 is turned to bring this control notch opposite the feeler mechanism, so that upon certain types of operations the table will be fed, which operations are like those operations just mentioned in connection with the feeding of the journal sheet in so far as the entry of checks and deposits is concerned. On sub-balance operations, the table is not ejected, but on a new balance operation the table is ejected.

Selecting and control unit drive from the journal sheet deposit hammer 535

Under certain conditions the journal sheet deposit hammer 535 (Fig. 74) controls the feeding of the journal sheet and also the feeding of the statement sheet in a manner quite similar to that control exercised by the check hammer 531.

In other words, after the entry of successive deposits, the journal sheet must be fed, and also the statement sheet must be fed, unless a new balance is to be taken when these deposits are entered during the posting of a single transaction.

To effect this control the deposit hammer 535 is provided with a tail 755, which cooperates with a pin 756 on a disk 757, which drives a pinion 758 on a drive shaft 759 of the selecting and control unit. This disk 757 is normally retained in the position shown in Fig. 74 by a spring-pressed retaining pawl 760 pivoted on the shaft 748.

Associated with the audit strip feed mechanism is a disk 761 (Figs. 29 and 93) driven by a pinion 762 on the drive shaft 759. This disk has a control notch in a position such that when the disk 757 is operated in a counter-clockwise direction upon operation of the deposit hammer 535, the disk 761 will be rotated counter-clockwise to bring this control notch in a position to register with the feeler mechanism to be later described, to set up a condition to feed the journal sheet immediately following the deposit operation, if a second deposit operation is to be made.

Associated with the table feeding mechanism, so that the table feed may be controlled by the deposit hammer 535, is a disk 764 (Figs. 29 and 79) driven by a pinion 765 on the drive shaft 759. This disk, like the disk 761, has a control notch in the position to be moved into registration with a feeler mechanism to be later described, when the deposit hammer is operated, to set up a condition to feed the table upon the successive entry of deposits during the posting of the transaction.

The means for restoring the disk 742 (Fig. 76) and the disk 757, which are operated by the journal check hammer 531 and the journal deposit hammer 535 to their normal positions on any new balance operation under control of the New balance key 163; on a sub-balance operation under the control of the Sub-balance key 164; upon any sub-total operation under control of the key 166 of the balance pickup totals or the overdraft pickup totals; upon the total clearing of the balance pickup or overdraft pickup operation under control of the Clear row 1 key 167; or taking of a new balance and non-transferring that new balance under control of the key 168, will now be described.

This restoring mechanism is shown in Fig. 101, and the control for the restoring mechanism is shown in Fig. 100. The disks 560 and 624, which are also shown in Figs. 98 and 99, have been previously described with their functions.

The description of the selection for the restoring means will be given in connection with the new balance operation, and from this description all of the other types of operations which control the selecting of the restoring means will be fully understood.

It will be recalled that the disk 560 is set under control of the row 1 keys 154 to 162, and that the disk 624 is set under control of the total row of keys 163 to 168.

Assume that the new balance is a positive balance, so that when the New balance key 163 is depressed, the differential mechanism for row 1 will be moved to the ninth position and the disk 560 will be set in the ninth position whereby the notch in that position will be opposite a feeler finger 770 (Fig. 98). This feeler finger 770 is integral with a lever 771, journaled on a shaft 772 supported by the printer frames 121, 122 and 123, as shown in Fig. 24.

Rigidly secured to the finger 770 is a feeler finger 773 (Figs. 99 and 100) which cooperates with the disk 624. Since the New balance key 163 is depressed, the differential mechanism of the total row will stop in the "1" position, and that is represented by a low spot on the disk 624.

Therefore, at the proper time, and by means to be hereinafter described, these two feeler fingers 770 and 773 can be rocked in a counter-clockwise direction under the action of a spring 774 connected to an arm 775 connected to the lever 771 and feelers 770 and 773 by a hub, as is clearly shown in Figs. 29 and 100. Pivoted to the arm 775 is a pitman 776 having a pin 777 adapted to cooperate with a plate cam 778 (space 28, Fig. 108) secured to the printer drive shaft 500. During the first half of the operation of the shaft 500, the cam 778 holds the pitman 776 and the fingers 770 and 773 in the position shown in Figs. 99 and 100. It is during this time that these two disks 560 and 624 are differentially positioned under control of the row one differential and the total row differential.

At 185 degrees time in the operation, the cam 778 has a sharp drop 779, at which time the spring 774 functions to cause the fingers 770 and 773 to enter the notches in the disks 560 and 624. When this occurs, a link 780 pivoted to the lever 771 and a coupling link 781, lowers the left end of the coupling link to cause its notch to engage a pin 782 of an arm 783 pivoted on a shaft 784, supported by the printer frames 121, 122 and 123, as shown in Fig. 24.

The righthand end of the coupling link 781 is pivoted to a lever 785 pivoted on the shaft 649 and carrying rollers cooperating with a pair of cams 786 and 787 (space 29, Fig. 108) on the printer drive shaft 500.

These cams 786 and 787 are so constructed that after the selecting disks 560 and 624 have had the opportunity to determine whether or not the coupling link 781 is to be coupled with the pin 782, said cams will cause a clockwise rocking of the lever 785 and a consequent movement of the coupling link 781 toward the right, as viewed in Fig. 101. When this occurs, a link 788 connected to the stud 782, and pivoted to an arm 789 pivoted on the shaft 772, will rock said arm 789 counter-clockwise. The arm 789 has integral therewith another arm 790, adapted to contact a pin 791 on a disk 792 connected to the drive shaft 759 by a pinion 793 on that shaft 759.

Connected to the arms 789 and 790 by a hub 795 (Figs. 29 and 101) is an arm 796 adapted to cooperate with a pin 797 on a disk 798 connected by a pinion 799 to the drive shaft 744, which shaft is operated by the check hammer 531. From the above description it will be clear that the above mentioned counter-clockwise movement of the arms 789, 790 and 796, by the cams 786 and 787, will rock the disks 792 and 798 from their moved positions, wherein the pins 791 and 797 were in contact with the arms 790 and 796, back to the position shown in Fig. 101, and thereby through the pinions and drive shafts 759 and 744 restore the disks 742 and 757 back to the positions shown in Figs. 76 and 74, respectively, ready to be again operated by the journal sheet check hammer 531 and the deposit hammer 535.

From this it will be clear that on any new balance operation following a check or deposit operation, the means which is set up to feed the journal sheet and the statement sheet under control of the check hammer 531 and the deposit hammer 535, will be restored to its normal position and there will be no feed of the journal and statement sheets.

It is not thought necessary to go into the manner in which these two disks 742 and 757 are restored upon operation of the Sub-balance key 164, the Sub-total key 166 and the Clear key 167 or the New balance N. T. key 168, because the principle of operation is the same and is controlled by the notches in the disks 560 and 624, set under control of the row 1 bank of keys and the total row of keys.

*Selecting and control unit drive from the automatic control through the first transaction bank and the total row.*

Since there are two columns on the statement sheet and also on the journal sheet to receive the printed entries of checks being posted or listed in connection with any of the accounts, after the entry of the second check and each even-numbered check thereafter, that is, fourth, sixth, and so on, it is necessary to feed the statement sheet and also the journal sheet so that, for example, the third and fourth checks will be printed on the next line of higher number than that on which the first and second checks were printed, and so that the fifth and sixth checks will be printed on the next higher line, and so on.

It is also necessary when posting a series of checks to alternately operate the statement sheet check hammers 513 and 515 and the journal sheet check hammers 531 and 533. It might be well to state that the statement sheet hammer 513 and the journal sheet hammer 531 operate at the same time, and the statement sheet hammer 515 and the journal hammer 533 operate at the same time.

In order to control such feeding of the statement sheet and the journal sheet, and also to control the alternate operation of the statement sheet and journal sheet hammers just mentioned, there is provided an automatic mechanism shown in Figs. 64 to 69 inclusive, to drive the selecting disks in the selecting and control units as determined by the keys in the first transaction bank or row one, and also certain keys in the total row.

To effect this control there is provided a selecting disk for each of the hammers 513, 515, 531 and 533, and also a selecting disk in conjunction with the statement sheet feed control, and with the journal sheet feed control.

The means for controlling the operation of the automatic means above described by the transaction keys 154 to 162 inclusive, is through the transaction shaft 547 (Fig. 28). Referring now particularly to Figs. 64 and 65, this drive includes a pinion 800 on the shaft 547, which drives a gear 801 meshing with a gear 802 mounted on a previously described stud 705. Secured to this gear 802 is a feed pawl control disk 803, which cooperates with a pin 804 on a slide 805. This slide is constructed to slide freely on a hub or collar on the stud 705 and on a collar on the shaft 649, and due to the weight of the slide 805 it will in its normal position be down as far as the pin 804 will permit.

This disk 803 has feed notches in the sixth and eighth positions corresponding to the Check key 159 and the Check correction key 161, which notches cooperate with the pin 804 for a control to be hereinafter described. The first, seventh and ninth positions of the disk 803 are lower than the outside periphery of the disk, but higher than the notches in the sixth and eighth positions, to correspond to the Overdraft pickup key, the Space key, and the Balance pickup key for a purpose to be hereinafter described. The zero position of this disk 803 also has a notch of the same depth as the notch in the 1 position. However, this disk, due to the fact that there is no zero stop pawl in this first transaction bank, will never get into this position.

There is a camming device, which is operable at the proper time to raise a slide 805, to raise the pin 804, so that the disk 803 may be differentially positioned. The camming device includes a cam 806 (Fig. 64) fast on the printer cam shaft 500. This cam cooperates with a roller 807 on a lever 808, having a finger 809 to cooperate with a pin 810 on the slide 805. Immediately at the beginning of the operation of the machine, the cam 806 through the lever 808 raises the slide 805 and holds it in its raised position until 210 degrees of operation of the cam shaft have been completed, as shown in space 31 of the time chart in Fig. 108, at which time the cam 806 releases the lever 808 to permit the slide 805 to fall, so that the pin 804 can feel for the particular surface of the disk 803 which has been set opposite it by the differential mechanism.

The slide 805 has a control surface 811 cooperating with the pin 812 on a fed pawl 813, pivoted on a lever 814, carrying rollers 815, which cooperate with and are operated by a pair of cams 816 secured to the printer shaft 500. The lever 814 is pivoted on the shaft 649 and the pin 812 is held in contact with the surface 811 by a spring 817.

This feed pawl 813 cooperates with a ratchet 818 having alternate high teeth 819 and low teeth 820, for a purpose to be hereinafter described.

This ratchet 818 is secured to a gear 821, which drives a ring gear 822, which through its internal teeth drives a pinion 823 and an automatic shaft 824.

By referring to space 26 of the time chart (Fig. 108), it can be seen that the cams 816 cause a clockwise movement of the lever 814 and consequent back-up of the pawl 813 at 150 degrees of time, and that this back-up motion is completed at 210 degrees. Then at 290 degrees the cams 816 rock the lever 814 counter-clockwise, at which time the selection, according to space 31 of this time chart of Fig. 108, has already been made, and the pawl 813 will be moved to the left to the position shown in Fig. 67, except that it will have been lowered into contact with either one of the high teeth 819 or one of the low teeth 820 to operate the ratchet 818, which in turn will operate the gears 821 and 822 to turn the automatic shaft 824. The pawl 813 will engage one of the high teeth 819 or one of the low teeth 820, or it may be held above all teeth 819 and 820, depending upon the position of the disk 803 set under control of the transaction bank in all adding operations.

There is also a disk controlled by the total row of keys which will be hereinafter described. The disk has a notch in its zero position so that the pin 804 can be dropped low enough to fall into the deep notches in the sixth and eighth positions of the disk 803 upon depression of the Check key or the Check correction key.

This pawl 813 will receive a reciprocating motion at each operation of the machine, or, in other words, upon each rotation of the cam shaft 500. If the pin 804 is in the notch in the sixth or eighth position of the disk 803, which is a deep notch, then the pawl 813 may engage the short teeth 820 to cause the automatic feed. If the pin engages the medium depth notches in the first, seventh or ninth positions, then the pawl will not engage the short teeth 820, but will engage only the long teeth 819 to restore this ratchet 818 into position to effect an automatic feed the next time that automatic feed becomes necessary through the entry of a series of checks.

When the disk 803 is set to the second, third, fourth or fifth position, which corresponds to the Deposit correction key 155, the Analysis key 156, the Deposit key 157, or the Overdraft key 158, the pin 804 will be held sufficiently high to cause the surface 811 to hold the pawl 813 high enough so that during its reciprocating motion by the lever 814 the pawl will not only miss the low teeth 820, but will also miss the high teeth 819, because during the operations when such keys 155 to 158 are depressed, it is desirable not to operate the ratchet 818 because checks are not being listed at this time.

The intermediate positions, 1, 7 and 9 of the control disk 803 always insure that the ratchet is brought to the position shown in Fig. 68, if it is not already there. In other words, when the pin 804 is in this intermediate position, the pawl 813 is lowered sufficiently to catch one of the high teeth 819 and move the ratchet one step, which will restore the same to the position shown in Fig. 68, if it has been left in another position at the end of the listing of a series of checks.

As above mentioned, this automatic feed of the ratchet 818 is also partly controlled from the total row of keys.

This control is through a disk 830 (Fig. 66) which cooperates with the pin 804 on the slide 805. This disk is secured to a hub 831, to which is secured a gear 832 (Fig. 49) driven from a ring gear 833, in turn driven from a pinion 834 on the total shaft 616. Therefore, this disk 830 (Fig. 66) will receive a differential positioning under control of the keys 163 to 168 of the total row. In the zero position of this disk 830, which is the add position, in other words, the position which the differential assumes during all adding operations, there is a deep notch opposite the pin 804, so that the slide 805 can drop sufficiently low to cause the pawl 813 to engage the low tooth 820 on the ratchet 818 when it is necessary to have the automatic feed for the statement sheet and the journal sheet. In the positions 1, 2, 4, 5 and 6 of the disk 830, which positions correspond to the New balance key 163, the Sub-balance key 164, the Sub-total key 166, the Clear key 167, and the New balance N. T. key 168, the disk is notched to a depth of the intermediate position corresponding to the 1,7 and 9 positions of the transaction controlled disk 803, to always insure that the pawl 813 restores the ratchet 818 to its normal postion so that it will be ready to effect an automatic feed of the statement sheet and the journal sheet when entering a series of checks in the manner previously described in connection with the disk 803, which is controlled from the first transaction bank of keys.

The "3" position on the disk 830 is a high position, and when in this position, which corresponds to the Indicator balance key 165, it holds the pin 804 high enough to cause the pawl 813 to be reciprocated idly back and forth. This key is operated only when the operator wishes to ascertain the balance on the balance totalizer, and as this operation does not cause any printing on any of the printing mediums in the machine, there can never be any necessity for feeding either the statement sheet or journal when this key is depressed, and therefore, this high position in the three position of the disk 830 will insure that the feed pawl 813 is given an idle movement.

The drive means from the first transaction bank, and also from the total row to control the drive for the automatic feed and automatic check hammer operation in connection with the statement sheet and in connection with the journal sheet having been described, for the selecting and control unit, it now remains to describe the actual selecting and control disks in that unit, which operate with the feeler mechanism for the statement sheet feed, the journal sheet feed, the check hammers for the statement sheet and the check hammers for the audit sheet.

These disks will now be described. A disk 841 (Figs. 27 and 86) is used to cooperate with the feeler mechanism for the statement sheet check hammer 513 and is driven by a pinion 842 on the automatic drive shaft 824.

Since a two-position feeler is required to control the automatic operation of this hammer, the disk 841 has a double system of alternate notches and high spots, notches being required to cause the operation of this hammer 513 alternately after the entry of more than two checks in connection with any one particular posting transaction.

Therefore, this disk 841 (Fig. 86), in conjunction with the automatic mechanism shown in Fig. 68, is operated as above described under control of the keys in the first transaction bank and the total row to ultimately determine the operation of the statement sheet check hammer 513, so that it will always operate every first, third, fifth, seventh, and son on, time during the successive entry of a plurality of checks for any one particular posting operation.

Associated with the statement check hammer 515 is a disk 843 (Figs. 29 and 90) driven by a pinion 844 on the automatic shaft 824.

The disk 843 is identical with the disk 841, but is one step in advance of the disk 841, to control the automatic or alternate operation of the hammer 515 upon the entry of every second, fourth, sixth, and so on, check, during the successive entry of a plurality of checks in any one posting transaction.

The next control disk to be considered is that in connection with the automatic control of the table feed, which carries the statement sheet, and this is accomplished by a disk 845 (Figs. 29 and 82) driven by a pinion 846 on the automatic shaft 824.

The disk 845 is provided with alternate notches and high spots so that the table will be fed under control of the automatic operation upon the printing of the third, fifth, seventh, and so on, checks when a series of checks is entered during the entry of any one particular posting transaction.

The automatic feeding of the journal sheet must of necessity take place at exactly the same time that the automatic feeding of the statement sheet table takes place, and therefore there is provided in conjunction with the control for the journal feeding mechanism a control disk 847 (Figs. 29 and 96) driven by a pinion 848 on the automatic shaft 824.

This disk 847 is identical with the disk 845, which assists in the control of the automatic feed of the statement sheet table, so that the journal sheet will be fed upon the entry of every third, fifth, seventh, and so on, checks, which occurs during the successive entry of a plurality of checks of any one posting transaction.

Assisting in the automatic control of the journal check hammer 531 is a control disk 849 (Figs. 29 and 71) driven by a pinion 850 on the automatic shaft 824. This disk has alternate high and low spots, so that the audit check hammer 531 will be operated upon every first, third, fifth, and so on, check entry operations in a series of check entries involved in any one posting transaction.

Associated with the journal check hammer 533, to assist in the automatic control thereof, is a disk 851 (Figs. 29 and 72) driven by a pinion 852 on the automatic shaft 824. This disk is identical with the disk 849, except that it is advanced one step, so that there will always be an automatic operation of the check hammer 533 upon the entry of every second, fourth, sixth, and so on, check, in the entry of a series of checks for any one particular posting transaction.

To assist in properly alining the automatic disks which have just been described, there is provided an alining disk 853 (Figs. 27 and 70), which cooperates with the previously described aliner bar 577 in the manner in which this bar alines all of the other disks shown in Fig. 70.

*Supporting frame for audit strip or journal.*

The audit strip or journal sheet is located at the extreme right-hand end of the machine and at the front part thereof. This strip is mounted in a frame which is slidable into and out of active position. It is slidable out of active position for the purpose of easily reloading when necessary. After the frame has been slid outwardly from the machine, it may also be tilted at right angles to make it easier to stretch a leading end of a new strip roll.

Since all of the audit strip mechanism has been minutely described in detail in the above-mentioned Placke application, Serial No. 384,930, only so much of this mechanism will be described in this application as is necessary for a clear understanding of the present invention.

The audit strip frame proper comprises a left side plate 860 (Fig. 73) and a right side plate 861 (Fig. 74) tied together by means not shown herein but fully described and illustrated in the above-mentioned Placke application.

Also the means for sliding the frame in and out of the machine and for tilting it for easy loading has also been omitted from this application.

The sides of the audit strip frame are covered by the regular cabinet 135 (Fig. 1), and the front and top portions are covered by a hinged cover 862. The top portion of the cover 862 has an opening 863 for the purpose of making auto- graphic notations on the audit strip or journal sheet, if desirable.

To properly thread the leading end of the audit strip or journal sheet around in the frame, so that it can be properly printed upon, the leading end is fed from a supply roll 865 (Fig. 74) upwardly over a roller 866 mounted on studs projecting from the plates 860 and 861, thence over said roller and around another roller 867, supported by shiftable side plates 868 and 869, and thence to the right around a roller 870 carried by said plates and over a roller 871 carried by said shiftable plates and over a roller 872 supported by the plates 860 and 861, and thence downwardly around a pair of knurled feed rollers 873 (only one of which is shown) journaled on a shaft 874. The strip is then fed between the pair of feed rollers 873 and a pair of tension rollers 875 (only one of which is shown), each of which is mounted on a lever 876 pivoted on a rod 877 supported by a channel 878 secured to the tie bar 127. Springs 879 hold the tension rollers 875 against the paper so that, when the feed rollers 873 are rotated in a manner to be described hereinafter, the paper will be fed toward the left as viewed in Fig. 74. From the rollers 873 and 875, the paper enters a chute 880, and from here it is fed out through a slot 881 in the cover 862.

*Audit strip shifting mechanism*

In order that the last several printed records on the audit strip may be visible to the operator through the opening 863 in the hinged cover 862, there has been provided a shifting mechanism to shift the strip from the normal position up to a position adjacent the hammers and the type wheels and then, after the printing has been made, back to a position whereby the last print is visible through the opening 863, as mentioned above.

Assume that the last print is at the point marked 885 (Fig. 74). It will be necessary to shift this point on the audit strip from that position toward the right to a point 886 directly beneath the type wheels 534 on the shaft 510. After the audit strip has been shifted to that position, feeding mechanism to be described later is then operated to position the last printed item, which is now at point 886, one step to the right, as viewed in Fig. 74, so that the new print will be just below or to the left of the print which has been moved from point 885 to point 886.

The mechanism for accomplishing the shifting of the audit strip as above mentioned will now be described. As mentioned previously in connection with the frame for supporting the audit strip, three of the rollers—namely, 867, 870, and 871—are carried by a frame consisting of the shiftable plates 868 and 869, which slide on rollers 887 and 888 (Fig. 73) carried by the side plate 860 and on a pair of rollers 889 and 890 (Fig. 74) carried by the plate 861.

The plate 869 has a stud 891 (Fig. 73) engaged by an arm 892 fast on the shaft 874. Also secured to this shaft is an arm 893 carrying a pin 894 engaged by an arm 895 fast to a short shaft 896 supported by the printer frame 125 (Fig. 24). Also secured to this shaft 896 is an arm 897 connected by a link 898 to a lever 899 pivoted on a shaft 900 supported by the printer frames 124 and 125.

This lever 899 carries rollers 901 cooperating with a pair of cams 902 fast to the printer drive shaft 500. Timing of this pair of cams is shown in space 7 of the time chart of Fig. 107.

The timing is such that before the printing takes place, and before the feeding takes place, the cams 902 rock the lever 899, which, through the link 898, rocks the shaft 896 and the arm 895, which in turn rocks the arm 893, the shaft 874, and the arm 892 in a clockwise direction to move the plates 869 and 868 to the right as viewed in Figs. 73 and 74.

When this occurs, there is no unwinding of the audit strip from the supply roll 865, nor is there any winding of the audit strip around the rollers 873. As the roller 867 is moved to the right, the paper is "given up" and taken up by the roller 870, as it is moved to the right, thus bringing the point marked 885 to the point marked 886, which is directly beneath the type wheels. After this movement of the audit strip, the feeding mechanism to be described hereinafter advances the strip one space to place a clean portion of the strip just to the left of the point 886, ready to be printed upon.

After all of the printing on the audit strip has taken place, the cams 902 reverse the motions of the levers and arms described above, thus rocking the arms 892 and 893 counter-clockwise to move the plates 868 and 869 back to the position shown in Figs. 73 and 74. During this movement, the audit strip around the roller 870 is "given up" and is taken up by the roller 867, as it moves to the left to its normal position. Thus, at the end of this operation, the point marked 885 would be left at a point marked 903, and the last print would again be at the point marked 885. It might be well to state here that the above-described shifting movement of the audit strip takes place during each adding operation of the machine and during the second cycle of all total-taking operations of the machine.

*Audit strip machine feeding mechanism*

As explained above, after the audit strip or journal sheet has been shifted to the right, as viewed in Fig. 74, the strip feeding mechanism functions to feed the strip to bring a fresh portion thereof to receive the impression below the last impression, which had taken place during the previous operation of the machine.

This feeding mechanism is shown in Fig. 74 and includes a ratchet 910 secured to one of the feed rollers 873. Cooperating with the ratchet 910 is a pawl 911 pivoted at 912 on a lever 913. A spring 914, stretched between a tail on the pawl 911 and an arm of the lever 913, maintains the pawl 911 in constant engagement with the ratchet 910. Connected to the lever 913 by a hub (not shown) is an arm 915 carrying a pin 916. A spring 917 holds the parts in the position shown in Fig. 74, wherein a finger 918 stops against a collar on a shaft 919 supported by the plates 860 and 861, and the pin 916 is held in close proximity to a lever 920 journaled on a shaft 921 supported by the printer frames 124 and 125 (Fig. 24). The lower end of the lever 920 carries a stud 922 (Figs. 74 and 75) adapted to cooperate with a coupling and operating link 923, which is held in the position shown in Fig. 74 by a selecting mechanism to be described hereinafter. This link 923 is pivoted to a lever 924 pivoted on the shaft 900 and carries rollers 925 cooperating with a pair of cams 926, which are adapted to operate the audit strip feed, as shown in space 12 of the time chart of Fig. 107. These cams 926 are so timed that, before the impression takes place, as has been stated above, the link 923 will be moved to the right. However, before such movement, the selecting mechanism to be described hereinafter lowers the link so that it may engage the stud 922. When this engagement has taken place, the movement of the link to the right rocks the lever 920 counter-clockwise, thus rocking the lever 913 clockwise, which causes the pawl 911 to turn the ratchet and operate the feed rollers 873 to feed the audit strip in the manner mentioned previously.

In Fig. 75, the cams 926 are shown in their moved non-feed position, and in this position it can be seen that, when the coupling and operating link 923 moved to the right, it moved entirely free of the stud 922 and the lever 920, and consequently no feed of the audit strip took place during the operation illustrated in Fig. 75.

After the impression has been made on the audit strip, the cams 926 reverse the movement of the lever 924 and drive the link 923 to the left, and, if it has been engaged with the stud 922, the lever 920 is rocked clockwise to normal position, whereupon the spring 917 restores the lever 913 counter-clockwise to its normal position, thus moving the pawl 911 back to the left to the position shown in Fig. 74, ready to feed the audit strip on the next operation.

Since there is to be no feed after the first check operation, and as the feeding feelers later described have been moved against the control disks, and while they are in these positions, either the disks 745 or 761 (Figs. 95 and 93) may be turned, and therefore it is necessary to move said feeler away from said disks. Therefore there is an arm 904 adapted to contact a pin 905 on the arm 931 and remove the feelers from the disks. This is accomplished when the feed link moves idly to the right (Fig. 74) by a pin 906 on the link 923 engaging an arm 907 integral with the arm 904 and rocking these arms counter-clockwise, which rocks the lever 931 clockwise to free the feelers from said disks. Normally an arm 908 contacts the bar 127 to hold the arms 904 and 907 as shown in Fig. 74.

The means for connecting the coupling and driving link 923 to the stud 922 (Figs. 74 and 75) will now be described. Connected to the link 923 is a link 930, which is also connected to an arm 931 pivoted on the previously described shaft 748. A spring 932 normally holds a finger 933 of the arm 931 against a pin 934 of an arm 935 fast on the shaft 748.

This shaft 748 is adapted to be rocked first counter-clockwise and then clockwise to its normal position once during each operation of the machine by an arm 936 (Fig. 33), which is secured to the shaft 748 and which is connected by a link 937 to a lever 938 pivoted on the shaft 900. The lever 938 carries rollers 939 cooperating with a pair of cams 940 secured to the cam shaft 500. The timing of these cams is shown in space 10 of the time chart in Fig. 107, and it can be seen from this that, prior to the feeding of the audit strip, the cams 940 rock the lever 938 clockwise, which rocks the shaft 748 counter-clockwise, and then, after the printing has taken place, the cams 940 reverse the motion of the lever 938 and the arm 936 and consequently rock the shaft 748 clockwise to its normal position.

As this shaft is rocked counter-clockwise, as described above, the spring 932 will move the arm 931 counter-clockwise, thus lowering the link 923 so that it will be coupled with the stud 922 to operate the audit strip feeding mechanism in the manner described previously.

However, the downward movement of this arm 931 is dependent upon the positioning of several of the selecting disks, previously described, of the selecting and control unit. There are, in this particular instance, six disks shown in Figs. 92 to 97 inclusive, all of which assist in the control of the movement of the arm 931 downwardly. In other words, the six disks in Figs. 92 to 97 inclusive determine whether or not the audit strip feeding means will be operated; that is, whether or not the coupling link 923 will be lowered into operative engagement with the stud 922, so that the feeding can take place in the manner described previously.

Associated with these six links is a feeling mechanism which will now be described.

This arm 931 is shown in Fig. 94 and has a finger 941, which cooperates with the selecting disk 627, which is operated under control of the total row of keys 163 to 168 inclusive. There are notches in the add position and in the second, fourth, fifth, and sixth positions of this disk, which will permit the finger 941 to enter therein whenever an adding operation is taking place, which is the position shown, or whenever the Sub-balance key 164 is depressed, or the Sub-total key 166, the Clear key 167, or the New balance N. T. key 168 is depressed.

Since a notch is required to cause the arm 931 to move counter-clockwise, it can be seen that, whenever this disk is set in the add position, as shown, or the second, fourth, fifth, or sixth position, the notch in this disk 627 will permit movement of the arm 931 counter-clockwise. This counter-clockwise movement, however, is dependent upon the other five disks in Figs. 92, 93, and 95 to 97. Pivoted to the arm 931 is a feeler block 942, which has two fingers 943 and 944 (Fig. 92) cooperating with the disk 565, which is set under control of the transaction row of keys, and a finger 945, which cooperates with the disk 761, which is set upon operation of the audit strip deposit hammer 535. When the deposit hammer 535 is operated, it moves the disk 761 one step to present the notch in this disk opposite the finger 945. This would mean that the deposit key in the fourth position of the transaction bank was operated, and consequently the disk 565 of Fig. 92 would be set in the fourth position. It will be noted that there are two sets of numbers, one Arabic and the other Roman, around this disk 565. The Arabic number positions cooperate with the finger 943 and the Roman numeral positions cooperate with the finger 944, and therefore, since the Deposit key corresponds to the fourth position, the Roman number IV notch will be positioned opposite the finger 944.

As far as these three disks are concerned, with the operation just mentioned, the fingers 944, 945, and 941 could all enter notches and therefore the arm 931 could be rocked counter-clockwise to couple the link 923 with the stud 922. However, there is still another condition to be considered, as the arm 931 has pivoted on the other side thereof a feeler block 946 (Figs. 95, 96, and 97), having a finger 947 cooperating with the selecting disk 745, set by the audit strip check hammer 531. The feeler block 946 also has a finger 948, which cooperates with the automatically operated disk 847. The feeler block is provided with a third finger 949, which cooperates with the disk 567, the latter also being set under the control of the first transaction bank.

Let us also assume that a check has been entered prior to the deposit operation, which caused the operation of the check feed hammer 531, whereupon the disk 745 would be moved one step to position its notch opposite the finger 947. During the operation of this check hammer, the automatic disk 847 was positioned one step, so that a high spot is now opposite the finger 948. Also, since there was a deposit operation following the check operation, as mentioned above, the control disk 803 (Fig. 65), which controls the automatic feed pawl 813, has a high spot, and this disk 847 still remains with the high spot opposite the finger 948. However, since the fourth position of the disk 567 has a notch which has been positioned opposite the finger 949, this block 946 can pivot and the finger can enter the notch in the fourth position. Therefore, with the fingers 944, 945, and 941 of Figs. 92, 93, and 94, respectively, entering notches, and the finger 949 entering a notch, the arm 931 will be rocked in a counter-clockwise direction upon a second entry of a deposit, because it is necessary to feed the audit strip after each deposit if there is no New balance key 163 depressed after the first deposit. In other words, after successive deposit entries, the audit strip should be fed each time, and it is fed by this combination of notches in the manner described above.

Many other combinations of these notches in these disks in Figs. 92 to 97 control the feeding of this audit strip. However, it is felt that it is unnecessary to go into a minute description of all the various combinations which might present themselves.

It is thought that it is sufficient to state that, when the two fingers 947 and 948 of the lower block can enter notches simultaneously in the disks 745 and 847, and at the same time when the finger 941 can enter a notch in the disk 627, and when the fingers 944 and 945 can at the same time enter notches in the disks 565 and 761, then a feed of the audit strip will take place. There is one other condition—if the finger 944 or 945 or both of them should be blocked out and it would be possible for the finger 943 to enter a notch at the same time that the finger 941 of the arm 931 proper enters the notch, then there could be a feeding of the audit strip.

It might also be stated here that when successive checks are entered in connection with a posting operation, the audit strip must feed after the entry of the second check, and also after the entry of the fourth, sixth, and all even-numbered checks, there must be a feeding of the audit strip.

When this occurs, the automatic disk 847 (Fig. 96) comes into play, so that a notch will be brought opposite the finger 948 at the proper time, so that, after the entry of each second, fourth, sixth, and so on, checks, the block 946 may be rocked counter-clockwise, so that the finger 948 can enter the notch in this disk; because the operation of the check hammer 531 has previously set the disk 745 so that the finger 947 would enter into its notch.

It makes no difference during this operation that the disk 567 has a high spot opposite the finger 949, because the block 946 can pivot as long as the two lower fingers 947 and 948 are simultaneously opposite notches. Considering the three disks of Figs. 92, 93, and 94, during the entry of checks, this being an adding operation, the disk 627 will be in the position shown, and therefore the arm 931 can operate. However, the block 942 will have its finger 945 blocked by a high spot on the disk 761, due to the fact that the deposit hammer has not been operated, and therefore it will be necessary for the finger 943 to find a notch in the disk 565, which it will find in the sixth position, indicated by the Arabic number 6, which corresponds to the Check key 159 position, which is the sixth position of the first transaction bank, and therefore there will be a feeding of the audit strip, in the manner described above, alternately.

In case of necessity, there is provided a "hand" feed for the audit strip, which includes a pin 980 (Fig. 74) on the feed ratchet 910, which is contacted by an arm 981 of a lever 982 having a finger piece 983 extending outside the cabinet 135 (Fig. 1). Downward pressure on the finger piece 983 raises the pin 980 and rocks the feed ratchet 910 clockwise to feed the audit strip. A spring 984 restores the parts to normal positions upon release of the piece 983.

To prevent overthrow of the feed rollers 873 during an operation of the machine, there is a ratchet 854 (Fig. 77) secured to one of the feed rollers 873. The teeth in this ratchet are reverse from the teeth of the ratchet 910. Cooperating with this ratchet is a pawl 855 carrying a pin 856 normally held against a cam arm 857 by a spring 858. This cam arm is fast on the shaft 874, which is rocked clockwise to shift the audit strip. The arm 857, by its contact with the pin 856, holds the nose of the pawl 855 disengaged from the ratchet 854; however, when the shaft 874 is rocked clockwise to shift the audit strip, the surface 859 of the arm 857 is so shaped that it will permit the spring 858 to rock the pawl counter-clockwise to engage the ratchet 854 to prevent overthrow of the feed rollers by the feed ratchet 910 and its pawl 911. When the shaft 874 is returned counter-clockwise to normal, the surface 859 raises the pawl 855 and holds it away from the ratchet 854.

In connection with the audit strip supply roll, there is means provided which will cause a locking of the machine when the paper on the supply roll 865 has been exhausted.

This mechanism will now be described and includes a feeler 951 held in contact with the periphery of the supply roll 865 by a spring 952 connected to an arm 953, which is also connected to the feeler 951. The arm 953 is connected to an arm 954 held in front of a hook arm 955 pivoted at 956 to a lever 957 pivoted on a stud 958 on the frame 124. The hook arm 955 is slotted to ride on a stud 959 in a plunger 960 normally flush with the front edge of a cabinet 135, as shown in Fig. 73. This lever 957 is connected to a lever 961 pivoted on a stud 962 on the frame 124, and a spring 963 tends at all times to push the arm 955 against the arm 954. The plunger 960 is also pivoted at 964 to the lever 957, and therefore this plunger is also in a position to be urged to the left by the spring 963 when the arm 954 is moved below a shoulder 965 of the hook arm 955. This condition occurs when the supply roll 865 becomes exhausted, because the spring 952 is constantly urging the feeler 951 in a clockwise direction and at the same time constantly urging the arm 954 clockwise, so that, as the supply roll 865 diminishes in size, the arm 954 will eventually slip under the shoulder 965 on the arm 955, and when this occurs, the spring 963 will rock the lever 957 clockwise and force the plunger 960 so that the front end thereof will extend beyond the cabinet 135 to call the operator's attention to the fact that the paper of the supply roll 865 has been exhausted. At the same time, the lever 961 (see also Fig. 23) is moved counter-clockwise beneath a flange 966 of a lever 967 pivoted on the shaft 510. This lever 967 has connected thereto a link 968, the upper end of which is connected to an arm 977 secured to a shaft 969, which is carried by the plate 504 and a bracket 256 (Fig. 4). Also secured on this shaft 969 (Fig. 23) is an arm 971 carrying a pin 972, against which is held an arm 973 by a spring 974. Pivoted to this arm 973 is a link 975, which is also pivoted to a plate 976 secured to the machine release shaft 139, which, it will be recalled, is rocked clockwise whenever the machine is released for operation.

Normally, with everything in normal position, the clockwise movement of the shaft 139 raises the link 975, which rocks the arm 973 clockwise, and this arm, being in contact with the pin 972, rocks the shaft 969 and the arm 977 clockwise and raises the link 968 (Fig. 73), which rocks the lever 967 clockwise. With the parts in their normal positions—that is, with the supply roll with plenty of paper thereon—the flange 966 of the lever 967 can pass down to the left of the lever 961. However, when the lever 961 has been moved to the left, as described previously, when the supply roll 865 is exhausted, the lever 967 cannot be moved, and therefore the shaft 969 cannot be rocked by the arm 973. Consequently the release shaft 139 cannot be rocked clockwise, and the machine is locked against operation whenever the supply roll 865 is exhausted.

*Audit strip printing hammers*

As has been previously described, there are five hammers which are operated to print the data on the audit strip or journal sheet. These hammers are all shown diagrammatically in Fig. 25 and, as above mentioned, are as follows:

The hammer 529 prints the old balance pick-ups; the hammer 531 prints the checks in the left-hand check column; the hammer 533 prints checks in the right-hand check column; the hammer 535 prints all deposits; and the hammer 537 prints all new balances and certain other totals which are printed by the machine.

*Hammer raising and lowering means*

As shown in Fig. 74, the hammers lie directly beneath the rollers 870 and 871, which rollers are directly beneath the type wheels 528, 530, 532, 534, and 536, shown in Fig. 25. Therefore it is necessary that all of these hammers be moved upwardly to a position in closer proximity to the type wheels prior to taking an impression from the type wheels by these hammers, because the distance as shown in Fig. 74 from the type wheels to the hammers is greater than it is practical to move the hammers for taking an impression. Therefore, means is provided to raise the hammers to a closer position to the type wheels after the rollers 870 and 871 have been moved to the right by the audit strip shifting mechanism previously described, so that it will require only a short movement or impression blow by the hammer to take the impression from the type wheels on the audit strip or journal sheet.

Such raising and lowering mechanism will now be described, with particular reference to Fig. 71.

All of the audit hammers 529, 531, 533, 535, and 537 are simultaneously raised by a single camming device, which will now be described in detail. This device is shown in space 8 of the time chart on Fig. 107.

Secured to the cam shaft 500 is a pair of cams 987 cooperating with rollers 988 on a bell crank 989 pivoted on the shaft 900 and connected by a hub to an arm 990, to which is pivoted a link 991. This link is pivoted to an arm 992 secured to the shaft 921.

Also secured to the shaft 921 are five arms 993, one for each of the hammers 529, 531, 533, 535, and 537 (see also Fig. 25). Each arm 993 has two fingers 994 and 995, which cooperate with a pin 996 of a lever 997 journaled on the shaft 921. There are five of these levers 997, one for each of the hammers. Each of the levers is connected by a link 998 to its respective hammer 529, 531, 533, 535, and 537. These hammers are all pivoted on a shaft 999 carried by the frames 124 and 125.

After the audit strip rollers 870 and 871 begin to move to the right, as viewed in Fig. 74, the cams 987 rock the bell crank 989 clockwise, thus rocking the arm 992, the shaft 921, and the five arms 993 in a counter-clockwise direction. It will be noted that there is considerable distance between the pin 996 and the finger 995 of the arm 993, and consequently such movement is idle as far as the lever 997 is concerned. However, after the fingers 995 contact the pins 996, the levers 997 are rocked counterclockwise, whereupon the links 998 raise the hammers 529 to 537 upwardly from the position shown in Fig. 71 to a position in close proximity to the type wheels. By the time the hammers are raised to this position, the rollers 870 and 871 have been moved sufficiently far toward the right so that there can be no interference between the hammers and said rollers.

After the printing has taken place and before the rollers 870 and 871 are moved back to the left to the position shown in Fig. 74 and also in Fig. 71, the cams 987 reverse the motion of the bell crank 989, the arm 990, the link 991, the arm 992, and the shaft 921, whereupon the fingers 994 will first be moved to take up the lost motion between themselves and the pins 996 and finally contact the pins 996 to restore the levers 997 clockwise to normal positions, whereupon the links 998 lower all of the hammers 529 to 537 from their raised positions to the positions shown in Figs. 71 and 74.

*Hammer operating means*

After the hammers have been moved up into the position in close proximity to the type wheels in the manner above described, ready to take a printing impression from the type wheels 528 to 536 of Fig. 25, there is mechanism shown in Fig. 72 for operating all of these hammers to take such printing impressions from said type wheels on the audit strip or journal sheet.

When the audit strip hammers are moved from the positions shown in Figs. 71 and 72 to their positions in closer proximity to the type wheels, as has been above described, it will be remembered that the levers 997 have been moved counterclockwise by the fingers 995. Each lever 997 thus positions its pin 1011 directly beneath a notch in a coupling link 1012, pivoted to a lever 1013 which is fast on the shaft 900. This lever 1013 carries a pair of rollers 1014 cooperating with a pair of cams 1015. The timing for these cams is shown in space 11 of the time chart of Fig. 107.

There is only one pair of cams and one lever 1013 for all five of the hammers 529 to 537. However, there are five of the links 1012, one for each of the levers 997, which have been previously described, so that each of the hammers 529 to 537 may be coupled or uncoupled by the lever 1013, so that the hammers may be individually and selectively operated. Each of these other links 1012, which are identical with the link 1012 of Fig. 72, is pivoted to an arm 1016, shown in dot and dash lines in Fig. 72. One of these links 1012 is shown in Fig. 71, in connection with the audit check hammer 531.

After the pin 1011 has been moved beneath the slot in the link 1012, the cams 1015 rock the lever 1013 and shaft 900, whereby the arms 1016 and lever 1013 move all of the links 1012 to the right. Those links whose slots have been engaged with the pins 1011 will rock the levers 997 further in a counter-clockwise direction, which rocks the links 998 slightly clockwise about their upper pivots to move the selected ones of hammers 529 to 537 into contact with the underside of the audit strip to take an impression from its associated sets of type wheels 528 to 536 (Fig. 25). After the impression has been made, the cams 1015 reverse the action of the lever 1013 and arms 1016 to move the links 1012 back toward the left, to rock the levers 997 clockwise to bring the hammers down to the positions in which they have been moved by the hammer raising mechanism of Fig. 71, in the manner previously described. Then the cams 987, as has been above described, restore the hammers to the positions shown in Figs. 71, 72 and 74.

As shown in Figs. 71 and 72, the coupling links 1012 are not connected to the operating pins 1011, and there is mechanism for causing the connection of these links 1012 to those pins. This mechanism will now be described.

Connected to each of the links 1012 by a link 1020 is an arm 1021, pivoted on the shaft 748. A spring 1022 holds a finger 1023 on the arm in contact with the pin 1024 of an arm 1025 fast on the shaft 748. There are five of the arms 1021 loose on the shaft 748 and five arms 1025 fast on the shaft 748. Each of the arms 1021 carries feeler means which cooperate with notches and high spots on the control plates previously described in connection with the selecting and control unit. These feeling devices will be later pointed out, but at this point it will be sufficient to state that when the feeler fingers are opposite the notches of the plates, the arms 1021 can be rocked counter-clockwise by their springs 1022 a distance sufficient to move the links 1012 to cause their notches to fully engage the pens 1011 so that the hammers can be operated when the arms 1021 and the shaft 748 are rocked by the cams 940 of Fig. 33.

With the coupling links 1012 engaging the pins 1011, it will be clear that a rotation of the cams 1015 will cause an oscillation of the link 1012 first to the right and then to the left to operate the lever 997 to move the selected hammer 529, 531, 533, 535 or 537 into cooperation with the underside of the audit strip to take an impression from its associated set of type wheels.

The feeling means which is carried by the arms 1021 associated with all of the hammers that cooperate with the audit strip will now be described. In describing the selecting means for the audit strip hammers, that associated with the old balance hammer 529 (Fig. 25) will be first described.

It will be remembered that this hammer is controlled by two disks 569 and 629, the former being controlled by the first transaction bank of keys and the latter being controlled by the total row of keys. These two disks are shown in Figs. 29 and 110. Pivoted to the arm 1021 for the old balance pickup hammer 529 is a feeler block 1030 having a finger 1031 cooperating with both of the disks 569 and 629 and another finger 1032 which cooperates only with the disk 629.

Since this hammer is to operate on all operations involving an overdraft pickup and a balance pickup, there are provided two feeling notches in the disk 569, one in the first position and the other in the ninth position, to correspond with the positions of the keys 154 and 162 of the transaction row. These two notches cooperate with the wide feeler fingers 1031, and when either one of these notches is opposite the finger 1031 it will permit a counter-clockwise rocking of the arm 1021. Since the disk 629 is controlled by the total row of keys and as the pickup operations are add operations and there is a notch in the add position of this disk, the wide feeler finger 1031 may also enter this slot at the same time that it enters the notch either in the "1" or "9" positions of the disk which is set under control of the transaction bank of keys.

When, however, the disk 569 is set in any of the other positions under control of any of the keys 155 to 161, there will be no notch presented opposite the finger 1031, and consequently when the shaft 748 is rocked, the spring 1022 cannot rock the arm 1021, due to the fact that there is no notch opposite the feeler finger 1031, and consequently the old balance hammer 529 cannot be operated at this time.

The means for controlling the operation of the check hammer 531 is controlled by the disks 571 and 849 (Figs. 29 and 71), the disk 571 being operated under control of the transaction keys and the disk 849 being operated by the automatic feed mechanism of Figs. 64 to 68 inclusive.

By referring to Fig. 71 it will be noted that the arm 1021 for the hammer 531, which is the check hammer, carries a feeler block 1033 having a wide feeler finger 1034, which cooperates with both of the disks 571 and 849, and a single feeler 1035, which cooperates only with the disk 571. This disk 571, being set by the transaction keys, has notches in the sixth and eighth positions only, which correspond to the Check key 159 and the Check correction key 161 positions, respectively, because it is only during the operation of these two keys that this hammer is to be operated.

It will be recalled that during a posting operation where there are more than two checks entered, the two check hammers 531 and 533 operate alternately. In other words, for every other check beginning with check No. 1, the hammer 531 is operated and for every other check beginning with check No. 2 the hammer 533 is operated. Therefore, the automatic disk 849 is used to control the operation of these hammers. As shown in Fig. 71, the automatic selecting and control disk 849 has notches in every other position beginning with the position opposite the finger 1034 so that upon the printing of the first check the hammer 531 can operate due to the fact that at that time there will be a notch in the disk 849 in alinement with the notch in either the sixth or the eighth position, which has been moved around opposite the finger 1034, to permit a counter-clockwise movement of the arm 1021 to lower the coupling link 1012 into engagement with the operating pin 1011, so that the hammer 531 can be operated by the cams 1015. During the latter part of this operation and after the printing has taken place, the automatic mechanism of Fig. 68 functions to turn the disk 849 so as to present a blank spot opposite the finger 1034, so that upon the entry of a second check this hammer 531 cannot be operated because its associated arm 1021 cannot be rocked counter-clockwise due to the blocking of the movement of the finger 1034 by the high spot on the disk 849.

Therefore, upon the entry of the second check, the hammer 533 is to be operated and this hammer is controlled by a feeler block 1036 pivoted to the arms 1021 for the check hammer 533. This block has a wide feeler 1037 cooperating with the disks 572 and 851 (Figs. 29 and 72) which are set under the control of the first transaction bank and the automatic mechanism, respectively. In this disk 572 there are notches in the sixth and eighth positions corresponding to the Check key and the Check correction key for the first transaction bank, and in the automatic disk 851 there are alternate notches. However, there is no notch opposite the feeler 1037 in the position shown in Fig. 72. This condition prevails during the entry of the first check and the printing thereof by the hammer 531. However, it will be recalled that after the printing operation of this hammer 531 the automatic mechanism of Figs. 64 to 68 inclusive turned the disk 851 one step, which then would put a notch opposite the feeler 1037, so that during the entry of this second check there will be two notches opposite the feeler 1037, which permits a counter-clockwise movement of the arm 1021 connected to the check hammer 533, so that upon the entry of the second check, it will be the hammer 533 that prints this instead of the hammer 531.

After the printing of this hammer, the automatic mechanism is again operated during this same operation to now turn the disk 849 of Fig. 71 one step so as to present a notch opposite the finger 1034 so that this finger may enter the notches the next time, to cause the third check to be printed by the hammer 531. At the same time, the disk 851 is turned one step so as to again position it in the position shown in Fig. 72, so that the hammer 533 cannot operate on the printing of the third check. This alternate operation of the hammers 531 and 533 continues so long as checks are being posted successively.

The deposit hammer 535 is operated to list all deposits and is operated upon depression of the Deposit correction key 155 and the Deposit key 157 of the transaction bank. This hammer is controlled by a selecting disk 573 (Figs. 29 and 74) set under control of the transaction bank. This disk 573 has notches in the second and fourth positions to correspond with the Deposit correction and Deposit keys, and cooperates with a feeler block having a feeler finger 1038. The block is pivoted on the arm 1021 for the deposit hammer 535. From this it can be seen that whenever the Deposit key 157 or the Deposit correction key 155 is depressed, the disk 573 will position one of the two notches therein opposite the feeler 1038 so that the feeler 1038 for the deposit hammer 535 can enter one of those two notches, thus permitting a rocking of the arm 1021, and the coupling of its associated link 1012 with the hammer operating pin 1011.

When any of the other keys of the transaction bank are depressed, a high spot is presented to the feeler finger 1038, and consequently the arm 1021 of the deposit hammer cannot be rocked, and this hammer 535 cannot be operated upon the depression of any of the other keys in the transaction row except keys 155 and 157.

The next hammer to be operated in conjunction with the audit strip is the new balance hammer 537 (Fig. 25) which is controlled by two selecting disks 574 and 630 (Figs. 29 and 111). The disk 574 is controlled by the transaction bank and the disk 630 by the total row.

The disk 574 for the transaction bank has notches in the first and the ninth positions corresponding to the Overdraft pickup key 154 and the Balance pickup key 162, and the total disk 630 has a notch in the first position which corresponds to the New balance key 163. Since the new balance may be either positive or negative, the first transaction differential may go to either the first position or the ninth position and therefore it is necessary to have the notches in the first and ninth positions to cooperate with a feeler finger 1040 of a block 1041 pivoted on the arm 1021 associated with the new balance hammer 537. This block 1041 also has a finger 1042 to cooperate with high spots on the disks 574 and 630 when the finger 1042 also cooperates with high spots so there will be no rocking of the block 1041, consequently no rocking of the arm 1021, which causes a non-printing operation of the hammer 537.

The disk 630, which is set under control of the keys in the total bank, has notches in the first, fourth, fifth, and sixth positions. These positions are selected by the New balance key 163, the Sub-total row 1 key 166, the Clear row 1 key 167, and the New balance N. T. key 168. When the balance totalizer is in overdrawn condition and it is desired to take a sub-total from the balance totalizer, the Sub-total key 166 is depressed in conjunction with the Overdraft pickup key 154. When it is desired to clear the balance totalizer, the Clear row 1 key 167 is depressed in conjunction with the Overdraft pickup key 154. When the balance totalizer is in positive condition, the Balance pickup key 162 is depressed in conjunction with either of the two keys 166 or 167, depending upon whether the ensuing operation is to be a sub-total operation or a clearing operation. Also, when a New balance, non-transfer operation is to be performed, the key 168 is depressed in conjunction with either the Overdraft pickup key 154 or the Balance pickup key 162.

Thus it is seen that, in order to properly record the balances taken from the balance totalizer under control of keys 163, 166, 167, and 168, it is necessary to provide notches in the control plate 630 in the positions selected by these keys. For this reason, a notch is provided in the control disk 630 in the first, fourth, fifth, and sixth positions, so that, when any of these notches is positioned opposite the finger 1040, the arm 1021 is rocked to couple the balance printing hammer 537 to the driving mechanism to make a proper entry on the audit sheet.

*Statement sheet table mechanism*

The shiftable statement sheet table herein before mentioned and shown in Figs. 26 and 39, is located at the left of the machine and is provided for presenting the statement sheets shown in Figs. 102 and 105 inclusive, to the printing mechanism. This table 640 is positionable to 39 lines, which is the number of lines provided on the statement sheet. The proper line for printing the first item in a positing operation is always selected by depression of the proper line finding key or keys to be later described, after which the positioning of the table is entirely automatic and requires no further consideration from the operator. The final operation in a posting operation is always a new balance operation and in this operation the table is automatically released and returned to the starting position so that the sheet may be removed.

When the table reaches the thirty-ninth or last line of the statement sheet the machine is automatically locked. If it is desirable to make entries on this line it is necessary to manually release this lock.

When presenting a statement sheet for printing, it is placed on a stationary table 1050 (Fig. 1) which forms a part of the machine cabinet. The statement sheet is guided by a stationary guide 1051 and an adjustable guide 1052. The adjustable guide is for the purpose of properly guiding any of the different sized statement sheets shown in Figs. 102 and 105 inclusive. This guide 1052 is clamped in position by thumb screws 1053, which may be loosened and the guide 1052 moved toward the left to take care of the narrower sheets, if those are to be printed upon. It is set in the position in Fig. 1 to take care of the sheet shown in Fig. 105.

The table 640 has secured thereto rails 1054 and 1055 (Figs. 26, 37, and 39), cooperating with rollers 1056 and 1057, there being four pairs of such rollers whereby the table may be easily rolled or shifted from the front to the back of the machine, and also from the back to the front upon the ejection thereof. These rollers 1056 and 1057 are mounted on studs carried by the printer frames 121 and 122, and the rails 1054 and 1055 are in close proximity to finished sides of these frames so that there is practically no chance for any binding motion of the table as it is moved in either of its directions. The table has four openings 1058, 1059, 1060 and 1061, to accommodate the printing hammers 513, 515, 517, 519, 521, 523, 525 and 527 during their impression movement, so that they may carry the statement sheet and the ink ribbon (not shown) into contact with the groups of type wheels 512 to 526, shown in Fig. 25, to record the various items on the statement sheet.

The underside of the table 640 has gear racks 1062 and 1063 (Figs. 26 and 37) which cooperate with differentially driven gears hereinafter described, which position the table 640 and the statement sheet on its initial movement into the machine.

*Statement sheet locating and holding means*

When a statement sheet is placed on the table, it is pushed inwardly or to the right, as viewed in Fig. 39, until it strikes adjustably located stop studs 1064 on the table, which locate it in position to be differentially positioned from this point on, depending upon whether or not printing is to be made on any of the lines 1 to 39, which positioning is then under control of line finding keys to be hereinafter described.

As the upper edge of the statement sheet is moved into engagement with the stop studs 1064, it passes underneath three gripper arms 1065, secured to pressure yokes 1066 secured to a pressure shaft 1067 mounted in three brackets 1068 which are secured to the top of the table 640. A spring 1069 normally urges the arms 1065 upwardly, but said gripper arms are normally held in the positions shown in Figs. 39 and 53 by an arm 1070 fast on the shaft 1067, which carries a roller 1071 normally contacting a lever 1072 pivoted on a stud 1073 in the frame 129. This lever 1072 has a pair of rollers 1074 cooperating with a pair of cams 1075 secured to the printer cam shaft 500. Since the roller 1071 is in the same plane as the frame 129, said frame has a notch 1076, so that the roller will have clearance when the table 640 is in its normal position, shown in Fig. 53.

The timing for the cams 1075 is shown in space 17 of the time chart in Fig. 107. This time chart shows that at the very beginning of the operation of the shaft 500, the lever 1072 is rocked clockwise to raise the arms 1070 and rock the shaft 1067, and rock all of the gripper arms 1065 counter-clockwise into cooperation with the statement sheet to hold it firmly against the top of the table 640 while it is being fed and printed upon. Immediately after the table 640 has been positioned at least one stop to the right, the roller 1071 rides on top of the frame 129, thus permitting the gripper arms 1065 to hold the statement sheet in the proper position until the table has been finally ejected to its normal home position shown in Fig. 53.

*Line finding keys*

As has been previously stated, line finding keys are provided to select the first line on any of the statement sheets being printed in the machine, after the statement sheet has been placed on the table.

In other words, these line finding keys determine the amount of movement which the table 640 shall receive upon its initial positioning to receive the first check posting or deposit posting. These line finding keys are shown in Figs. 1, 30A, 32, 36, 38, and in plan view in Fig. 29.

These keys set up stops to cause the differential positioning of a differential mechanism to be hereinafter described, which drives a transmission mechanism, which is intermediate the differential mechanism and the racks 1062 and 1063, secured to the under side of the table 640.

There are two banks of unit keys 1080 and 1081. The keys 1080 are for the lines 1, 3, 5, 7 and 9, and the keys 1081 are for the lines 2, 4, 6 and 8. There are also three tens keys 1082, which are numbered 10, 20 and 30. In other words, to select the line 10, the "10" key 1082 is depressed. If the line 13 is desired, then the units key 3—1080 is depressed, along with the "10" key 1082. Likewise, if line 36 is desired, the units key 6—1081 and the tens key 30—1082 is depressed. There is also provided a release key 1083 which may be depressed to release any of the keys 1080, 1081, or 1082 which has been erroneously depressed before the machine starts to operate.

All of these keys are mounted in key frames 1084, supported on rods 1085, carried by the printer frames 123 and 124. A spacing frame 1086 (Fig. 38) is positioned between the tens bank of keys 1082 and the frame 123 to properly side space the keys and their frames 1084.

All of the keys 1080, 1081 and 1082 are held in their normal outer positions by compression springs 1087 (Fig. 38) surrounding the stems of the keys and resting on flanges on the bottom portions of the key frames 1084. The units keys 1080 have studs 1088 cooperating with the usual type of locking detent 1089 slidably mounted on rods 1090 and 1091 supported by the frames 1084 and 1086. This detent 1089 is held in the position shown in Fig. 30A by a spring 1092, in which position the locking hooks of the detent are held adjacent the studs 1088.

The unit keys 1081 have pins 1093 cooperating with a locking detent 1094, also slidably mounted on the rods 1090 and 1091 and held in normal position against the pins 1093 by a spring like the spring 1092.

The tens key 1082 carries pins cooperating with a locking detent 1096 slidably supported on the rods 1090 and 1091, and held in its normal position against the pins 1095 by a spring 1097 shown in Fig. 36.

The lower ends of all of these keys 1080, 1081 and 1082, when depressed, are moved into the path of a latch device on a differential mechanism to be hereinafter described, so as to differentially position that differential mechanism in accordance with the line number of the key or keys depressed. Both of the unit keys 1080 and 1081 control one units differential mechanism, and the tens keys 1082 control a separate tens differential mechanism. When any of the keys 1080, 1081 or 1082 is depressed, its respective locking detents 1089, 1094 or 1096 will be moved to the right until the pin passes beneath the hooks of these detents, thus stretching the springs 1092 and 1097, and after the pins 1088, 1093 or 1095 are below the hooks of the detents, the springs 1092 and 1097 move the detents to the left, whereupon the hooks are above the pins to retain the keys in their depressed positions.

Should any of the keys be erroneously depressed and this discovered before the machine begins to operate, the depression of the release key 1083, through means now to be described, will release any and all keys which have been depressed. The detent 1094 associated with the units keys 1081 has a cam lug 1100, and the detent 1096 for the tens keys has a cam lug 1101. Both of these lugs cooperate with a pin 1102 carried by the stem of the release key 1083. This pin 1102 extends from both sides of the key 1083 and cooperates with the cam lugs 1100 and 1101. When this key 1083 is depressed, the pin 1102 will move the locking detents 1094 and 1096 to the right, as viewed in Figs. 30A, 31 and 36, and thus withdraw all of the hooks on these locking detents from locking engagement with the pins of any of the depressed keys 1081 and 1082. The locking detent 1089 is simultaneously moved to the right at the same time by means of an arm 1103 pivoted on a shaft 1104 which engages a pin 1105 on the locking detent 1094. This arm 1103 is connected by a hub 1106 to an arm 1107 also pivoted on the shaft 1104, which arm 1107 engages a pin 1108 (Fig. 30A) associated with the detent 1089 of the unit keys 1080. Therefore, this locking detent 1089 will receive the same motion toward the right to release the keys 1080 that the locking detents 1094 and 1096 receive when the release key 1083 is depressed.

There is also a key releasing mechanism to release any and all of the keys 1080, 1081 and 1082 which have been depressed, which release mechanism is operated by the machine from the printer cam shaft 500 under control of the previously described selecting disk 562 (Fig. 34) set under control of the transaction keys and a disk 626 which is set under control of the total keys in the total row. This mechanism will now be described.

The tens key locking detent 1096 has a pin 1110. This pin 1110 is engaged by an arm 1111 fast on the shaft 1104, to which is also secured an arm 1112, carrying a pin 1113 engaged by a lever 1114 pivoted on a shaft 1115 supported by the frames 121, 122, 123 and 124. The spring 1116 normally holds the arm 1111 against the rod 1085, and also holds a pin 1117 on the lever 1114 in contact with a finger on a lever 1118 pivoted on the shaft 784. This lever 1118 has a pin 1119 normally engaged by the hook of a link 1120 pivoted to an arm 1121 pivoted on a short shaft 1122 carried by the frames 123 and 124. The arm 1121 is connected by a hub 1123 to an arm 1124 so that they both move in unison. These arms 1121 and 1124 carry a pair of rollers 1125 cooperating with cams 1126 secured to the printer shaft 500. The timing for these cams is shown in space 30 of the time chart (Fig. 108).

The link 1120 has a finger 1130 adapted to cooperate with a pin 1131 on a lever 1132 pivoted on a shaft 1133 carried by the frames 123 and 124. This lever 1132 has a feeler 1134 cooperating with the selecting disks 562 and 626 previously described. Connecting the link 1120 and the lever 1132 is a link 1135. It will be remembered that the disk 562 has notches in the "1," "7" and "9" positions which correspond to the Overdraft pickup key 154, the Space key 160, and the Balance pickup key 162. The disk 626 has a single notch shown in dotted lines, which corresponds to the add position of the total row. During adding operations when accounts are being posted, the disk 626 will be set in its add position, and the disk 562 will be set differentially under control of the keys 154 to 162.

The first thing that happens to the lever 1132 under control of the cams 1126, is that upon the clockwise rocking of the arms 1121 and 1124, the link 1120 is moved to the left, and the finger 1130 contacting the pin 1131 rocks the lever 1132 slightly clockwise to remove the feeler 1134 away from the peripheries of the disks 562 and 626 so that they can be differentially positioned. There is enough clearance between the bottom of the pin 1119 and the hook end of the link 1120 to allow for this movement.

The lever 1132 (Fig. 34) is held in this position according to the time chart on Fig. 108 and space 30 until 315 degrees, at which time the link 1120 is moved to the right by the cams 1126 and arms 1121 and 1124, and if the hook end of the link 1120 is still engaging the pin 1119, it will rock the lever 1118 counter-clockwise, which, through the pin 1117, will rock the lever 1114 clockwise to rock the arms 1112, shaft 1104 and arm 1111 counter-clockwise to move the locking detent 1096 to the right to release any of the keys that have been depressed in the tens amount bank of the line finding keys. This will also move the detents 1089 and 1094 to the right, as viewed in Fig. 31, to release any of the keys 1080 and 1081, respectively, which have been depressed. The connection between the arm 1111 and the detents 1094 and 1089 is through an arm 1138 secured to the shaft 1104. This arm 1138 straddles the pin 1105 on the detent 1094, and consequently this detent 1094 will be moved to the right to release any of the keys 1081 that have been depressed. This movement is transmitted from the pin 1105 of the detent 1094 through the arms 1103, 1107, and hub 1106 to the pin 1108 on the detent 1089, and consequently this detent will be moved to the right to release any of the keys 1080 which have been depressed.

The above releasing of the keys 1080, 1081 and 1082 is accomplished by the feeler 1134 contacting a high spot on the control disk 562 during adding operations, which presupposes that one of the keys 155, 156, 157, 158, 159 or 161 has been depressed during this particular add operation. However, upon an overdraft pickup operation, a space operation, or a balance pickup operation controlled by the Balance pickup key 162, it is desired not to release the keys during such an operation, and therefore, the three positions, namely, 1, 7 and 9, corresponding to those keys, have a low spot or notch which is positioned opposite the feeler 1134 of the lever 1132, and if this positioning has taken place immediately after the finger 1130 of the link 1120 has moved the lever 1132 very slightly in a clockwise direction so that the feeler 1134 will clear the peripheries of the disks 562 and 626, then at 220 degrees time of the cams 1126, the spring 1139 will rock the lever counter-clockwise and cause its feeler 1134 to enter one of the three notches in the disk 562 and at the same time enter the notch in the add position of the disk 626, which is sufficient to cause the link 1135 to lower the link 1120 enough to disengage its hook from the pin 1119 of the lever 1118, and therefore when this link 1120 is moved to the right by the cams as previously described, when releasing the keys 1080, 1081 and 1082, this pin 1119, and consequently the lever 1118 and the parts from there to the locking detent, will not be moved and the keys will not be released on an overdraft pickup operation, a space operation, or a balance pickup operation.

At the very beginning of the last operation, that is, five degrees after the operation starts, the arms 1121 and 1124 are again rocked clockwise by the cams 1126, whereupon the finger 1130, now being contacted by the pin 1131 because its feeler is engaged in the notches in the disks 562 and 626, will rock the lever 1132 clockwise to bring the feeler out of the notches so that the disk can be differentially positioned under control of the transaction keys 154 to 162 for the subsequent operation during which, unless a space operation should follow an overdraft pickup or a balance pickup operation, the keys would be released. In other words, if the next operation after a balance pickup would be the entry of a check, the Check key being in the sixth position, the true periphery or a high spot would be positioned opposite the feeler 1134, and all of the line finding keys 1080, 1081 and 1082 which had been depressed at the beginning of the balance pickup operation would be released during the posting of the checks, which operation is initiated by depression of the Check key 159. In order that the differential mechanisms associated with the units keys 1080 and 1081 and with the tens keys 1082, be stopped in their zero positions when none of the keys in either of these banks is depressed, there is provided in conjunction with the bank of units keys 1080 and 1081 a zero stop 1141 loosely connected to a stud 1142 on a lever 1143 pivoted on the rod 1090. The zero stop 1141 is slidably guided for vertical movement in the lower flange of the key frame 1084. This lever 1143 engages a stud 1144 on an arm 1145 of a bar 1146 slidably mounted on the rods 1090 and 1091. This bar 1146 has cam lugs 1147 adjacent each of the pins 1093 on the units keys 1081.

The bar 1146 carries a pin 1148 engaged by an arm 1149 of a yoke 1150 (Fig. 31) pivoted on the shaft 1104. This yoke 1150 has an integral arm 1151 engaging a pin 1152 on a bar 1153 having cam lugs 1154 adjacent each of the studs 1088 of the units keys 1080.

As shown in Figs. 30—A and 32, the zero stop 1141 is in its normal position; that is, a position to cooperate with the differential latch to be hereinafter described to stop the differential in the zero position. However, whenever any one of the keys 1080 or 1081 is depressed, it will move the bars 1146 and 1153 to the left, as viewed in Figs. 30—A and 32, thus rocking the lever 1143 clockwise and raising the zero stop 1141.

The zero stop mechanism associated with the tens keys 1082 will now be described. A zero stop 1158 (Figs. 36 and 36A) is pivoted on a stud 1159 of a lever 1160 carrying a stud 1161 engaged by an arm 1162 of a bar 1163 having cam lugs 1164 cooperating with the pins 1095 of the keys 1082. The zero stop 1158 is mounted for vertical movement in the lower flange of the tens key frame 1084. When any of the keys 1082 is depressed, its pin 1095 moves the bar 1163 to the left and rocks the lever 1160 clockwise, which raises the zero stop 1158 out of the path of the latch mechanism, to be described later, which is associated with the tens differential mechanism.

Means is provided in connection with the units keys 1080 and 1081 and also in connection with the tens keys 1082 to prevent release of the machine unless the keys are fully depressed. This means which is associated with the units keys 1080 and 1081 will be described first and includes an arm 1165 (Figs. 30—A and 31) integral with the previously described arm 1103, which engages the pin 1105 on the locking detent 1094 and which is connected to the locking detent 1089 by the hub 1106 and the arm 1107. This arm 1165 carries a pin 1166 engaged by a lever 1167 pivoted on the shaft 1115 and held in the position shown in Fig. 30—A by a spring 1168, wherein the arm 1103 is contacting the rod 1085. The upper end of the lever 1167 cooperates with a flange 1169 of a lever 1170 connected by a link 1171 to an arm, not shown but identical with the arm 977 of Fig. 23, which is fast to the shaft 969.

When any of the units keys 1080 or 1081 is only partially depressed, the pin 1105 or the pin 1108, as the case may be, rocks the arm 1165 counter-clockwise, which rocks the lever 1167 clockwise and positions its upper end beneath the flange 1169, whereupon the shaft 969 is held against movement. Consequently, the arm 973 cannot be rocked clockwise by lever 975, and therefore the shaft 139 cannot be rocked clockwise to release the machine.

However, when the key is fully depressed, the upper end of the lever 1167 will be moved under the flange 1169, but, as the pin 1088 or 1093 passes the locking hook on the detent 1089 or 1094, the detent spring 1092 moves the detent over the key pin, which causes the spring 1168 to restore the lever 1167 to the normal position shown in Fig. 30—A, whereby there is no holding of the shaft 969 of Fig. 23, and consequently the release shaft 139 may be rocked clockwise upon depression of the proper key to release the machine.

When any of the tens keys 1082 are depressed only partially, there is a means associated with these keys to also prevent clockwise movement of the shaft 139 of Fig. 23 to release the machine. This means includes the arm 1172 (Fig. 31) connected to the pin 1110 on the locking detent 1096. This arm 1172 is connected by a hub 1173 to an arm 1174 connected to a lever 1175 pivoted on the shaft 1115. The upper end of this lever 1175 is normally out of the path of a flange like the flange 1169 on a lever 1176 connected by a link 1177 to an arm like the arm 977 (Fig. 23) fast on the shaft 969. Therefore, when one of the keys 1082 is only partially depressed, the lever 1175 will be moved beneath the flange on the lever 1176 and will block any movement of the shaft 969, and consequently the spring 974 cannot function to rock the arm 973, and the shaft 139 cannot be rocked clockwise to release the machine.

*Table drive, units differential mechanism, tens differential mechanism, transmission mechanism from both differentials to the table*

In order to drive the table 640 to the first line to be printed upon under control of depressed line finding key or keys, there is provided a positive drive mechanism which drives two differential mechanisms, one of which is associated with the two banks of units keys 1080 and 1081 and the other of which is a tens differential associated with the tens keys 1082. Both of these differential mechanisms in turn join in setting a transmission mechanism intermediate those differentials and the table 640 to set the table exactly to the position corresponding to the line finding key or keys which have been depressed. These mechanisms will now all be described under separate sub-headings.

*Table drive mechanism*

This drive mechanism is shown particularly in Figs. 29, 30—A, and 30—B. This table drive includes a pair of cams 1181 secured to the printer cam shaft 500. These cams are shown in space 18 of the time chart (Fig. 108). Cooperating with the cams 1181 are rollers 1182 carried by arms 1183 and 1184 secured to the shaft 1122. Integral with the arm 1184 is a gear segment 1185 meshing with a pinion 1186 secured to a shaft 1187 carried by the frames 123 and 124. Also secured to the shaft 1187 is a gear 1188 meshing with a rack 1189 carried by a reciprocating driver 1190 slidably mounted on the shaft 1187 between the gear 1188 and the collar pinned to this shaft. The forward end of this driver 1190 (Fig. 30—A) carries a roller 1191 riding on a plate 1192 secured to the bottom of the frames 123 and 124. The forward end of this driver 1190 has a nose extending below the roller 1191 and rides in a slot in the plate 1192 to guide the forward end of the driver 1190. The driver 1190 carries a bar 1193 having a notch 1194 cooperating with a latch device to drive the units differential mechanism later described.

The cams 1181 are so timed that at the proper time the driver 1190 will be moved to the left (Figs. 30—A and 30—B) a definite distance each operation of the machine and will be returned to its normal position, shown in these two figures, near the end of the operation. So far, this driver has been described as only driving the units differential mechanism associated with the keys 1080 and 1081. This same pair of cams 1181, however, drives a differential mechanism for the tens keys 1082, and this is shown in Fig. 36. Secured to the shaft 1187 driven by the cams 1181 is a gear 1195 meshing with a rack 1196 carried by a reciprocating driver 1197 having near its front end a roller 1198 (Fig. 38) to ride upon the plate 1192. The portion of the driver 1197 below the roller extends down and rides in a slot in the plate 1192 to guide the forward end of the driver 1197. The rear end of the driver 1197 slides on the shaft 1187 and is alined thereon by the gear 1195 and the collar pinned on the shaft 1187.

This driver 1197 carries a bar 1199 having a notch 1200 to cooperate with and drive a latch mechanism for the differential associated with the tens bank of keys 1082.

This driver 1197 receives the same reciprocating movement to the left (Fig. 36) and back to the right to normal position as does the driver 1190 of Figs. 30—A and 30—B.

Units differential mechanism

The differential mechanism which is controlled by both banks of units keys 1080 and 1081 includes a differentially adjustable slide 1211 (Figs. 30—A and 30—B) mounted on the shaft 1187 and on a roller 1210 carried thereby, which rolls on the plate 1192. That part of the slide 1211 below the roller 1210 is extended downwardly to ride in a slot cut in the plate 1192 to guide the forward end of the differential slide 1211. This slide 1211 carries a short shaft 1212 having secured thereto a latch lever 1213 carrying at its left-hand end a latch block 1214, which normally rests in the notch 1194 of the driver bar 1193 under control of a spring 1209.

The upper end of the latch lever 1213 is in the path of the zero stop 1141 and the stems of the keys 1080 when any one of these keys is depressed. Therefore, as the driver 1190 and its bar 1193 are moved to the left, the block 1214 carries the latch lever 1213 and the differential slide 1211 to the left until the upper end 1215 of the latch lever contacts one of the depressed keys. When this occurs, the latch lever 1213 is rocked clockwise as the driver bar 1193 continues to the left, and the block 1214 is caused to engage an appropriate notch 1216 in a locking bar 1217 carried by studs on the frame 124. At this time, the continued movement of the driver 1190 and its bar 1193 holds the latch block 1214 in the notch 1216, since the bottom part of the block 1214 then rides on the top of the bar 1193. Therefore the differential slide 1211 is driven only a distance corresponding to the value of the key 1080 depressed.

When one of the keys 1081, which is the left-hand bank of unit keys, is depressed, its key stem will be moved into the path of an arm 1218 fast to the latch shaft 1212, and, if there is no key 1080 depressed and there is a key 1081 depressed, then this latch arm 1218 will strike the depressed key and rock the latch lever 1213 to disengage the block 1214 from the bar 1193 in exactly the same manner as was accomplished by one of the keys 1080.

Adjustably secured to the differential slide 1211 is a rack 1219 meshing with a pinion 1220 loose on the shaft 1133. This pinion 1220 is connected by a hub to a pinion 1221 meshing with a gear 1222 loose on a shaft 1223 supported by the frames 123 and 124. The gear 1222 is connected by a hub 1224 to a pinion 1225, also loose on the shaft 1223, which pinion 1225 drives a gear 1226 (Figs. 30—A, 29, 35, and 37) of a transmission mechanism later described.

Therefore, the differential positioning of the slide 1211 is, through the gearing and racks just described, imparted to a transmission mechanism which will differentially position the table 640 according to the line finding key which has been depressed.

In order that the rack 1219 may be in the exact position with reference to the train of pinions just described, and also the differential slide 1211, there is provided an eccentric adjustment between the slide 1211 and the rack 1219, which is of the usual type and is shown in dotted lines at the right end of the slide 1211 and the rack 1219. As this adjusting device is old and forms no part of the present invention, it is not felt necessary to describe it.

It has just been stated that the differential positioning of the slide 1211 sets the table in accordance with the keys depressed. This is true only when the table is set under control of one of the units keys. However, there is a differential mechanism set under control of the tens keys 1082 which will position the table alone when it is to be set in lines 10, 20, or 30, but if it is to be set in any other line between 10 and 39, then the differential mechanism under control of the units keys 1080 and 1081, and the differential under control of the tens keys 1082, through a transmission mechanism to be described later, compensate their movements to control the positioning of the table 640 according to both units and tens keys in the line finding bank.

This differential slide 1211 is restored to its normal position near the end of the operation of the machine when the driver 1190 is returned to its right-hand position by means of a roller 1227 carried by the differential slide 1211, which is contacted by the right end of the driver bar 1193.

Tens differential

Associated with the tens keys 1082 are a differential slide 1231, slidably mounted on the shaft 1187, and a roller 1232, which slides on the plate 1192. That part of the slide 1231 below the roller 1232 extends into a slot in the plate 1192 to guide the front end thereof.

This slide 1231 carries a short shaft 1233, to which is secured a latch lever 1234 having a lug 1235 normally resting in the notch 1200 of the driver bar 1199 and held in such position by a spring 1236. The upper end of the lever 1234 is normally in the path of the zero stop 1158, and, when any of the keys 1082 is depressed, the stem of that key then moves into the path of this latch lever 1234. Consequently, as the driver bar 1199 moves to the left, when the upper end of the latch lever 1234 strikes either the zero stop 1158 or one of the depressed keys 1082, said lever is rocked clockwise, and the lug 1235 thereof then enters a notch 1237 in an alining bar 1238 supported by studs on the frame 123. When this disengagement of the latch lever 1234 from the driver bar 1199 occurs, the differential slide 1231 will stop in a position corresponding to the zero stop 1158 or one of the keys 1082 which has been depressed, and the under side of the lug 1235 at that time will ride on the top surface of the driver bar 1199, as this bar receives a definite movement to the left for each operation of the machine.

When this driver 1197 and its bar 1199 are restored to the right to their normal positions, the right end of the bar 1199 will contact a stud 1239 on the differential slide 1231 in whatever position it has been left, according to the key depressed, and restore the slide 1231 to its normal position.

Carried by the slide 1231, to always move differentially therewith, is a rack 1241 meshing with a pinion 1242 loose on the shaft 1133. This pinion 1242 drives the gear 1243, loose on the shaft 1223, which in turn drives a gear 1244 (Figs. 29, 36, and 37) of the table transmission mechanism described later.

From the above, it can be seen that the differential positioning of the slide 1231 under control of the keys 1082 is transmitted to the differential transmission gear 1244.

*Table transmission mechanism from the differential drive*

This transmission mechanism will be described first in connection with a direct drive under control of the units keys only. For example, it will be assumed that the units key "5"—1080 has been depressed, that the differential for the units bank has been set to the fifth position, and that the differential, through the gears shown in Figs. 29, 30—A, and 30—B, has set the transmission gear 1226 (Figs. 29 and 37) to the fifth position.

As above described, this gear is loose on the shaft 1115 and has secured to the side thereof a crown gear 1250, which meshes with two pinions 1251 carried by the ends of an arm 1252 fastened to the shaft 1115. Also fastened to the shaft 1115 is a double-ended arm 1253 carrying two pinions 1254, which mesh with a crown gear 1255 secured to the side of a drive gear 1256, which is loose on the shaft 1115.

Also loose on the shaft 1115 and meshing with the pinions 1254 is a crown gear 1257 secured to the side of a control disk 1258, which is held stationary so long as there is a statement sheet on the table and the table is in its normal position at the beginning of the operation of the machine.

Connected by a clutch sleeve 1259 to the gear 1256 is a gear 1260 meshing with the rack 1062 on the left side of the table 640.

As has been stated above, the gear 1226 has been moved five steps by the differential mechanism, and this has caused the pinion 1251 on the arm 1252 to roll around a crown gear 1261, which is fastened to the gear 1244, which is also loose on the shaft 1115. This gear 1244, as has been mentioned previously, is set under control of the tens bank of keys 1082. However, since there has been no key depressed in the tens bank, this gear 1244 and consequently the crown gear 1261 are held stationary. Therefore, as the gear 1226 turns and rotates the pinions 1251, those pinions will roll over the gear 1261 and turn the shaft 1115 five steps, which will turn the arm 1253 five steps, and, as the crown gear 1257 is now held stationary, the turning of the arm 1253 will cause the pinions 1254 to roll over the crown gear 1257 and turn the crown gear 1255 and the drive gear 1256 five steps.

These five steps of movement are transmitted to the gear 1260, and consequently these two gears 1256 and 1260, being in mesh with the racks 1063 and 1062, respectively, on the table 640, will move the table five steps or to the line "5" position.

Assume now that only the "20" key 1082 in the tens bank is depressed. When this occurs, through the differential mechanism shown in Fig. 36 and described above, the gear 1244 is driven two steps of movement. These two steps of movement are equivalent to 20 spaces on the statement sheet, or, in other words, are equivalent to 20 steps of the gear 1226.

Now, since the gear 1226 is being held, no unit key having been depressed since the line 20 is being selected, the two steps of movement of the gear 1244 will, through the crown gear 1261, rotate the pinions 1251, causing the pinions 1251 to roll over the crown gear 1250 on the gear 1226 and turn the arm 1252 and the shaft 1115 twenty steps of movement, whereupon the pinions 1254 will roll over the gear 1257 in the manner described above and will turn the drive gears 1256 and 1260 twenty steps of movement to move the table 640 to select line 20 on the statement sheet.

Assuming now that line 22 has been selected, the tens gear 1244 will move as just described and cause the pinions 1251 to roll over the gear 1250, and, since these gears 1226 and 1250 have been set to the "2" position, that gear 1250 will turn and cause two additional steps to be given to the shaft 1115. Consequently the shaft 1115 and the pinions 1254 will be given 22 steps of movement to drive the gears 1256 and 1260 twenty-two steps to position the table 640 to select line 22 on the statement sheet.

In other words, the tens differential slide 1231 gets two steps of movement, and the gear ratio from there through and to the gear 1244 provides twenty steps of movement to the gear 1244. In other words, this gear ratio is 10 to 1.

*Table alining device*

In order to positively and definitely aline the statement sheet so that the printing will always occur in exactly the proper space, there has been provided what has been termed a "back-up device" to back up the gears so as to take out all of the back-lash or lost motion from the point where the differential latch stops against the key to the gear racks 1062 and 1063 on the table. This mechanism is particularly shown in Fig. 43 and will now be described.

This mechanism to perform the above-mentioned back-up function to take out the backlash of all the gears and to take out all clearances and lost motion so as to provide an accurate line-spacing of the statement sheet is shown particularly in Fig. 43 and includes a pair of cams 1271 fast on the printer cam shaft 500, which cams cooperate with a pair of rollers 1272 on a lever 1273 loose on the shaft 649. This lever 1273 has an arm 1274 held in contact with a pin 1275 on an arm 1276 loose on the shaft 649. Pivoted to the upper end of the arm 1276 is a coupling link 1278 adapted to cooperate with the pin 1279 on a lever 1280 pivoted on the shaft 784. Pivoted to this lever 1280 is a pawl 1281 adapted to cooperate with a ratchet 1282 secured to the drive gear 1260 for the table 640. This pawl 1281 has an arm 1283 held in contact with a pin 1285 by a spring 1284.

When certain control features are in their proper positions—that is, when a statement sheet is on the table and after the table 640 has been moved out of its home position to at least line "1"—the coupling link 1278 is lowered to engage the pin 1279. At this time, the cams 1271, the timing for which is shown in space 21 of Fig. 108 of the time chart, at exactly the middle of the operation, or, in other words, 180 degrees, rock the lever 1273 clockwise, and the spring 1277, which is a very strong spring, causes the pin 1275 to follow the arm 1274 and consequently rock the arm 1276 and move the coupling link 1278 to the right. As this has been engaged with the pin 1279, it rocks the lever 1280 counterclockwise, whereupon the pawl 1281 is moved into engagement with the ratchet 1282 on the gear 1260. This pawl 1281 will function to turn the ratchet 1282 and all of the gearing in the transmission and differential mechanism until all of the backlash and lost motion have been taken out, after which the spring 1277 will merely stretch farther, as the arm 1276 will be stopped when all the backlash and lost motion have been taken out of the gears.

After this lost motion has all been taken out of the transmission and differential mechanism, another alining device, to be described later, is moved into engagement with both of the gears 1260 and 1256 (Fig. 37) and retains the table 640 in a positively alined position until after the printing has taken place.

After this has occurred, after the last-mentioned aliner has been engaged with the gears 1260 and 1256, the cams 1271 reverse the movements of the parts just mentioned, whereupon the link 1278 is moved to the left to rock the lever 1280 clockwise to normal position to retract the pawl 1281 from the ratchet 1282.

The two controlling features above mentioned for the actual operation of the pawl 1281 will now be described.

First, it is necessary that a statement sheet be on the table to control the feeler mechanism which has been described previously.

It will be recalled that the selecting disk 680 (Fig. 43) is not moved when there is a slip on the table, and consequently a feeler 1286 of a lever 1287 may be moved into the notch opposite said feeler. This lever 1287 is held by a spring 1288 in contact with a pin 1289 on an arm 1290 fast on the shaft 772. Connecting the lever 1287 to the coupling link 1278 is a link 1291.

Therefore, when the shaft 772 is rocked counter-clockwise by means to be described later, the spring 1288 rocks the lever 1287 counter-clockwise as the feeler 1286 enters the notch in the disk 680, which lowers the link 1291 and couples the link 1278 with the pin 1279 so that the pawl 1281 can be operated in the manner previously described.

There is one other condition under which the feeler 1286 may enter the notch in the disk 680, and that is only when the table 640 has been moved out of its normal position to at least the first line. Otherwise a flange 1292 of an arm 1293, hubbed to the lever 1287, will contact the periphery of an arm 1294, which is loose on the shaft but which is adjustably secured to an arm 1295, which is fast on the shaft 1115.

When this arm 1294 has not been moved away from the position shown in Fig. 43, which is the position in which the table 640 sits when the statement sheet is first put thereon before it has been differentially moved under control of any of the line selecting keys, then the flange 1292 will contact the periphery of this arm 1294, thus preventing the feeler 1286 from entering the notch in the disk 680. Consequently the coupling link 1278 will not be coupled to the pin 1279, and the back-up pawl 1281 therefor cannot work, as there is no necessity for backing up the table when it is in its normal position.

Since the adjusting arm 1295 is fast on the shaft 1115, and as the arm 1294 is fast to this adjusting arm, when the table 640 is moved to at least line 1 by any of the selecting keys 1080 to 1082, the arm 1294 will be moved out of the path of movement of the flange 1292 on the arm 1293; therefore the feeler 1286 will be permitted to enter the notch in the disk 680, which will permit the back-up pawl 1281 to function to take up all of the backlash in the gears and all clearances between this point of the table drive and the point where the latch strikes against the depressed line finding key.

The means for rocking the shaft 772 to permit the spring 1288 to rock the lever 1287, to in turn permit the feeler 1286 to function, will now be described. This mechanism is shown in edge view in Fig. 27, but is identical with the side elevation of the mechanism shown in Fig. 33, which is used to turn the shaft 748, which is over on the right-hand side of the machine and controls the feeler mechanism in conjunction with the audit sheet or journal.

This mechanism for positively operating the shaft 772 includes a pair of cams 1301 cooperating with a pair of rollers 1302 on a lever 1303 pivoted on the shaft 649. The timing for this cam is shown in space 10 of the time chart in Fig. 107. Pivoted to the lever 1303 is a link 1304 connected to an arm 1305, which is secured to the shaft 772.

After the control disks on the shaft 540 associated with the statement sheet mechanism have been differentially positioned, the cams 1301 at point 115 degrees of time in the operation rock the shaft 772 counter-clockwise to permit the feelers on this shaft to function under the action of their springs, and then, at 255 degrees, the cams 1301 begin to return the shaft 772 to its normal position, and it is fully returned at 290 degrees.

*Table positioning drive control from statement sheet feeler*

It will be remembered in connection with the description of the transmission mechanism for the table, which is shown in Figs. 27, 37, and 39, that it is necessary for the disk 1258 to remain stationary in order that the differential positioning of the units and tens differentials under control of the line finding keys may be transmitted to the drive gears 1256 and 1260 from the pinions 1254.

As mentioned above, one of the means for holding the disk 1258 so that the table 640 may be positioned is under the control of the statement sheet feeler mechanism, which positions or controls the disk 692 (Fig. 39).

A feeler device cooperating with this disk and combined with a stopping device for the disk 1258 determines whether the table will be positioned under control of the line finding keys, based on the assumption that the table 640 is in its normal position to begin with. This means for so controlling the table positioning includes a cam 1306 fast on the printer cam shaft. The timing for this table positioning selection is shown in space 15 of the time chart on Fig. 107. This cam 1306 cooperates with a roller 1307 on a pitman 1308 pivoted to a lever 1309 in turn pivoted on the shaft 772. A spring 1310 normally holds the roller 1307 against the periphery of the cam 1306 and tends to urge the lever 1309 counterclockwise. This lever has a feeler flange 1311 cooperating with the disk 692, which is set under control of the statement sheet feeler, as previously described. This lever 1309 also has a blocking flange 1312 to cooperate with a shoulder 1313 of the control disk 1258 of the transmission mechanism.

According to the time chart of Fig. 107, at 35 degrees the cam 1306 presents a low spot to the roller 1307, whereupon the spring 1310 rocks the lever 1309 counterclockwise and the feeler flange 1311 enters the notch in the disk 692, due to the fact that there is a slip or statement sheet in the table, which determines that this disk will not turn but will remain in the position shown in Fig. 39. At the same time, the blocking flange 1312 was moved into the path of the shoulder 1313 of the disk 1258, so that this disk, when being driven by the transmission mechanism, as described previously, has a short idle movement until the shoulder 1313 contacts the flange 1312, at which time the disk 1258 is definitely stopped so that the movement of the shaft 1115 can, through the pinions 1254, be transmitted to the drive gears 1256 and 1260 to position the table under control of the line finding key or keys in the manner described previously.

At the same time the lever 1309 is moved counterclockwise, it will, through a link 1314 and a spring 1315, rock a lever 1316, pivoted on the shaft 784, counter-clockwise until a locking flange 1317 thereon snaps above a shoulder 1318, which is positioned below the lower side of the flange 1317 at the time the shoulder 1313 contacts the upper side of the flange 1312. Therefore, by means of these two flanges 1312 and 1317, the disk 1258 is locked against motion in either direction so that any differential movement under control of line finding keys 1080, 1081, or 1082 can be transmitted to the table 640 to position the table to the line corresponding to the key or keys which have been depressed.

*Table positioning drive control from the table itself*

There is provided another means which will prevent the transmission mechanism from positioning the table if the table 640 is not in its normal home position to begin with. This means includes a pawl 1321 (Figs. 27, 39 and 40) pivoted on a stud 1322 carried by a plate 1323 slidably mounted on a stud 1324 carried by the frame 124 and pivoted at its lower end to a lever 1325, which is pivoted to the shaft 649. The pawl 1321 is held against a pin 1326 on the plate 1323 by a spring 1327.

There is a pawl 1328 (Fig. 4) pivoted on the stud 1324 and held in contact with the stud 1322 by a spring 1329. This pawl 1328 has a latch 1330 adapted to be moved underneath a finger 1331 of a control disk 1332 pivoted on a disk 1333 supported by the selecting and control unit. This disk 1332 has a low spot marked 1334, which, in the positions shown in Figs. 39 and 41, is in alinement with the notch in the disk 692, so that, with the parts in the position shown, a feeler flange 1311 can enter the notch in the disk 692 and the low spot 1334 at the same time to control the disk 1258 in the manner described above.

The lever 1325 carries a roller 1335 cooperating with a cam 1336. The timing of the cam 1336 (space 16, Fig. 107) shows that the pawl 1321 is lowered immediately after the beginning of the machine operation and is held until near the end of the machine operation. This movement occurs before the transmission mechanism begins to position the table 640. This pawl 1321 is lowered due to the counter-clockwise rocking of the lever 1325, which moves the plate 1323 downwardly, which, of course, moves the pawl 1321 down with it.

As the pawl 1321 is lowered, the stud 1322 is moved away from the pawl 1328, and the spring 1329 tends to rock the pawl 1328 clockwise but is prevented from doing so because the latch 1330 at that time is contacting the outer periphery of the finger 1331 on the disk 1332, this being the normal position of the control disk 1332.

While the pawl 1321 is in its lowered position, the table is positioned by the transmission mechanism, as previously described.

If now, when the table is ejected, and it does not return to its home position, and the rear part of the rack 1063 stops in the dotted position marked 1337 (Fig. 39), then, when the cam 1336 nears its home position, the spring 1338 will rock the lever 1325 clockwise and raise the plate 1323 and the pawl 1321 until the top of the pawl 1321 strikes the bottom of the rack 1063.

Before this occurs, a roller 1339 (Fig. 41) on the side of the cam disk 1340 contacts a finger 1341, the forward end of which cooperates with a stud 1346 on a plate 1343 mounted on the selecting and control unit adjacent the disk 1332 and rigidly connected to said disk by a stud 1344.

A spring 1345 holds the disk 1332 and the plate 1343 in the position shown in Fig. 41 with a finger on the plate 1343 contacting the stud 1324. In this position, as described above, the latch 1330 and the pawl 1328 contact with the outside periphery of the finger 1331 on the disk 1332.

When the roller 1339 rocks the finger 1341 and the lever 1342 clockwise, the lever 1342 rocks the plate 1343 and the disk 1332 counter-clockwise, whereupon the spring 1329 rocks the pawl 1328 clockwise, and the latch 1330 engages beneath the finger 1331. This occurs, it will be remembered, while the pawl 1321 is in its lowered position and while the plate 1323 is in its lower position; and as the pawl 1328 rests against the stud 1322, when this stud is lowered the spring 1329 is permitted to rock the pawl 1328 clockwise provided the finger 1331 has been raised.

With the plate 1343 locked by the pawl 1328, the low spot 1334 of the disk 1332 is moved away from the feeler flange 1311 of Fig. 39, and a high spot of the disk 1332 is presented opposite this feeler flange and, therefore, when the cam 1306 permits a counter-clockwise movement of the lever 1309 in the manner previously described, the feeler flange 1311 will contact the outer periphery of the disk 1332 and consequently the blocking flange 1312 cannot be lowered into the path of the shoulder 1313 on the disk 1258 and when the parts are in this condition—that is, when the table 640 has not been restored to its home position and continues to hold the pawl 1321 in a lowered position—then the differential movement imparted to the transmission pinion 1254 will simply rotate the gear 1257 and the disk 1258, and these pinions 1254 will roll over the crown gear 1255 and consequently there will be no positioning of the table 640 by the differential mechanism, if the table was not in its normal position shown in Fig. 39 at the beginning of the operation.

When the table is restored to its normal position, during any eject operation, the spring 1338 restores the finger 1321 to its normal position, shown in Fig. 39. This movement, through stud 1322, withdraws latch 1330 from finger 1331 to release disk 1332 to the action of spring 1345.

*Table lining and retaining mechanism*

A combined aliner and retainer is normally in its effective position at the beginning of the operation of the machine except on operations following a new balance operation when the table is ejected, or upon any other operation when the table is ejected. However, in all cases it is disengaged from the table gears at 20 degrees and held disengaged until 195 degrees, which gives the table time to be positioned. In fact, it stays out until shortly after the table has been fully positioned by the differential mechanism and transmission means already described. In other words, at 195 degrees, this aliner and retainer again engages the table gears and stays in until 240 degrees while the printing takes place.

The feeding mechanism begins to operate at 240 degrees for line spacing, and at that time the aliner and retainer starts out and stays out until 300 degrees, at which time the feeding has been completed. Then this aliner goes in again and stays in until the first twenty degrees of the succeeding operation; provided, however, the operation just mentioned was a new balance operation, and then, when the aliner started out at 240 degrees, it stayed out until 195 degrees of the very next operation (thus allowing the table to eject), when it went in again to aline the table for the next print. This timing just given is found in space 20 of the time chart (Fig. 108).

This alining and retaining means includes two pawls 1351 and 1352 (Figs. 44 and 47), both of which are fast to the shaft 784, and a lever 1353 also fast to the shaft 784. The spring 1354 holds the pawls 1351 and 1352 in the positions shown when the table 640 is in the ejected position.

The pawl 1351 cooperates with the gear 1256, and the pawl 1352 cooperates with the gear 1260. The lever 1353 carries a pin 1355, which cooperates with two links 1356 (Fig. 44) and 1357 (Fig. 47). These are coupling links and are normally positioned with their coupling slots to the right of the pin 1355. Both links are pivoted to a lever 1358 carrying a pair of rollers 1359 cooperating with a pair of cams 1360 fast to the printer shaft 500. These cams are shown in space 20 of the time chart (Fig. 108).

During the first part of the movement of the cams 1360, the link 1357 is moved to the left to aline a coupling notch in alinement with the pin 1355. After the link 1357 has been thus positioned, the shaft 772 is rocked counter-clockwise, whereupon an arm 1361 fast on a shaft 772 is rocked counter-clockwise, permitting the spring 1362 to rock a lever 1363 counter-clockwise, whereupon a link 1364 connected to the lever 1363 and the link 1357 lowers the coupling notch of the link into active connection with the pin 1355.

After the link 1357 has been coupled to the pin 1355, the cams 1360 draw the link 1357 to the right and rock the lever 1353 and the pawls 1351 and 1352 into engagement with gears 1256 and 1260, respectively, to aline and retain the table 640 during the time printing takes place.

During this same operation of the shaft 500, after the printing takes place and before the shaft 772 and the lever 1363 are restored, the link 1357 is moved to the left to disengage the pawls 1351 and 1352 from the gears 1256 and 1260. Then the shaft 772 is restored clockwise to normal position to uncouple the link 1357 from the pin 1355, and the cams 1360 move the link 1357 back to the position shown in Fig. 47.

Therefore it can be seen that this link 1357 gets two reciprocations during each rotation of the cam shaft 500. While the link 1357 was receiving two reciprocations, as described above, by the cams 1360, the link 1356 of Fig. 44 also receives the same two reciprocations. However, the coupling of this link 1356 to the pin 1355 is under the control of the two disks shown in Fig. 44 and the two disks shown in Figs. 45 and 46.

Cooperating with the link 1356 is a link 1365, which connects the former to a lever 1366 pivoted on the shaft 772. This lever 1366 is connected by a hub to an arm 1367 pivoted to a link 1368 carrying a roller 1369 cooperating with a cam 1370, the timing for which is shown in space 19 of the time chart (Fig. 108). The spring 1371 tends to urge the lever 1366 and the arms 1367 counter-clockwise.

The lever 1366 has a feeler 1372, cooperating with the disk 598, set under control of the symbol row of keys 153. Pivoted to the lever is a block 1373, having a single feeler 1374 cooperating with the disk 732, set under control of the lever 720. This block 1373 has feelers 1375 and 1376 cooperating with the transaction disk 553, and also has feelers 1377 and 1378 cooperating with the disk 619, set under control of the total row.

During the first reciprocation of the link 1356 (above mentioned), it is never coupled with the pin 1355. Then on its second movement toward the left after it reaches the position whereby its coupling notch is in alinement with the pin 1355, the feelers 1372, 1374, 1376, 1377, and 1378 cooperate with the four disks in Figs. 44, 45, and 46 to determine whether or not this link 1356 will then be coupled with the pin 1355.

After the entry of the first check of a posting operation, it is desirable to retain the table 640 in the machine to receive the print of a second check or a deposit, or a new balance, as the case may be. If this operation is the posting of the first check, then the disk 732 will remain in the position shown and the disk 598 will remain in the position shown, whereupon both the feelers 1372 and 1374 may enter the notches in these disks under action of the spring 1371, which is at that time permitted by the cam 1370. At the same time, the transaction control disk 553 is moved to the sixth position, whereby there is a notch in the Arabically numbered sixth position to cooperate with the feeler 1376, and, since this is an add operation, the disk 619 is not moved. Therefore the feeler 1378 can enter a notch in the add position in this disk, and consequently, with all five of these feelers entering notches, the lever 1366 may be rocked counter-clockwise to couple the link 1356 with the pin 1355, so that when the cams 1360 draw the link 1356 to the right the second time near the end of the operation and after the printing has taken place, the pawls 1351 and 1352 will engage the gears 1256 and 1260 and retain the table in its set position at the end of the operation.

If the last operation had been a new balance operation, then the disk 619 would have been set in the "1" position, and both of the feelers 1377 and 1378 would contact high spots on this disk 619, and consequently the lever 1366 could not have been rocked and the link 1356 would not have been coupled with the pin 1355, and consequently the pawls 1351 and 1352 would not have engaged the gears 1256 and 1260, and therefore the table would have been ejected by the ejecting mechanism to be later described.

There is another condition whereby the link 1356 is blocked against coupling to prevent detaining the table 640 in position at the end of the operation, and that is, when line 40 has been reached, whereupon a finger 1381 secured to the bottom of the table 640 will contact a lever 1382 pivoted on the shaft 784 and rock said lever clockwise against the action of a spring 1383. This clockwise movement of the lever 1382 will position a finger 1384 thereon in the path of an arm 1385 integral with the arm 1367 and consequently prevent any counter-clockwise movement of the arm 1367 and the coupling lever 1366, so that when this line 40 (which, however, is not numbered on the statement sheet) is reached, the table 640 will be ejected and the statement sheet will likewise be ejected.

*Table ejecting means*

At the end of a new balance operation, when the pawls 1351 and 1352 release the table drive gears, there is a mechanism provided for automatically ejecting the table 640 toward the front of the machine, so that the statement sheet may be taken therefrom. This ejecting means also functions on certain other types of operations; for example, when the Eject key in the symbol row is depressed.

This ejecting mechanism includes a gear 1391 meshing with the table drive gear 1256. This gear 1391 is loose on a shaft 1392, supported by the printer frames 121 and 122 (Fig. 24), and meshes with a gear 1393 mounted on a stud 1394 carried by a frame 122.

Secured to the gear 1393 is one end of a torsion ejecting spring 1395, the other end of which is secured to a tension ratchet 1396 held in its tensioned position by a pawl 1397 pivoted on the stationary arm 1398.

To begin with, the spring 1395 is put under the proper tension, and then, when the table 640 is moved into the machine, it will further tension the spring 1395 so that, when the table is ultimately released, the spring 1395 will cause an ejection of the table to its normal position.

Geared to the ejecting means by a gear 1399 is an indicator disk 1400, which can be seen through a small opening 1401 in the stationary table 1050 (Fig. 1). This disk 1400 indicates the line to which the table has been set, which corresponds to a line on the statement sheet. In other words, this disk has on it the characters "BF" and the numbers 1 to 39, the "BF" indicating the balance forward position or the top space on the statement sheet, which is to receive the balance forward print.

To take up the shock of the table 640 when it is restored to its normal position, there are provided two cushion pads 1402 (only one being shown in Fig. 39) mounted on levers 1403, which are pivoted on a rod 1404 carried by the frames 121 and 122. A strong spring 1405 absorbs the shock when the table contacts the buffer 1402. This lever 1403 is made adjustable by a screw 1406 in the bar 128.

*Table feeding mechanism*

As has been previously stated, the statement sheet is sometimes fed before printing and sometimes fed after printing.

The means for feeding the statement sheet before printing is shown in Fig. 48 and includes a pair of cams 1411, the timing for which is shown in space 25 of the time chart (Fig. 108). The cams cooperate with a pair of rollers 1412 on the lever 1413 pivoted on the shaft 649. Pivoted to the lever 1413 is a coupling link 1414 adapted to be coupled to a pin 1415 on a lever 1416 pivoted on a shaft 748. This lever 1416 has the pin 1417 projecting in a slot 1418 of a link 1419 pivoted to an arm 1420 secured to the shaft 1392. Also secured to the shaft 1392 is a pawl arm 1421 carrying a spring-pressed pawl 1422, which is normally held in contact with a blocking arm 1423 by a spring 1424 connected to the arm 1420.

By means to be hereinafter described, the blocking arm 1423 is rocked clockwise whereupon the pawl 1422 may then engage a feed ratchet 1425 secured to the side of the gear 1391, which meshes with the gear 1256, which drives the rack 1063 of the table 640.

By means to be hereinafter described, the blocking arm 1423 is raised at the very beginning of the operation to allow the spring of the pawl 1422 to engage the pawl with the ratchet 1425. Then at 140 degrees time the cams 1411 move the coupling link 1414 to the right. Assume that this link has been coupled with the pin 1415, then the lever 1416 will be rocked counter-clockwise to raise the link 1419 and rock the arms 1420 and 1421 counter-clockwise, whereupon the pawl will operate the ratchet 1425 to drive the gear 1391 and the gear 1256 to move the table one step so that the printing will occur on the proper line.

However, as above mentioned, this coupling of the link 1414 is dependent upon several conditions. In other words, after the first check is posted there is to be no feed. After a second check is posted there will be no feed if the next operation is the posting of a deposit. However, if the third operation is the posting of another check, then this feeding mechanism just described will be operated to advance the statement sheet so that the printing of the third check will be on the next line. Likewise upon the entry of successive deposits, this mechanism comes into play to feed the statement sheet between each successive deposit when a series of deposits are entered during one posting transaction.

After the printing has taken place, the cams 1411 reverse the motion of the link 1414 and restore the arm 1421 and pawl 1422 to the position shown in Fig. 48 and then the blocking arm 1423 is moved back to its normal position.

The means for rocking the blocking arm 1423 out of blocking position will now be described. This mechanism includes the previously mentioned cam disk 1340 (Fig. 50) and another cam 1426 which is hubbed to the cam 1340, both of which are fast on the printer shaft 500. The time for these two cams is shown in space 24 of the time chart in Fig. 108.

These two cams 1426 and 1340 cooperate with a pair of rollers 1427 on a lever 1428 connected by a hub to an arm 1429, both of which are pivoted on the shaft 649. The arm 1429 has a bayonet slot 1430, into which projects a pin 1431 that extends from both sides of a link 1432. This link 1432 has a slot 1433 into which projects the pin 1346 on the previously described plate 1343. This link 1432 is connected to a lever 1434 pivoted on the shaft 784. This lever 1434 is connected to the blocking arm 1423. A spring 1435 connected to the lever 1434 tends to hold the parts in the positions shown in Fig. 50.

From mechanism previously described and shown in Figs. 39 and 41, it will be recalled that after the table 640 has been positioned under control of the line finding keys and printing is being done during the posting of the transaction, the pawl 1321 (Figs. 39 and 41) is held down underneath the table and consequently the disk 1332 and the plate 1343, which is secured thereto, are held in an upper position by the pawl 1328. When the plate 1343 is in this position the stud 1346 holds the pin 1431 in the vertical portion of the bayonet slot 1430, and consequently at the very beginning of the operation when the cams 1426 and 1340 rock the lever 1428 and arm 1429 clockwise the link 1432 will be moved to the right and the lever 1434 will rock the blocking arm 1423 clockwise out of the path of the pawl 1422 so that feeding may take place.

At 315 degrees time of the cams 1340 and 1426, the movement of the arm 1429 is reversed and the link 1432 moved to the left to bring the blocking arm 1423 again in the path of the pawl 1422, wherein it is held until the end of the operation of the machine. When the table 640 is held in its normal position, then the plate 1343 is not held in its upper position because the pawl 1321 will be up in the position shown in Fig. 39, and consequently the parts will be in the position shown in Fig. 50, so that when the arm 1429 is rocked clockwise the horizontal portion of the bayonet slot 1430 will ride over the pin 1431 and there will be no movement of the blocking arm 1423. Consequently, if the blocking arm 1423 is not moved, the pawl 1422 cannot engage the ratchet 1425 and therefore the table cannot be fed when it is in its normal position.

There is another condition that the table 640 may be in, at which time an idle operation occurs, and that is immediately after the table has been positioned under control of the line finding keys, regardless of the number of those keys. The idle movement of the arm 1429, just described, will take place, because the plate 1343 is then in the position shown in Fig. 50.

There is also a means shown in Fig. 51, which functions near the end of the operation in which the table was positioned under control of the line finding keys, to rock the blocking arm 1423 so that the pawl 1422 may engage the ratchet 1425 to hold the table to prevent it from being ejected at the end of that operation when the previously described liner pawls 1351 and 1352 are disengaged from their gears 1256 and 1260. In other words, this pawl 1422 is at that particular time the only means for holding the table 640 in a position to be spaced to the next printing line until the pawls 1351 and 1352 come in to hold it, as has been previously described.

This second means for operating the blocking arm 1423 includes a roller 1441 on the side of the cam disk 1336. The timing for the action of this roller 1441 is shown in space 22 of the time chart (Fig. 108). This roller 1441, at 200 degrees time, contacts the lever 1442 and rocks it counter-clockwise, whereupon through its engagement with the pin 1431, it rocks the lever 1434 counter-clockwise and moves the blocking arm 1423 away from the pawl 1422, so that the pawl may be at this time held in engagement with the ratchet 1425 to prevent the table from being ejected at the end of the operation wherein the table has been positioned under control of the line finding keys.

There is one other condition under which a feeding of the statement sheet will be necessary, and that is, after the printing of a sub-balance. The means for causing this extra feed of the table after a sub-balance operation is under control of the keys in the total row, and consequently this control ultimately comes to the total shaft 616 (Fig. 49) which is set under control of this total differential.

The mechanism which actually causes this feeding includes a cam 1443 (Fig. 49) shown in space 27 of the time chart 108. This cam 1443 cooperates with a roller 1444 on a lever 1445 loose on the shaft 649. Pivoted to the lever 1445 is a link 1446 which is also pivoted at 1447 to a link 1448, the left end of which is pivoted to an arm 1449 fast on the shaft 1392. The right end of the link is supported for reciprocating motion by a stud 1450 carried by the frame 121.

The link 1446 carries a pin 1451, which cooperates with a disk 1452 which is secured to the gear 832, which it will be remembered is driven from the gear 833 under control of the total shaft 616 in the selecting and control unit. This disk 1452 has a control notch 1453, which during sub-balance operations is moved into a position opposite the pin 1451. When this occurs and the cam 1443 rotates clockwise, the lever 1445 will be rotated counter-clockwise and the pin 1451 will be moved very slightly into cooperation with the control notch 1453 of the disk 1452 and continued movement of the lever 1445 counter-clockwise then causes the pin 1451 to be the fulcrum for the link 1446 and the link 1448 will be moved to the right, thus rocking the arm 1449 and shaft 1392 counter-clockwise whereupon the pawl 1422 is caused to operate the feed ratchet 1425 to feed the table 640 one step.

During adding operations and all other operations under control of any of the rest of the keys of the total row, the low part of the disk 1452 is opposite the pin 1451 and consequently when the lever 1445 is rocked counter-clockwise the link 1446 will pivot on the stud 1447 and in that case there will be no movement of the link 1448 and consequently no feeding of the table under control of this mechanism in Fig. 49.

The spring 1454 restores the lever 1445 and parts connected thereto to their normal positions under control of the cam 1443 near the end of the operation of the machine, and maintains the roller 1444 in contact with the periphery of the cam 1443.

Step by step feed of the statement controlled by selecting and controlling disks As previously described, the coupling link 1414 (Fig. 48) must be moved down into engagement with the pin 1415 and to effect this engagement and to control the time of such engagement there is provided a link 1461 connecting the link 1414 to a control lever 1462 held in engagement with a stud 1463 on an arm 1464 fast on the shaft 772 by a spring 1465.

This control arm is also shown in Figs. 78 to 83. Pivoted to this control arm are two feeler blocks, which operate independently of each other to cooperate with the disks shown in Figs. 78 to 83.

The lever 1462 has a feeler 1466 on its end to cooperate with the total disk 621 (Fig. 80). Pivoted on one side of the lever 1462 is a feeler block 1467 having two feelers 1468 and 1469 which cooperate with the transaction disk 555 of Fig. 78, and a feeler 1470 cooperates with the deposit hammer control disk 764 of Fig. 79. Pivoted to the other side of the arm 1464 is a feeler block 1471 having a feeler 1472 which cooperates with the disk 749 (Fig. 81) and a feeler 1473 which cooperates with the automatic disk 845 (Fig. 82) and another feeler 1474 to cooperate with the transaction disk 557 of Fig. 83. To assist in supporting the feeler block 1471 there is hubbed to the lever 1462 an arm 1475 shown only in Figs. 83 and 29.

These six disks shown in Figs. 78 to 83 control the rocking of the lever 1462 to couple and uncouple the link 1414 with and from the pin 1415 to operate the feed pawl 1422 to feed the table.

In Fig. 78, the Roman numeral spaces of the disk 555 cooperate with the feeler 1468 and the Arabic numbered spaces cooperate with the feelers 1469.

Assume that in the posting of a transaction a second deposit is to be made immediately following the printing of the first deposit. During the operation of the first deposit, the disk 764 has been moved one step to position its notch opposite the feeler 1470. The total disk 621 remains in the add position because this is an add operation. The disk 555 is moved so that the Roman numeral IV position is opposite the feeler 1468 since the Deposit key is in the fourth position, and the disk 557 has also been moved to the fourth position to position its notch opposite the feeler 1474. Therefore, when the shaft 772 is rocked in the manner previously described, the feelers 1468, 1470 and 1466 may enter the notches in the three disks of Figs. 78, 79 and 80, and the feeler 1474 may enter the notch in the fourth position of the disk 557 of Fig. 83, and therefore the lever 1462 may be rocked counter-clockwise to couple the link 1414 with the pin 1415 to effect a feed of the table prior to the time the second deposit is printed, so that this second deposit will be printed on a new line. During this transaction it makes no difference where the two disks of Figs. 81 and 82 are, because the feelers 1472 and 1473 may contact either high or low spots since there is no feeler opposite these two disks on the top part of the block 1471.

Suppose now that a third check is to be entered immediately following the entry of the second check during a posting transaction; then it will be necessary, as above mentioned, to feed the statement sheet prior to the printing of this third check, and in this case the disk 749 will have been moved to position its notch opposite the feeler 1472 during the printing of the first check, and the automatic disk 845 will have been advanced two steps, one by the printing of the first check and one by the printing of the second check, and therefore a notch will be opposite the feeler 1473.

In the disk 555 of Fig. 78 there is a notch in the Arabic 6 position, which will be positioned opposite the feeler 1469, since this 6 position corresponds to the position of the Check key. The total disk 621 will remain in its add position and the notch will be opposite the feeler 1466. At this time the feeler 1470 may have a high spot opposite it, but that will make no difference because the block 1467 can pivot and enter the notch opposite the Arabic 6 and the feeler 1466 can enter the notch in the total disk, and the feelers 1472 and 1473 can enter notches in the disks 749 and 845 and therefore the lever 1462 can be rocked to couple the link 1414 with the pin 1415 to operate the feed pawl 1422.

There are many other combinations that might be described, but it is not thought necessary to do so here. It is believed that a clear understanding will be had from the description so far, that in order to rock the lever 1462 to cause the coupling link 1414 to be coupled to the pin 1415 to feed the statement sheet there must be the proper combinations of notches opposite the feelers shown in Figs. 78 to 83. When high spots are presented to block the movement of the feeler blocks 1467 and 1471, or when the total disk 621 is moved out of its add position, it will be blocked, and consequently there will be no feeding of the table.

It is necessary that the feelers be moved away from the control disks when they are being differentially positioned, and on certain types of operations the lever 1462 is held by means to be now described, which includes a pin 1476 on the link 1414, which is adapted to engage an arm 1477 pivoted on the shaft 784. Integral with this arm 1477 is an arm 1478, adapted to cooperate with a pin 1479 on the lever 1462 to rock this lever and retain the feelers away from the selecting disks as above mentioned.

*Statement sheet hammer operating means*

The means for operating the statement sheet hammers is shown in Fig. 56 and the timing for the cams is shown in space 11 of the time chart 107. This timing is identical with that of the cams 1015 which operate the audit strip hammers.

The statement sheet hammer operating mechanism includes a pair of cams 1481 cooperating with a pair of rollers 1482 on a lever 1483 fast on the shaft 649. Pivoted to the lever 1483 is a link 1484 adapted to cooperate with a pin 1485 on a lever 1486 which is pivoted on the shaft 784. This lever 1486 is connected by a hub 1487 to another lever just like it, which is associated with the balance hammer 521. This particular lever 1486 is associated with the date hammer 519 shown in this figure. Pivoted to the link 1486 is a link 1488, which in turn is pivoted to the hammer 519.

When the link 1484 is coupled to the pin 1485 by means to be hereinafter described, under control of the selecting disks of Figs. 56, 57 and 58, the link 1484 is moved to the right to rock the lever 1486 counter-clockwise, which causes the link 1488 to move the hammer 519 into contact with the underside of the statement sheet to take an impression from the group of type wheels 520.

There are also fast on the shaft 649 six arms 1489, shown in dot and dash lines in Fig. 56, which cooperate with six other links 1484, and six other levers 1486 and links 1488 to operate the other hammers 513, 515, 517, 523, 525 and 527, all associated with the statement sheet.

Pivoted to the link 1484 is a link 1490, which is also pivoted to a selecting lever 1491, held in contact with a stud 1492 on an arm 1493 fast on the shaft 772 by a spring 1494. The lever 1491 has a feeler 1495, cooperating with the control disk 687, set under control of the statement sheet feeler. Also pivoted to this lever 1491 is a feeler block 1496 (Figs. 57 and 58) having a feeler 1497 cooperating with the control disk 596, set under control of the symbol row, and a feeler 1498 and 1499 to cooperate with the total disk 617.

When there is a slip in the machine the feeler 1495 may enter the notch in the disk 687, and if it is an add operation the feeler 1498 will be opposite the notch opposite the add position in the disk 617 but the feeler 1497 will contact a high spot on the disk 596, and consequently the lever 1491 cannot be operated and the date hammer and the balance hammer will not be operated because the link 1484 will not be coupled with the pin 1485.

The only time the date and balance hammers 519 and 521 will be operated in an add operation is when the Balance Forward key is depressed to position the notch in the disk 596 opposite the feeler 1497 wherein both of the feelers 1497 and 1498 will be permitted to enter notches in the disks 596 and 617, respectively, and at the same time the feeler 1495 will enter the notch in the disk 687 and consequently the link 1484 will be coupled to the pin 1485 to operate the date and balance hammers 519 and 521.

The check hammer 513 is to be operated during adding operations upon the entry of the first check, and the operation of this hammer is controlled by the disks in Figs. 84, 85, 86 and 87. Associated with the check hammer 513 is a feeler lever 1501 (Fig. 84) which is identical with the feeler lever 1491 just described. It has a feeler 1502 cooperating with the disk 682 and carries a feeler block 1503, with a feeler 1504 cooperating with the disk 727 and feelers 1505 and 1506 cooperating with the automatic disk 841 of Fig. 86 and feelers 1507 and 1508 cooperating with the transaction disk 549.

On the entry of the first check posting operation, this hammer 513 is to operate and since the statement sheet is in the machine the disk 682 will position its notch opposite the feeler 1502, and since the automatic disk 841 has a notch opposite the feeler 1506, and as this is a check operation, the notch in the sixth position of the disk 549 is positioned opposite the feeler 1508, therefore the block 1503 can pivot to permit the feelers 1506 and 1508 to enter notches and the feeler 1502 will enter the notch in the disk 682 and consequently the link 1484 for the check hammer 513 will be coupled with its pin 1485 to cause the first check to be printed.

Upon entry of the second check, the hammer 515 will be operated and at this time the hammer 513 will not be operated because the automatic disk 841 will have turned one step and presented a high spot opposite the feeler 1506, and consequently, since there is a high spot opposite the feeler 1507 of the block 1503, this block 1503 cannot pivot, and therefore the lever 1501 cannot be rocked to couple its link 1484 with the pin 1485, and the hammer 513 will not be operated. However, the hammer 515 must operate, and to effect this operation there is provided a lever 1510 (Fig. 88) having a feeler 1511 cooperating with the slip disk 684. Pivoted to this lever 1510 is a block 1512 having a feeler 1513 cooperating with the disk 729, and feelers 1514 and 1515 cooperating with the automatic disk 843. This block 1512 also has feelers 1516 and 1517 cooperating with the transaction disk 550. Since the amount of the second check must be printed by the hammer 515, the automatic disk will have been moved around so that a notch will be opposite the feeler 1514 and as there is a notch opposite the feeler 1517 in the sixth position of the disk 550, this block 1512 may be pivoted, and as there is a notch in the disk 684, the lever 1510 can rock, and consequently this hammer 515 will be operated because the lever 1510 will couple the link 1484 to the pin 1485.

To control the duplicate balance hammer 525 so that its link 1484 will be coupled with the pin 1485 whereby the hammer will be operated, there is, in addition to the three disks 633, 605 and 690 already described, a disk 711 (Figs. 112 and 113). Three of these disks—namely, 605, 633, and 711—cooperate with feelers 1518 and 1519, which are on a block 1571 pivoted on a stud supported by arms 1520 and 1570 (Figs. 113 and 114). The arms 1520 and 1570 are connected by a sleeve to form a framework in which the block 1571 is carried.

The feeler 1518 is wide enough to extend across the three disks 605, 633, and 711, so that these disks exercise a control over this feeler. Feeler 1519 is wide enough to extend across the two disks 633 and 711. The free end of the arm 1570 (Fig. 114) is provided with a feeler finger 1569, which cooperates with the disk 690.

When the lever 700 is in its "A" position (Fig. 63), the disk 711 is in the position illustrated in Fig. 113; that is, with a notch opposite each feeler 1518 and 1519.

When a new balance key, a Sub-balance key, or a New balance N. T. key is depressed, the disk 633 presents a notch to the feeler 1519.

When a balance forward key of the symbol row is depressed, the disk 605 presents a notch opposite the feeler 1518.

The disk 690 is positioned by the slip feeler so that, in the balance operation now being considered, a notch of the disk 690 is presented to the feeler finger 1569. Thus, when the machine is operated and the shaft 772 is rocked counter-clockwise (Figs. 113 and 114), the feeler finger 1569 enters the notch in the disk 690 and carries the feeler block 1571 with it. Since at this time the feeler 1519 can enter notches in disks 711 and 633, the block 1571 rocks in frame 1520—1570, and the lever 1570 of said frame is free to rock counter-clockwise to couple the link 1484 with the pin 1485 to operate the duplicate balance hammer 525 when a statement sheet of Figs. 102 and 105 is in the machine.

When the lever 700 (Fig. 63) is moved to the "B" position the disk 711 is turned, presenting the high spots to both the feelers 1518 and 1519, and consequently this hammer 525 cannot be operated because the lever 1570 cannot be rocked.

The duplicate date and check number hammer 523 is controlled by the disks 632, 604, 689 and 712 of Figs. 112 and 113. The disks 632, 604 and 689 are identical with the disks 633, 605 and 690, but the disk 712 has notches coinciding with the notches in the disk 711 and also has two other notches shown in the dotted lines of Fig. 113. The notches coinciding with the notches of disk 711 are so that the date and check number hammer 523 can be always operated when the duplicate balance hammer 525 is operated under control of the lever 700.

However, the notches in the disk 712 shown in the dotted lines are used to control the hammer 523 so that it can be operated when the statement sheet of Fig. 103 is being used. As this lever 700 is moved to the "B" position, the feelers 1518 and 1519 for the date hammer 523 can enter the notches to couple its link 1484 with the operating pin 1485. However, the balance hammer 525 cannot be operated because the disk 711 has removed the notches out of alinement with the feelers 1518 and 1519, associated with the balance hammer 525.

When the lever 700 is moved to the "C" position (Fig. 63) both of the disks 711 and 712 are moved so that the notches in both of said disks are out of alinement with the feelers 1518 and 1519 associated with both hammers 523 and 525 and consequently neither of these hammers 523 or 525 can be operated at that time when the narrow balance sheet of Fig. 104 is being used.

The operations and control of the hammers for printing data on the statement sheet, except the deposit hammer 517, have been previously described. This deposit hammer has a control which is identical with the deposit hammer control associated with the audit strip, and therefore it is not felt necessary to go into any further description of the operation of this deposit hammer, it being sufficient to state that this deposit hammer 517 is operated whenever the Deposit key or the Deposit correction key is depressed, and then and then only.

Machine lock when table is advanced to line 39

There is mechanism provided to lock the machine against release when the table is fed into line 39, either under control of the line finding keys or when it is automatically spaced to line 39 by the feeding mechanism previously described. This is to warn the operator that this is the last line upon which printing shall be made on the statement sheet, and to release this lock there is provided a manually movable slide so that the machine can be released, and as many as three items entered on line 39, and in addition to the three items, a balance or sub-balance.

This line 39 lock device is shown in Fig. 54, and includes block 1521 on the bottom of the table, which upon the movement of the table 640 to line 39 will rock a lever 1522 (Figs. 54 and 55) clockwise, which through a pin and slot connection will rock an arm 1523 fast on a shaft 1524 supported by the frames 122 and 123. Fast on the other end of the shaft 1524 is an arm 1525, held by a spring 1526 so that a pin 1527 in the arm 1525 will be in the right-hand end of a slot in a link 1528, pivoted to a lever 1529, which is loose on the rod 643. A spring 1530 connected to the pin 1527 and a pin on the link 1528, holds the right-hand end of the slot in the link 1528 against the pin 1527. This lever 1529 cooperates with an arm 1531 having a flange 1532. This arm 1531 is hubbed to the previously described blocking arm 1176 (Fig. 30—A), which is associated with the tens bank of line finding keys 1082. As above stated, when the table 640 goes into line 39, the lever 1522 is rocked clockwise to rock the shaft 1524 counter-clockwise, and when this occurs the pin 1527 is moved to the left and the spring 1530 moves the link to the left to rock the lever 1529 to position its upper end beneath the flange 1532, thus preventing any movement of the arm 1531, and consequently of the arm 1176, and therefore the link 1177 cannot move, and through the mechanism shown in Fig. 23 and hereinbefore described, the release shaft 139 cannot be rocked clockwise when the table moves into line 39, thus preventing release of the machine.

Upon the attempted release of the machine, it will be remembered that the shaft 139 is moved slightly clockwise and therefore it is necessary to restore that shaft and any keys which have been depressed in an attempt to release the machine. This is because the flange 1532 moves into a depression in the lever 1529 upon such attempted release of the machine. After such restoration of the shaft 139 the machine lock may be released by a release slide 1535, the tip of which projects through the stationary table 1050 (Fig. 1). This slide, when moved to the right as viewed in Fig. 54, causes its stud 1536 to contact a surface 1537 on the lever 1529 and restore the lever 1529 slightly past its normal position, and thereupon the arm 1531 may be rocked clockwise so that its flange 1532 will move down to the right of the lever 1529, and consequently the machine may be released. Upon movement of the lever 1529 slightly beyond the position shown in Fig. 54, the spring 1526 causes a latch 1538 to move its notch into cooperation with the lower point of the lever 1529 and lock the lever in the position slightly beyond its normal position, in which position it will be held until the time of the operation of the shaft 772, wherein a pin 1539 on an arm 1540, fast on this shaft 772, contacts the latch 1538, rocking it clockwise against the action of the spring 1526, at this time the spring 1530, which is connected to the link 1528, will move the lever 1529 again beneath the flange 1532 because the table 640 is still in line 39 position. Now the slide 1535 is moved to release the lever 1529 to permit a balance operation. At the end of this operation the table 640 is ejected, thus releasing the lever 1522 so that when the shaft 772 restores the latch 1538 the lever 1529 will remain in the position shown.

Under certain conditions it may be desirable to lock this slide 1535 in the right-hand or release position, so that the machine will not lock up on certain types of operations, and to perform this there is provided a button 1541 (Figs. 1 and 40) which may be moved to the right, as shown in Fig. 1, whereupon a bar 1542 is moved in front of the release slide 1535 after the same has been pushed back into its lock releasing position. Thus it will retain this slide in that position and prevent a lockup of the machine releasing mechanism, if this is desired by the operator when putting the machine through certain types of posting transactions.

Interlock between table positioning and the machine release

Normally the first operation of posting is a balance pickup operation. If the operator prior to this time puts a statement sheet on the table and depresses a line finding key, then the table will be positioned to the position controlled by the line finding key. However, if no line finding key is depressed prior to this balance pickup operation, the operator may then depress the line finding key just prior to the entry of the first check, and then the machine during this operation will be positioned by the positioning means as above described. However, should the operator fail to depress a line finding key before depressing the Check key to enter a check or Deposit key to enter a deposit, the transaction disk 559 (Fig. 40) would be so positioned as to set a notch opposite a feeler 1551 of a link 1552, pivoted at one end to an arm 1553 integral with a yoke 1554 which is pivoted on the shaft 1115. The other end of the link 1552 has a slot surrounding a pin 1555 in an arm 1556 integral with a yoke 1557 which is pivoted on the shaft 649. Also integral with this yoke 1557 is a forked arm 1558 surrounding a pin 1559 in an arm 1560.

Therefore, since the table is not positioned during this operation the pawl 1321 will be in the position shown in Fig. 39 at the end of this operation of posting the first check and a spring 1561 will move the link 1552 to the right, whereupon the feeler 1551 will enter the notch in the disk 559 and this will cause the arm 1553 to rock its yoke 1554 and an integral arm 1562 underneath the flange 1532 of the previously described blocking arm 1531, to prevent any release of the shaft 139.

Now, finding the machine locked against release, the operator presses the proper line finding key and then moves the releasing slide 1535 to the right (Fig. 40), whereupon its stud 1536 contacts an arm 1563, which is integral with the arm 1562, and moves that arm counterclockwise out from under the flange 1532, and then proceeds to release the machine by the depression of the Check key in the usual manner.

When the release slide 1535 is moved as just described, to release the machine, the arm 1553 is also rocked counter-clockwise a short distance, sufficient to cause a foot 1564 to be engaged by the notch in the end of a lever 1565 which is loose on the shaft 772.

The spring 1561 is connected to this lever 1565, and as the foot 1564 is moved to the left, this spring 1561 rocks the lever 1565 clockwise, to cause the engagement above mentioned. These parts are restored, that is, the lever 1565 is disengaged from the foot 1564 during the counter clockwise movement of the shaft 772, by a pin 1566 on an arm 1567 fast on this shaft, which contacts an arm 1568 integral with the lever 1565.

The reason for locking the link 1552 by the lever 1565 is to hold the feeler 1551 away from the transaction disk so that it can be positioned under control of the keys in that bank, which in this particular case is a check key. This feeler 1551 also cooperates with the total disk 623, and this disk has a notch in the add position, which is normally opposite the feeler 1551, so that the machine may be locked when this disk 623 is in the add position when the above conditions prevail.

After the table 640 is moved to the right and the pawl 1321 is held down, the lever 1325 is held down, which consequently holds the pin 1555 in the left-hand end of the slot in the link 1552, which positively prevents any movement of the feeler 1551 to the right, regardless of whether or not one of these line finding keys is depressed. As a matter of fact, the line finding keys have been released, and if this proviso were not made, the machine would lock up when it should not.

The disk 600, which is set by the symbol row of keys, has a high spot in the balance forward position, and when this key is depressed the high spot of this disk 600 is positioned opposite the feeler 1551, and consequently the machine will not lock up on this type of operation even though there has been no line finding key depressed. This condition exists when a series of balance forwards are being totaled at the end of the month or at the beginning of the month, as has been previously described.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In an accounting machine, the combination of a plurality of banks of control keys and amount keys for printing variable data in various positions on a plurality of different-sized individually insertable sheets and on an issuing audit strip; a differentially adjustable table for supporting the insertable sheets; a positioning means for the table; a line feeding means for the table; a plurality of hammers to print in various columns on the insertable sheets; a second group of hammers to print in various columns on the issuing audit strip; a feeler mechanism associated with the insertable sheets; a selecting and control unit including adjustable disks controlled from all of said manipulative control keys, from certain of the first-mentioned hammers, from certain ones of the second group of hammers, from the differentially movable table, and from the feeler mechanism to determine the effectivity of the table feeding mechanism and to control the operation of the hammers associated therewith and the group of hammers associated with the issuing audit strip.

2. In an accounting machine, the combination of a plurality of banks of control keys and amount keys to print various data upon an insertable sheet and upon an audit strip; a group of printing hammers for the audit strip; feeding means for the audit strip; a table for supporting the inserted sheet; a group of hammers associated with the insertable sheet; a feeding mechanism for the table; a positioning mechanism for the table; a feeling mechanism for the insertable sheet; a selecting and control unit including groups of adjustable disks driven by an internal gearing device carried by internal shafts, which shafts project through all of said disks; means controlled by the plurality of banks of control keys and certain of the hammers for the audit strip to position certain disks of the selecting and control unit to determine the effectivity of the hammers for the audit strip and the feed of the audit strip; and means controlled by said banks of control keys, the slip feeler mechanism, and the adjustable table to adjust certain other disks of the selecting and control unit to determine the effectivity of the hammers associated with the insertable sheet, the feeding of the table for the sheet, and the ejection of the insertable sheet from the machine.

3. In an accounting machine, the combination of a plurality of banks of control keys; type wheels; a plurality of hammers to print upon an insertable sheet; an adjustable table to support the sheet; a positioning means for the table; a feeding means for the table; an ejecting means for the table; and a selecting and control unit controlled by said control keys, certain of the hammers, and the table to control variable operation of the hammers, the feeding of the table, and the ejection of the table.

4. In an accounting machine adapted to print upon inserted record material, a table to support the record material; line finding keys to control the positioning of the table to the first line to be printed upon; a reciprocating differential mechanism controlled by said line finding keys; a transmission mechanism driven by the differential mechanism to operate the table; and a feeling device cooperating with the insertable slip to permit actuation of the transmission mechanism when a sheet is on the table and to prevent operation of the transmission mechanism when no slip is on the table.

5. In an accounting machine adapted to print upon insertable record material, an adjustable table to support the record material; a plurality of banks of units line finding keys; a bank of tens line finding keys; a single reciprocating differential driven under control of both banks of units keys; a reciprocating differential driven under control of the tens bank of keys; a transmission mechanism intermediate the table and both differential mechanisms to translate the combined differential movements into a single movement to position the table under control of the keys depressed; a control disk associated with said transmission mechanism; and a feeling device associated with the insertable record material to stop said control disk when record material is present on the table to permit proper functioning of the transmission mechanism and to prevent the transmission mechanism from functioning due to the absence of record material on the table.

6. In the accounting machine adapted to print upon insertable record material, a table to support the record material; a plurality of differential mechanisms to control the positioning of the table; a plurality of banks of keys to control said differential mechanisms; a transmission mechanism intermediate the differential mechanisms and the table to convert the combined movements of the differential mechanisms into a single movement to position the table under the control of the keys depressed; and an alining mechanism operable to eliminate all lost motion between the differential mechanisms and the table.

7. In an accounting machine adapted to print upon insertable record material, a table to support the record material; a plurality of differential mechanisms to control the positioning of the table; a plurality of banks of keys to control said differential mechanisms; a transmission mechanism intermediate the differential mechanisms and the table to convert the combined movements of the differential mechanisms into a single movement to position the table under the control of the keys depressed; an alining mechanism operable to eliminate all lost motion between the differential mechanisms and the table, said alining mechanism including a ratchet and pawl device; a feeling device; and means controlled by the feeling device for determining the effectivity of the ratchet and pawl device.

8. In an accounting machine adapted to print upon insertable record material, a table to support the record material; a plurality of differential mechanisms to control the positioning of the table; a plurality of banks of keys to control said differential mechanisms; a transmission mechanism intermediate the differential mechanisms and the table to convert the combined movements of the differential mechanisms into a single movement to position the table under the control of the keys depressed; an alining mechanism operable to eliminate all lost motion between the differential mechanisms and the table, said alining mechanism including a ratchet and pawl device; and means controlled by the setting of the table to its selected position for permitting operation of said ratchet and pawl device and for preventing operation thereof before the table is positioned.

9. In an accounting machine adapted to print upon insertable record material, a table to support the record material; a plurality of differential mechanisms to control the positioning of the table; a plurality of banks of keys to control said differential mechanisms; a transmission mechanism intermediate the differential mechanisms and the table to convert the combined movements of the differential mechanisms into a single movement to position the table under the control of the keys depressed; and an alining mechanism operable to eliminate all lost motion between the differential mechanisms and the table, said alining mechanism including a ratchet and pawl device to back up the transmission mechanism until all lost motion has been eliminated therefrom and from the differentials which drive it.

10. In a machine of the class described adapted to print upon insertable record material, a table to support the record material; a positioning device to set the table to the first line upon which printing is to be made; a feeding mechanism operable after the positioning device to feed the table step by step; a retaining device to hold the table in position while printing is being accomplished and then again to retain the table in the machine at the completion of the operation; table ejecting means; and means controlled by the retaining means to determine the effectivity of the ejecting means.

11. In a machine of the class described adapted to print upon insertable record material, a table to support the record material; a positioning device to set the table to the first line upon which printing is to be made; a feeding mechanism operable after the positioning device to feed the table step by step; a retaining device to hold the table in position while printing is being accomplished and then again to retain the table in the machine at the completion of the operation; table ejecting means; means controlled by the retaining means to determine the effectivity of the ejecting means; a plurality of banks of control keys; and means controlled thereby for determining the effectivity of the retaining means.

12. In a machine of the class described adapted to print upon insertable record material, a table to support the record material; a positioning device to set the table to the first line upon which printing is to be made; a feeding mechanism operable after the positioning device to feed the table step by step; a retaining device to hold the table in position while printing is being accomplished and then again to retain the table in the machine at the completion of the operation; table ejecting means; means controlled by the retaining means to determine the effectivity of the ejecting means; a plurality of banks of control keys; means controlled thereby for determining the effectivity of the retaining means; and a manually adjustable control means to supersede the control exercised by said banks of control keys.

13. In a machine of the class described adapted to print upon insertable record material, a table to support the record material; a positioning device to set the table to the first line upon which printing is to be made; a feeding mechanism operable after the positioning mechanism to feed the table step by step; table ejecting means; means to selectively release the ejecting means; a retaining device to hold the table in position while printing is being accomplished and then again to selectively retain the table in the machine at the completion of the operation; and means to prevent the last operation of said retaining device to thereby release the ejecting means.

14. In a machine of the class described adapted to print upon insertable record material, a table to support the record material; a positioning device to set the table to the first line upon which printing is to be made; a feeding mechanism operable after the positioning device to feed the table step by step; a retaining device to hold the table in position while printing is being accomplished and then again to retain the table in the machine at the completion of the operation; table ejecting means; means controlled by the retaining means to determine the effectivity of the ejecting means; and means operated by the table to render said retaining device ineffective and the ejecting means effective.

15. In a machine of the class described adapted to print upon insertable record material, an adjustable table to support the record material; positioning means to set the table to print on a selected line at the beginning of the operation; means to select that line; a plurality of hammers operable to print upon the record material; a feeding device for feeding the record material; a plurality of banks of control keys; an automatic device rendered effective by certain of said control keys, a plurality of disks controlled by the control keys; a disk controlled by the automatic device; a disk controlled by one of the hammers; a disk controlled by another hammer; and means cooperating with all of said disks and controlled as to movement thereby to determine the effectivity of the feeding device.

16. In a machine of the class described adapted to print upon insertable record material, an adjustable table to support the record material; positioning means to set the table to print on a selected line at the beginning of the operation; means to select that line; a plurality of hammers operable to print upon the record material; a feeding device for feeding the record material; a plurality of banks of control keys; an automatic device rendered effective by certain of said control keys; a plurality of disks controlled by the control keys; a disk controlled by the automatic device; a disk controlled by one of the hammers; a disk controlled by another hammer; means cooperating with all of said disks and controlled as to movement thereby to determine the effectivity of the feeding device; a feeling device; a disk controlled by the feeling device; a disk controlled by one of said banks of control keys; a disk controlled by said automatic device; and adjustable means controlled by the last three mentioned disks in combination to determine the effectivity of certain of said hammers.

17. In an accounting machine adapted to print upon insertable record material, an adjustable table to support the record material; a plurality of banks of units line finding keys; a bank of tens line finding keys; a single reciprocating differential driven under control of both banks of units keys; a reciprocating differential driven under control of the tens bank of keys; a transmission mechanism intermediate the table and both differential mechanisms to translate the combined differential movements into a single movement to position the table under control of the keys depressed; a control disk associated with said transmission mechanism; a feeling device associated with the insertable record material to stop said control disk when record material is present on the table to permit proper functioning of the transmission mechanism and to prevent the transmission mechanism from functioning due to the absence of record material on the table; and means operable to lock said control disk after it has been stopped.

18. In an accounting machine adapted to print upon insertable record material, an adjustable table to support the record material; a plurality of banks of units line finding keys; a bank of tens line finding keys; a single recpricating differential driven under control of both banks of units keys; a reciprocating differential driven under control of the tens bank of keys; a transmission mechanism intermediate the table and both differential mechanisms to translate the combined differential movements into a single movement to position the table under control of the keys depressed; a control disk associated with said transmission mechanism; a feeling device associated with the insertable record material to stop said control disk when record material is present on the table to permit proper functioning of the tranmission mechanism and to prevent the transmission mechanism from functioning due to the absence of record material on the table; and means operable by said stopping means to lock the disk upon operation of the stopping means.

19. In a machine of the class described adapted to print upon insertable record material, an adjustable table to support the record material; positioning means to set the table to print on a selected line at the beginning of the operation; means to select that line; a plurality of hammers operable to print upon the record material; a feeding device for feeding the record material; a plurality of banks of control keys; an automatic device rendered effective under control of certain of said control keys; a plurality of disks controlled by the control keys; a disk controlled by the automatic device; a disk controlled by one of the hammers; a disk controlled by another hammer; means cooperating with all of said disks and controlled as to movement thereby to determine the effectivity of the feeding device; a feeling device; a disk controlled by the feeling device; a disk controlled by one of said banks of control keys; a disk controlled by said automatic device; adjustable means controlled by the last three mentioned disks in combination to determine the effectivity of certain of said hammers; manually adjustable means; and means controlled thereby to supersede the control of the last three mentioned disks, thus preventing operation of the hammers.

20. In a machine adapted to print upon insertable record materials of different widths, a plurality of hammers for printing upon said record materials; an adjustable means when set in one position controlling all hammers but one to print upon two sizes of record materials, when set in another position controlling all hammers but one to print only upon the next-to-the-smallest record material, and when set in a third position controlling all hammers but one to print upon the smallest record material; and a manipulative device to control said one hammer to be operable in conjunction with all other hammers to print when the widest record material is being printed upon.

21. In a machine adapted to print upon insertable record material, an adjustable table supporting the record material; a positioning device for the table to select the first line to be printed upon; keys to control the positioning device; a feeding means operable before printing, and after printing; a bank of control keys; controlling means operable thereby to determine when the feeding means shall operate before printing; a second bank of control keys; and means operable thereby to determine when the feeding means shall feed after printing.

22. In a machine adapted to print upon insertable record material, an adjustable table supporting the record material; a positioning device for the table to select the first line to be printed upon; keys to control the positioning device; a feeding means operable before printing and after printing; a bank of control keys; controlling means operable thereby to determine when the feeding means shall operate before printing; a second bank of control keys; means operable thereby to determine when the feeding means shall feed after printing; and means controlled by the table for superseding the control of both banks of control keys.

23. In a machine adapted to print upon insertable record material, an adjustable table supporting the record material; a positioning device for the table to select the first line to be printed upon; keys to control the positioning device; a feeding means operable before printing and after printing; a bank of control keys; controlling means operable thereby to determine when the feeding means shall operate before printing; a second bank of control keys; means operable thereby to determine when the feeding means shall feed after printing; a blocking device for the feeding means; and means intermediate the blocking device and the table to cause the blocking device to prevent operation of the feeding means before and after printing under control of the table.

24. In a machine adapted to print upon insertable record material, an adjustable table supporting the record material; a positioning device for the table to select the first line to be printed upon; keys to control the positioning device; a feeding means operable before printing and after printing; printing hammers; a bank of control keys; and means controlled by the hammers and the keys for controlling the operation of the feeding mechanism before printing.

25. In a machine adapted to print upon insertable record material, an adjustable table supporting the record material; a positioning device for the table to select the first line to be printed upon; keys to control the positioning device; a feeding means operable before printing and after printing; printing hammers; a bank of control keys; means controlled by the hammers and the keys for controlling the operation of the feeding mechanism before printing; another bank of control keys; and means controlled thereby for determining when the feeding means shall feed after printing.

26. In a machine adapted to print upon record material, a feeding means for the record material; printing hammers; a bank of control keys; selecting means controlled thereby; normally uncoupled driving means for the feeding means; selecting means controlled by the printing hammers; feeling means associated with both selecting means to couple the driving means with the feeding means; and means operable by the driving means when uncoupled to move the feeding means away from the selecting means to permit operation of the selecting means by the printing hammers.

27. In a machine adapted to print upon a definite number of lines on insertable record material, machine releasing means including a movable member, a table supporting the record material; means to position the record material to any of its lines for the first printing; keys controlling the positioning means; and means movable by the table into the path of movement of said member when the table moves into a position corresponding to the last line to be printed upon to prevent operation of the machine releasing means.

28. In a machine adapted to print upon a definite number of lines on insertable record material, machine releasing means, including a movable member; a table supporting the record material; means to position the record material to any of its lines for the first printing; keys controlling the positioning means; means for feeding the table step by step from the position in which it was positioned under control of the keys; and means movable by the table into the path of movement of said means, when the feeding means moves the table into a position corresponding to the last line to be printed upon, for preventing operation of the releasing means for the next operation.

29. In a machine adapted to print upon insertable record material, printing hammers; a table supporting the record material; means to position the table to select the first line to be printed upon; step-by-step feeding means operable after the table has been positioned; means operable under control of certain of the hammers to control the feeding means; a plurality of keys; adjustable means set under control of those keys; a restoring device for the hammer operated means; and selecting means to determine when the restoring device is to operate, said selecting means being under control of the adjustable means set under control of the control keys.

30. In an accounting machine of the class described having a plurality of banks of control keys and banks of amount keys and a printer section including a plurality of separately operable printing platens to print data in columns on various widths of insertable record material and upon an audit strip, line-spacing mechanisms for the insertable record material and the audit strip, and ejecting mechanism for the insertable record material, the combination of a selecting and control unit consisting of a plurality of settable elements to control the various functions of the printer section; a feeler for sensing the presence of insertable record material and to adjust certain of the settable elements in said selecting and control unit to disable all the printing platens when no material is sensed by the feeler; a manually settable device settable in accordance with the width of record material in the machine to adjust certain of said settable elements of said selecting and control unit to control the printing platens to be operated in accordance with the width of paper in the machine; means adjustable by one of said printing platens when operated to print, to adjust an element of said selecting and control unit to control the effectiveness of said insertable record material line-spacing mechanism for the next machine operation; means adjustable by another one of said printing platens when operated to print, to adjust an element of said selecting and control unit to control the effectivenesses of the line-spacing mechanism for the audit strip; a control lever to control the ejection of the insertable record material upon operation of certain of the control keys, said lever and control keys effecting said control by differentially positioning certain elements of said selecting and control unit; and means differentially settable under control of the control keys to adjust various elements of the said selecting and control unit to control the sequential operation of the printer section, said controls being such that the entire printer section is controlled through the said selecting and control unit.

31. In an accounting machine adapted to print upon insertable record material, an adjustable table for supporting the record material, said table having a normal position and a plurality of adjustable positions to select lines to receive entries; a releasing means for the machine; a plurality of line finding keys; a positioning means for the table including a transmission mechanism geared to the table and a reciprocating differential mechanism to drive the transmission mechanism under control of said plurality of line finding keys; and means controlled by the table and coacting with an element of the releasing means to lock the releasing means against operation at the end of an entry operation upon failure to depress any of the line finding keys prior to said entering operation with the table in the normal position.

32. In an accounting machine adapted to print upon insertable record material, an adjustable table for supporting the record material, said table having a normal position and a plurality of record receiving positions; a releasing means for the machine; a plurality of line finding keys; a positioning means for the table including a transmission mechanism geared to the table and a reciprocating differential mechanism to drive the transmission mechanism under control of said plurality of line finding keys; means movable to coact with an element of the releasing means to lock the releasing means against operation; and means controlled by the position of the table for moving the last-named means into position to coact with said element to prevent an operation of the releasing means when the table is in normal position at the beginning of a recording operation of the machine.

33. In an accounting machine adapted to print upon insertable record material, an adjustable table for supporting the record material, said table having a normal position and a plurality of record-receiving positions; a releasing means for the machine; a plurality of line finding keys; a positioning means for the table including a transmission mechanism geared to the table and a reciprocating differential mechanism to drive the transmission mechanism under control of said plurality of line finding keys; means movable to coact with the releasing means to lock the releasing means against operation when the table remains in the normal position upon failure to depress any of the line finding keys prior to a recording operation, said last-named means controlled by the table when the table is in a record-receiving position to prevent said coaction with the releasing means; and a manual means to release said locking means when the locking means has been moved into locking position.

34. In an accounting machine adapted to print upon insertable record material, an adjustable table for supporting the record material, said table having a normal position and a plurality of adjusted positions; a releasing means for the machine; a plurality of line finding keys; a positioning means for the table including a transmission mechanism geared to the table and a reciprocating differential mechanism to drive the transmission mechanism under control of said plurality of line finding keys; means normally movable to coact with the releasing means to lock the releasing means against operation upon failure to depress any of the line finding keys and the table remains in said normal position; means controlled by the table when the table is moved into an adjusted position to arrest said normally movable means to prevent locking of the releasing means when the table is out of normal position at the beginning of an operation of the machine; and means to release said locking means after the locking means moves into locking position.

35. In a machine adapted to print upon a definite number of lines on insertable record material, machine releasing means, including a movable member; a table supporting the record material; means to position the record material to any of its lines for the first printing; keys controlling the positioning means; means for feeding the table step by step from the position in which it was positioned under control of the keys; means movable by the table into the path of movement of said member when the feeding means moves the table into a position corresponding to the last line to be printed upon, for preventing operation of the releasing means for the next operation; and means to withdraw the last-named means from the path of the member to permit the machine to be released for printing on the last line.

36. In a machine adapted to print upon a definite number of lines on insertable record material, machine releasing means, including a movable member; a table supporting the record material; means to position the record material to any of its lines for the first printing; keys controlling the positioning means; means for feeding the table step by step from the position in which it was positioned under control of the keys; means movable by the table into the path of movement of said member when the feeding means moves the table into a position corresponding to the last line to be printed upon for preventing operation of the releasing means for the next operation; means to withdraw the last-named means to permit the machine to be released for printing on the last line; a bank of control keys; and means controlled by one of said keys during the next subsequent operation for preventing said last-named means from being moved into effective position during said next subsequent operation.

PASCAL SPURLINO.
EVERETT H. PLACKE.
WILLIS E. EICKMAN.
ARTHUR G. KRAMER.